(12) United States Patent
Lercari et al.

(10) Patent No.: US 11,586,385 B1
(45) Date of Patent: Feb. 21, 2023

(54) TECHNIQUES FOR MANAGING WRITES IN NONVOLATILE MEMORY

(71) Applicant: Radian Memory Systems, Inc.

(72) Inventors: Robert Lercari, Thousand Oaks, CA (US); Mike Jadon, Manhattan Beach, CA (US); Andrey V. Kuzmin, Moscow (RU)

(73) Assignee: Radian Memory Systems, Inc., Manhattan Beach, CA (US)

( * ) Notice: Subject to any disclaimer, the term of this patent is extended or adjusted under 35 U.S.C. 154(b) by 39 days.

(21) Appl. No.: 17/313,926

(22) Filed: May 6, 2021

Related U.S. Application Data

(60) Provisional application No. 63/020,661, filed on May 6, 2020.

(51) Int. Cl.
  *G06F 3/06* (2006.01)
  *G06F 12/10* (2016.01)

(52) U.S. Cl.
  CPC .......... *G06F 3/0659* (2013.01); *G06F 3/0604* (2013.01); *G06F 3/0679* (2013.01); *G06F 12/10* (2013.01); *G06F 2212/657* (2013.01)

(58) Field of Classification Search
  CPC .... G06F 3/0659; G06F 3/0604; G06F 3/0679; G06F 12/10; G06F 2212/657
  See application file for complete search history.

(56) References Cited

U.S. PATENT DOCUMENTS

| | | | |
|---|---|---|---|
| 11,075,984 B1* | 7/2021 | Mercier | H04L 43/20 |
| 2012/0159037 A1* | 6/2012 | Kwon | G06F 13/4022 710/317 |
| 2016/0034221 A1* | 2/2016 | Zettsu | G06F 3/0625 711/103 |
| 2021/0223994 A1* | 7/2021 | Kanno | G06F 3/0679 |

* cited by examiner

Primary Examiner — Sean D Rossiter
(74) Attorney, Agent, or Firm — Marc P. Schuyler

(57) ABSTRACT

This disclosure provides techniques for managing writes of data useful for storage systems that do not permit overwrite of a logical address. One implementation provides a nonvolatile memory storage drive, such as a flash memory drive, that provides support for zoned drive and/or Open Channel-compliant architectures. Circuitry on the storage drive tracks storage location release metadata for addressable memory space, optionally providing to a host system information upon which maintenance decisions or related scheduling can be based. The storage drive can also provide buffering support for accommodating receipt of out-of-order writes and unentanglement and performance of out of order writes, with buffering resources being configurable according to any one of a number of parameters. The disclosed storage drive facilitates reduced error rates and lower request traffic in a manner consistent with newer memory standards that mandate that writes to logical addresses be sequential.

26 Claims, 27 Drawing Sheets

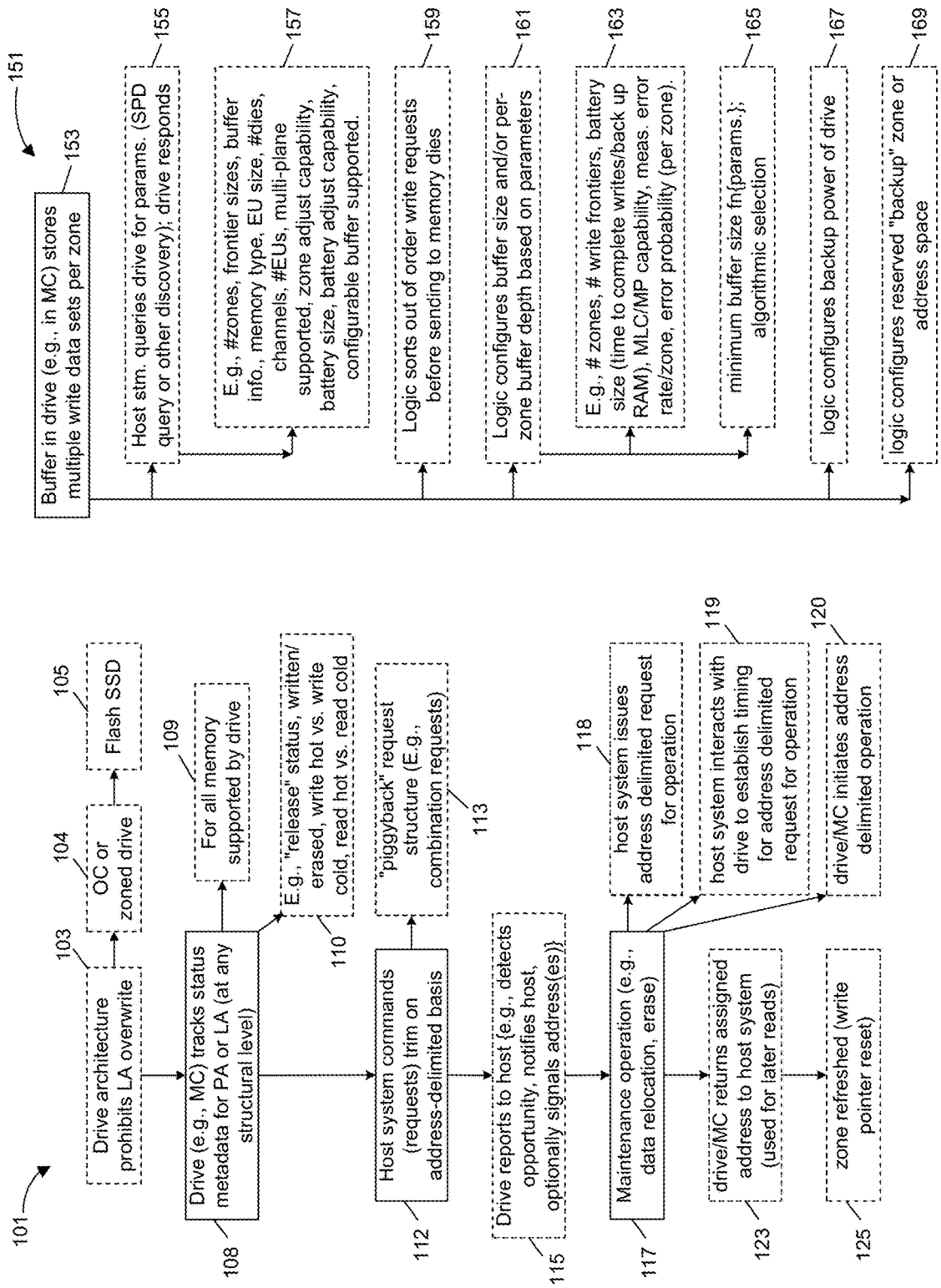

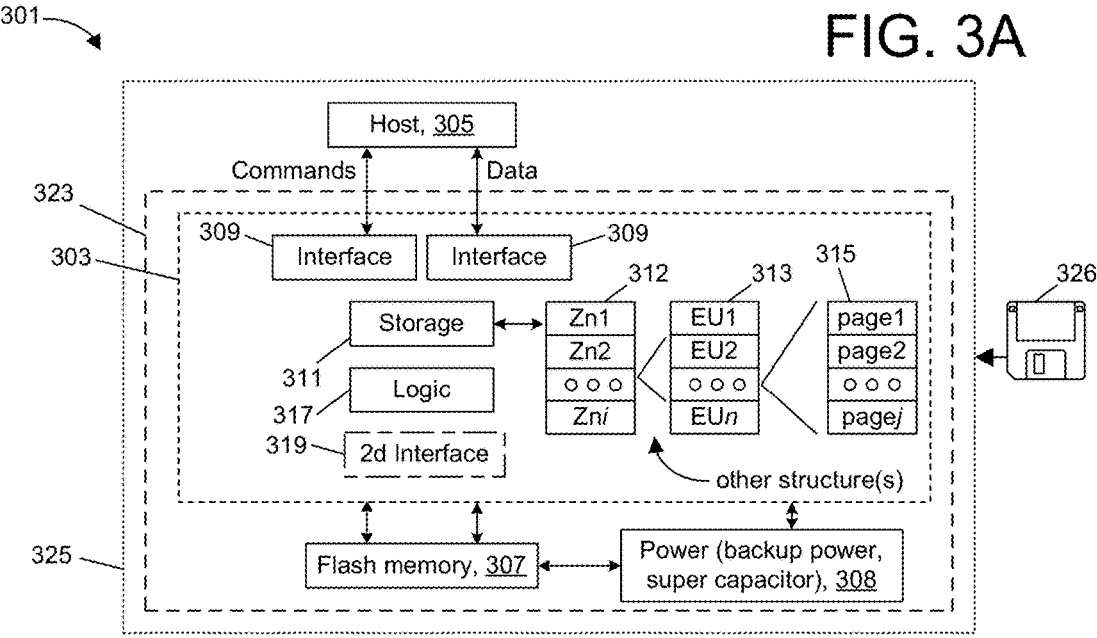
FIG. 3A
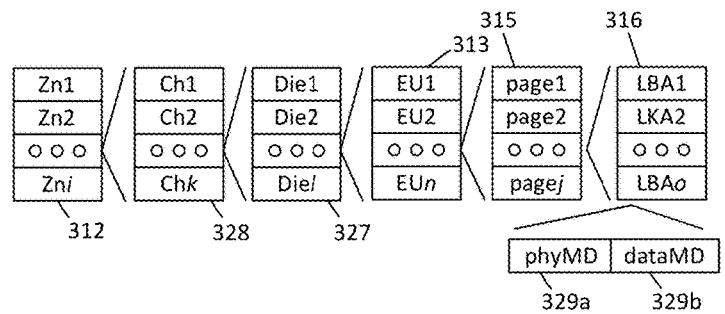
FIG. 3B
| PA MD, 330 | |
|---|---|
| State, 331 | Bitmap, 338 |
| Status, 332 | Remap Flag, 339 |
| Wear, 333 | timestamp, 340 |
| Age, 334 | readf, 341 |
| Read Count, 335 | writef, 342 |
| Log. Address, 336 | hot/cold, 343 |
| Release, 337 | backref, 344 |
| | Other, 345 |
FIG. 3C
| LBA MD, 348 | |
|---|---|
| Age, 349 | timestamp, 355 |
| Read Count, 350 | readf, 356 |
| Log. Address, 351 | writef, 357 |
| Release, 352 | hot/cold, 358 |
| Bitmap, 353 | backref, 359 |
| Remap Flag, 354 | Other, 360 |
FIG. 3D

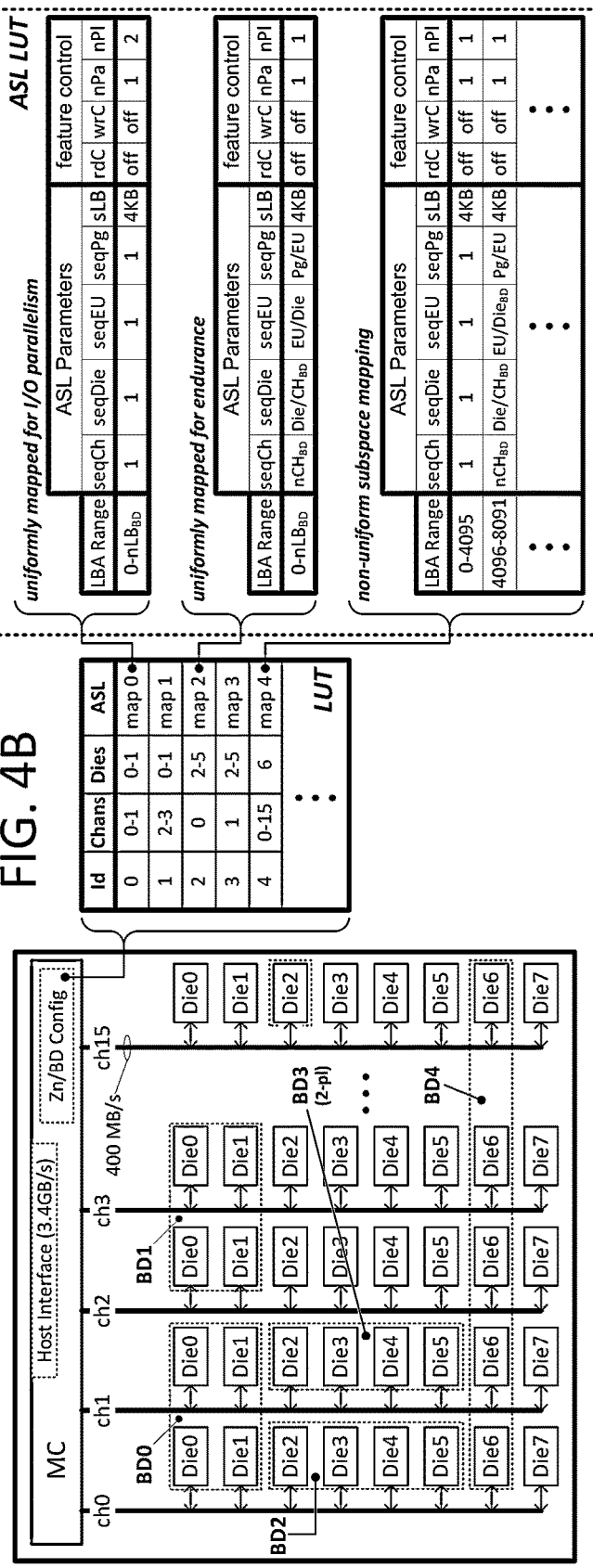
FIG. 4B
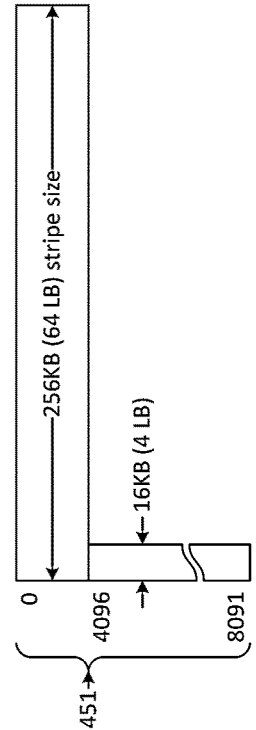
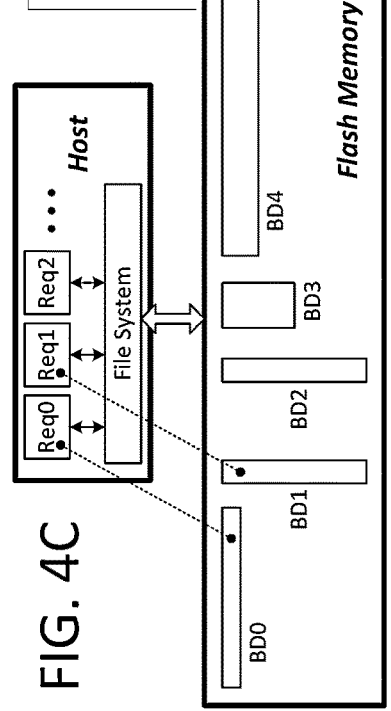
FIG. 4C

Host Zone Allocator and Attribute Configurator

Host Zone Write RAM Buffer and Completion Configurator

Host Open Zone
Allocation Process

Zone Closure
Process

SSD Write Frontier Controller

SSD Open Zone Allocation

SSD Zone Closure

SSD Zone RAM Buffer Size Configurator

SSD RAM Buffer Page Allocator

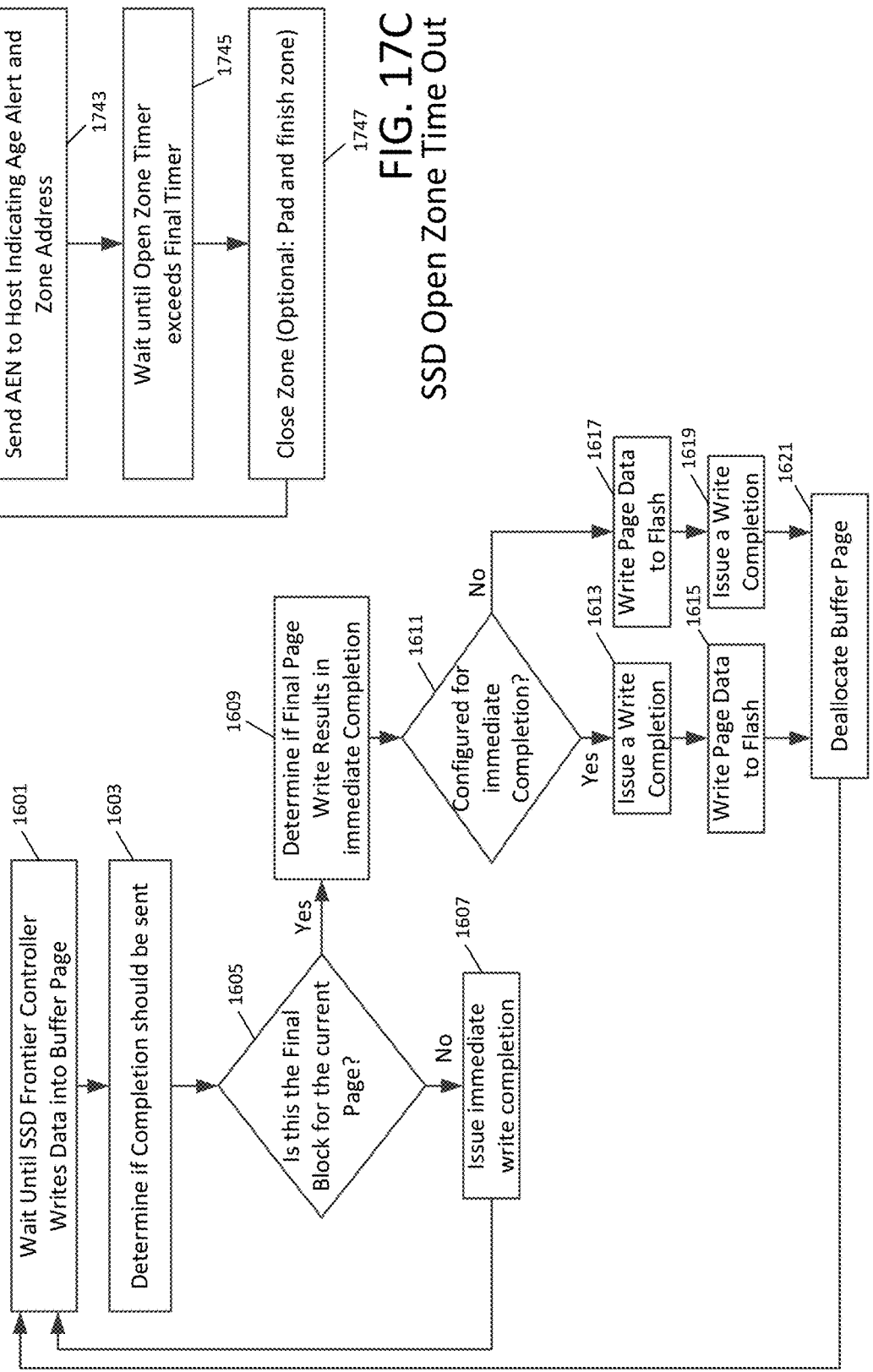
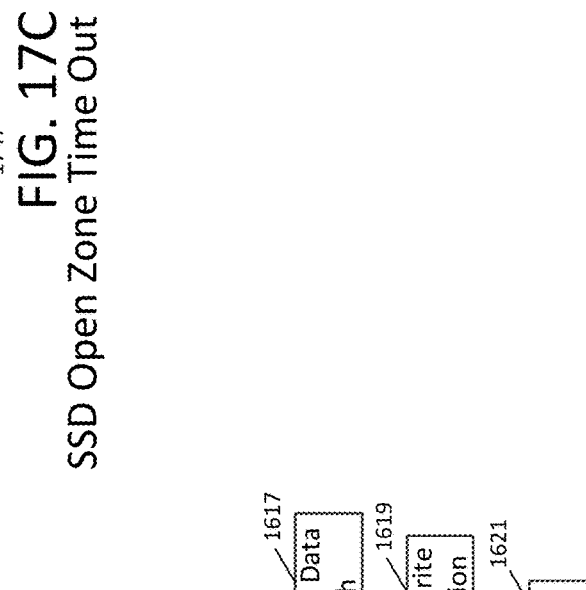
FIG. 16
SSD Flash Write Controller
FIG. 17C
SSD Open Zone Time Out SSD Unfinished Write Frontier Data Protection2

SSD Unfinished Write Frontier Data Protection1

Host Zone RAM Buffer Size Tuner

SSD Delegated Copy Smart Controller

SSD RAM Buffer Back-up Power Controller1

SSD RAM Buffer Back-up Power Controller2

SSD RAM Buffer Back-up Controller

TECHNIQUES FOR MANAGING WRITES IN NONVOLATILE MEMORY

CROSS-REFERENCE TO RELATED APPLICATIONS

This disclosure claims the benefit of U.S. Provisional Patent Application No. 63/020661, having a first-named inventor of Robert Lercari and filed on May 6, 2020 for "MEMORY CONTROLLER/DRIVE FOR OPEN CHANNEL-COMPLIANT AND ZONE-BASED SYSTEMS," which is hereby incorporated by reference. This disclosure also incorporates by reference the following commonly-owned US Patents: U.S. Pat. No. 9,652,376, having a first-named inventor of Andrey V. Kuzmin and being issued on May 16, 2017; U.S. Pat. No. 9,229,854, also having a first-named inventor of Andrey V. Kuzmin and being issued on Jan. 5, 2016; U.S. Pat. No. 10,642,505, also having a first-named inventor of Andrey V. Kuzmin and being issued on May 5, 2020; U.S. Pat. No. 9,542,118, having a first-named inventor of Robert Lercari and being issued on Jan. 10, 2017; U.S. Pat. No. 10956082, having a first-named inventor of Alan Chen and being issued on Mar. 23, 2021; and U.S. Pat. No. 10552058, having a first-named inventor of Mike Jadon and being issued on Feb. 4, 2020.

FIELD

This disclosure relates to non-volatile data storage and retrieval within semiconductor memory, especially including flash memory. More specifically, this disclosure provides techniques useful for handling issues that arise with zoned storage systems and systems that forbid overwrite of logical addresses.

BACKGROUND

In many storage systems that use solid state drives ("SSDs"), the SSDs can be so heavily used that they experience several full drive writes every day. This implies that a large amount of data on each SSD is needed by the storage system to be there only temporarily. Once the storage system no longer needs specific data, the physical space retaining that data needs to be recovered before that physical space can be used to store new data.

When a host system seeks to update data, it typically overwrites one or more logical block addresses (LBAs) associated with that data; in situations where a LBA is mapped to an address translation-based drive, such as, by way of nonlimiting example, a conventional flash memory drive, a memory controller for that drive typically cannot simply overwrite one or more physical storage locations, but rather, it can only write to physical storage locations which have been previously "reset" (i.e., returned to a writable state) by an erase operation. Therefore, with address translation-based drives, a memory controller for a given drive typically receives the new data associated with a given LBA from a host system, it selects a new physical storage location and it then stores the data in that new physical storage location; the memory controller then records a new logical-to-physical (L2P) mapping in a translation layer (TL) for the given drive, and it marks the old physical location that previously held the old (i.e., now-stale) data as "released," "dirty" or "invalid," to be garbage collected later. The mapping kept by the TL is thereby changed; whereas the TL previously linked the given LBA to an old physical location, it now links the given LBA to a new physical location, and the old physical location is marked "released," as indicated. The given drive still continues to store the old, pre-updated data with no logical address pointing to the old data and, in connection with a later-completed erase operation, the memory controller for the drive will typically at that later time erase or reset each associated physical storage location and will change a status indicator to indicate that the old physical location may now once again be written with new data (and presumably, will also at that time update the TL to indicate that some other LBA now points to the location). Note that not all storage drives operate in this manner, e.g., a magnetic media drive simply overwrites the physical location. Many of the techniques introduced by this disclosure will be applicable to address-translation drives as well as other types of drives (e.g., magnetic media drives); as used herein, "logical address" (or "LA" or "LBA") will be used to refer to any addressing scheme used by a host system to request data from memory (e.g., even if such address is permanently mapped to a given physical location) whereas "physical address" will be used herein to refer to the addressing scheme used by a memory controller in directing commands directly to storage media (e.g., such as a die or memory array, with "physical address"); in some cases, the LA and the PA have the same values.

With the advent of Open Channel-compliant drives and zoned drives, overwrite of data at a logical address by a host system is typically no longer permitted irrespective of the type of underlying memory that is used. That is, these types of drives typically require that a logical address must be explicitly erased or reset by a host system, via a specific operation, before that space can again be written to, even in cases where magnetic drives are used for storage. To modify data, for example, a host system operating in the context of one of these architectures is instead required to read data from a logical address, modify that data as appropriate, and then write the result to a new logical address that the host system knows in advance is available to receive write operations. As stated, these storage schemes typically treat nonvolatile memory as ubiquitous in terms of these operations, such that these addressing and data modification restrictions are required from an architectural perspective even where a given storage drive does not use address translation. Open Channel-compliant drives and zoned drives also typically require that page addresses used for writes to a given physical memory structure must be sequential (e.g., pages must be written in order within an erase unit or "EU," which corresponds to a minimum quantity of memory cells that must be erased together). In these types of storage systems, the host system is typically now charged with tasks such as garbage collection and wear leveling (e.g., including but not limited to situations where the memory type is flash memory). Further, in such systems, logical addresses can only be erased or reset in large quantities in response to a single host-issued request. For a zoned drive, for example, an erase operation is effectuated via a zone reset request, and results in the erasure of the entire zone.

However, as a practical matter, erase units and/or zones typically never have only "stale" data absent some type of garbage collection process. That is, different LBAs containing unrelated data typically become unneeded at different times, and the host system is typically forced, in order to avoid data loss and significant wastes of memory space, to periodically copy the leftover valid data from source physical storage locations to consolidate that data in new destination locations, so that the associated EUs can then be erased or zones can be reset (this is the "garbage collection" process for these types of drives). To implement host-level garbage collection, the host system typically stores a table to track which LBAs contain invalid/unneeded data, and must execute a time consuming process, requiring significant host system processing overhead (i.e., system CPU cycles).

Thus, there is a need for more efficient techniques which can be used with these types of drives, and with their associated hosts, memory controllers, and memory devices. The present invention addresses these needs and provides further, related advantages.

BRIEF DESCRIPTION OF THE DRAWINGS

FIG. 1A is a block diagram showing some techniques where a storage drive performs storage location release tracking in a manner compatible with architectures that prohibit logical address (LA) overwrite.

FIG. 1B is a block diagram showing some techniques that facilitate management of out of order writes and/or provide for variable write buffer configuration in a manner compatible with architectures that prohibit LA overwrite.

FIG. 3A is a block diagram of a flash memory controller that tracks metadata for various storage locations in flash memory.

FIG. 3B is a block diagram showing a configuration of zones where zones are aligned with respective die sets or memory arrays so as to provide for performance isolation.

FIG. 3C shows some exemplary types of metadata that can be used to characterize a physical location.

FIG. 3D shows some exemplary types of metadata that can be used to characterize storage characteristics.

FIG. 4B is a block diagram showing address space layout customization features, each, which can be specific to a block device or zone. Note that while four block devices (BDs) are shown, which align on a mutually-exclusive basis to respective sets of memory dies, there can in fact be many zones, e.g., one or more, per block device.

FIG. 4C is a block diagram that illustrates variable configuration of block devices representing different zones (or zone sets) in one embodiment.

FIG. 16 is a block diagram of a SSD flash write controller, used in one embodiment.

FIG. 17C is a block diagram showing a set of functions that can be used in one embodiment to manage a time-out function.

Figure 2A:
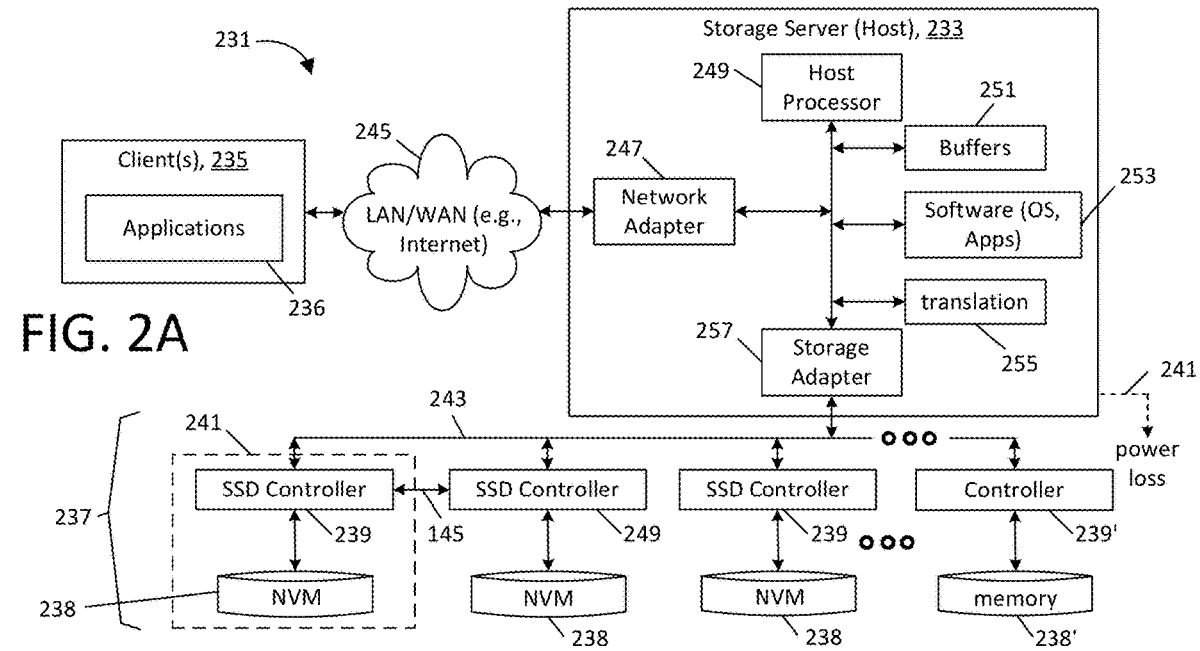
FIG. 2A is a block diagram showing one embodiment of a storage aggregate having multiple storage drives (i.e., each drive having its own dedicated memory controller resources such as a depicted SSD controller 239).

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set forth below exemplifies techniques that can be practiced in one embodiment by a storage drive (e.g., an SSD), in another embodiment, by select circuitry on such a drive (e.g., a monolithic memory controller integrated circuit) or otherwise, in another embodiment by a flash memory device (e.g., die or integrated circuit), in another embodiment as techniques implemented in logic (e.g., in instructional logic such as software stored on non-transitory media), and in yet another embodiment by a combination of one or more of these things, perhaps cooperating with one or more other devices or circuits. This disclosure also provides improved designs for a memory controller, host, memory devices, a memory system, a subsystem (such as a drive, e.g., a solid-state drive or "SSD"), and associated circuitry, firmware, software and/or other processing logic. The disclosed techniques can also be implemented as instructions for fabricating an integrated circuit (e.g., as a circuit design file or as configuration for a field programmable gate array or "FPGA" configuration) or a collection of circuits. While the specific examples are presented, particularly in the context of flash memory, the principles described herein may also be applied to other methods, devices and systems as well.

DETAILED DESCRIPTION

I. Introduction.

This disclosure provides techniques for managing writes in certain types of memory systems, especially storage drives that can be used in Open Channel-compliant and/or zoned storage systems. More generally, this disclosure provides techniques for managing writes in nonvolatile memory, including without limitation flash memory.

One set of techniques provides for heightened cooperation between a host and a storage drive (or a memory controller that controls memory in and/or forms a part of a storage drive). A host system can transmit a request to a storage drive that causes the write of data; this request can include a write request, but it can also or instead include other types of requests, such as a request for an operation will cause relocation of data to a new physical destination in memory. Note that, depending on implementation, the source and destination in such an operation can optionally be in the same storage drive, for example, as might be the case with a garbage collection request or a request to relocate "hot" or "cold" data from one location in the storage drive to another location; there are other types of requests that can trigger data relocation, including without limitation requests for atomic operations, other wear leveling-related requests, and so forth. Contrary to conventional wisdom, the storage drive (and/or memory controller for a storage drive) in accordance with the principles taught herein is structured to maintain metadata indexed to a logical (and/or physical) storage location, so as to be in a position to help with management of nonvolatile memory (and such that the host is optionally not encumbered by management of such metadata). This tracking is done already in some conventional flash-based storage systems for general purposes but it is typically inconsistent with Open Channel-compatible and zoned architectures and other architectures which prohibit overwrite of logical address space. Therefore, according to the principles taught herein, in some disclosed embodiments, this metadata tracking is nevertheless performed by an Open Channel-compliant and/or a zoned storage drive. To facilitate this tracking and to reduce maintenance request overhead, several new request formats can optionally be used that combine storage location release requests (directed to metadata tracked by the drive/memory controller) with other operations, and a memory controller and/or storage drive can include hardware and/or instructional logic that supports the receipt of and execution of such request formats. In several embodiments below, these request formats provide for storage location release (e.g., "trim") operations which expressly indicate to a storage drive/memory controller that a logical address is to be released, e.g., marked as not having valid data, and in several embodiments, this release/trim can be combined with other requests (e.g., write requests) or inferred based on circumstance. Examples will be given below of various such host-issued request formats.

As an introductory and non-limiting example, one type of request that a host system can issue in some embodiments is a request to move data (e.g., "MVIR" for "move-internal-to-zone-release"); in one exemplary form of this request, the request is structured to have a format includes fields that name a source location (e.g., "MVIR{A}," where "A" denotes a partial or full address within a nonvolatile memory drive, a logical or physical structural identifier and/or an address offset value to some sort of positional indicator). The storage drive executes the request in question by reading the data from the source location, by immediately writing that data to a new location within a specified zone (e.g., the same zone or one inferred from context), by immediately updating tracked metadata to indicate that the old location "A" is "released" (e.g., "trimmed"), and by automatically returning to the host an address designation "B" for the data (which the host system will thereafter use for addressing future read requests for the data in question). Such an operation for example can be useful for host-initiated moves of write-cold data or potentially for other operations. There are many variants of this type of host-system-issued request. Another example of a "combined" or "piggybacked" operation request format is a write-release request (e.g., "WRR"), which specifies data to be written into a memory at a first location A and which specifies that the storage drive to mark a second (e.g., related or unrelated) location B as released/trimmed (e.g., the request is of the format "WRR{A:B}"). Note again that these address designations can be specific (e.g., identifying a zone, channel, die, etc., down to a specific LBA) or they can designate general logical or physical structures or offsets (e.g., the host generally specifies a destination zone or memory die, with a specific address within the specified destination memory die being assigned by the drive or a memory controller for a drive, or specifies an offset, e.g., $8^{th}$ LBA of a named zone). This type of request format and supporting host system logic and drive logic can be useful for a myriad of circumstances, including without limitation a situation where data in question is cached in RAM; for example, the data in question might be a system parameter, and the request can specify release of an original nonvolatile memory location corresponding to the cached data, with a commit/write of updated data commanded to a new location B, e.g., in a manner compliant with the addressing restrictions which prohibit overwrite of logical address. Note that some request formats specify a single address only (e.g., a read/trim command can read data from a single location only while instructing a storage drive to mark that single location as released or dirty or trimmed), while other request formats can specify multiple addresses (e.g., the request instructs a write to location A and a trim of location B or locations B-C); in connection with a read request, the storage drive can track storage location release metadata in managing writes of data and updates that metadata in connection with a later "piggybacked" read/trim request. Again, these examples are intended to be nonlimiting; many variants of these illustrated examples and basic principles will occur to those having ordinary skill in the art, all of which are contemplated by this disclosure.

In other embodiments, a designer can specify two similar request formats for combined ("piggybacked") and non-combined operations; for example, a first write request format might not have any attendant trim/release operation, while a second write request format that implicitly commands a trim/release of a storage location (each format would be effective to accomplish a write of specified data). Still other embodiments may infer a combined/piggybacked operation based on circumstance, e.g., a memory architecture can be structured such that a garbage collection/move operation automatically causes a drive/memory controller to mark source locations from which data is moved as released (trimmed).

By combining trim/location release requests with other types of data requests, and by employing storage drives and/or memory controllers having cooperative support logic to having these requests and/or perform related tracking and/or maintenance, a host system can offload tasks while at the same time reducing host-memory controller maintenance overhead that might otherwise compete with host-issued data access requests.

Note that in contemplated embodiments, a storage drive and/or a memory controller for such a storage drive can have a register that stores programmable operational settings, including a setting indicating whether combined data access/location-release (trim) operations are permitted or selecting between multiple, supported instruction sets; for example, if a first value of a setting is stored at a specific location in such a register, a storage drive/memory controller is enabled to track storage location release metadata and to perform certain associated maintenance functions, while if a second value of the setting is stored at the specific location in the register, these capabilities are turned off. In one implementation of a multimodal embodiment of this type, a storage drive and/or memory controller (for which the enhanced ability is turned "off") can optionally be structured so as to ignore "combination" requests (e.g., read/trim), while in another, the storage drive and/or memory controller can be optionally structured so as to treat a "combined" request as synonymous with a non-combined request (e.g., a combination request to read from location A and to trim location B can be treated simply as a request to read from location A, with the trim operation being ignored if the pertinent mode setting is programmed "off"). Many types of combined request formats and associated supporting host system and storage drive architectures are specifically contemplated, including without limitation: (a) read/trim, (b) copy/trim (e.g., copy from A to B, release C), (c) move (e.g., copy from A to B, trim A), (d) garbage collect A/trim A, (e) refresh A/trim A (drive returns new location B, e.g., request used to support cold data relocation), (f) copy from A to drive-selected location, trim A, drive reports back new address, and (g) many other types of formats. Many related techniques contemplated by this disclosure will become clear to those having ordinary skill in the art based on the discussion below.

Note that the use of a combined request architecture is not required for all embodiments; for example, it is contemplated that a cooperative storage drive and associated memory controller logic, structured in a manner that supports Open Channel-compliant and zoned drive architectures, can generally provide for metadata tracking to assist with maintenance functions and generally includes logic for receiving host-issued trim commands to permit the host to selectively command release of storage space on an address-delimited or zone-delimited basis. The cooperative storage drive and/or memory controller, in these or other embodiments, can optionally include logic to either sua sponte perform garbage collection and other maintenance functions, or to detect an opportunity to perform such functions (e.g., a zone, EU or other structure is partially or completely "released" and stores no valid data) and to notify the host system, such that the host system can explicitly instruct or otherwise arrange for maintenance performance at a time of the host's choosing. In one embodiment, this can be performed when the host system, relative to its request queue, perceives more than a threshold amount of spare bandwidth, or conversely, at a prearranged time (e.g., during an arranged maintenance window). The structures and operations disclosed by the incorporated by reference document, U.S. Pat. No. 9,652,376, provides additional detail on how memory controller and/or drive architecture can be structured to provide these and similar capabilities.

A second set of techniques provide buffer configuration and/or management techniques that also can help reduce host-memory controller maintenance traffic overhead. It will be recalled earlier that was stated earlier that some of the emerging nonvolatile memory standards do not permit out-of-order writes, and that it is nevertheless possible for such out of order writes to occur and to generate errors. A variety of techniques are disclosed below that permit servicing of out-of-order writes and still permit standards-compliant operations. Note that standards compliance is not required for all embodiments discussed herein and that the operations described below can be extended to a wide range of memory systems, including extensions of older technologies. In a first set of techniques, a write buffer is provided in a storage drive for receiving out of order writes and resorting those writes, such that they may be written to zones and/or EUs in order, i.e., even if not received in order. Techniques can be optionally applied for dynamically managing buffer resources, which can be especially used for zoned drive applications (e.g., potentially having many hundreds if not thousands of zones). In still other variations, drive capabilities and/or application needs can be considered in identifying efficient write buffer allocations; as a nonlimiting example, should a specific application (and associated zone and write frontier requirements) call for high bandwidth and/or high priority, relatively more buffer resources can be allocated to managing these needs, potentially at the expense of storage areas deemed less sensitive to write errors. As another nonlimiting example, some embodiments can provide for consideration (and potentially configuration) of backup power resources, managing zone size in consideration of writes that can be completed after a loss of system power (i.e., using battery power), and permitting a write buffer to accept and announce early completion of write requests notwithstanding that write data might still be unstable and/or stored in internal random access memory (RAM), pending commit to a nonvolatile storage drive. Techniques can be applied for collaboration between a host system and a storage drive to (a) discover and/or share host system needs and storage drive geometry and capabilities, and (b) intelligently configure resources, including zones and write buffer resources, so as to efficiently manage storage needs. In the discussion below, techniques will be described for exchanging this information, configuring zone size/width and other parameters, configuring system resources such as write buffer capabilities, out of order write support, RAM backup and battery backup processes, providing early confirmation of write completion (so as to facilitate better predictability in request execution and associated latencies, to facilitate better pipelining of host requests), and other techniques. It is emphasized that these various techniques are not required for all embodiments and are expressly contemplated by this disclosure in any and all permutations or combinations, with each disclosed feature being usable with each other feature, and with each feature being considered optional to any combination.

Prior to proceeding to a further detailed description regarding various embodiments, it would be helpful to introduce certain additional terms that will be used in this disclosure.

Specifically contemplated implementations can feature instructions stored on non-transitory machine-readable media. Such instructional logic can be written or designed in a manner that has certain structure (architectural features) such that, when the instructions are ultimately executed, they cause the one or more general purpose machines (e.g., a processor, computer or other machine) to behave as a special purpose machine, having structure that necessarily performs described tasks on input operands in dependence on the instructions to take specific actions or otherwise produce specific outputs. "Non-transitory" machine-readable or processor-accessible "media" or "storage" as used herein means any tangible (i.e., physical) storage medium, irrespective of how data on that medium is embodied, including without limitation, random access memory, hard disk memory, EEPROM, flash, storage cards, optical memory, a disk-based memory (e.g., a hard drive, a physical BluRay DVD or CD disk), server storage, volatile memory and/or other tangible mechanisms where instructions may subsequently be retrieved and used to control a machine. A physical disk (e.g., a DVD) is an example of a physical "thing" and is therefore not a transitory medium (e.g., such a decaying signal that does not indefinitely reside on a physical carrier). The media or storage can be in standalone form (e.g., a program disk or solid state device) or embodied as part of a larger mechanism, for example, a laptop computer, portable device, server, network, printer, memory drive or unit or other set of one or more devices. The instructions can be implemented in different formats, for example, as metadata that when called is effective to invoke a certain action, as Java code or scripting, as code written in a specific programming language (e.g., as C++ code), as a processor-specific instruction set, or in some other form or language; the instructions can also be executed by a single, common processor or by different (remote or collocated) processors or processor cores, depending on embodiment. Throughout this disclosure, various processes will be described, any of which can generally be implemented as instructions stored on non-transitory machine-readable media. Depending on product design, such products can be fabricated to be in saleable form, or as a preparatory step that precedes other processing or finishing steps (i.e., that will ultimately create finished products for sale, distribution, exportation or importation). Also depending on implementation, the instructions can be executed by a single computer or device and, in other cases, can be stored and/or executed on a distributed basis, e.g., using one or more servers, web clients, or application-specific devices. Each function mentioned in reference to the various FIGS. herein can be implemented as part of a combined program or as a stand-alone module, either stored together on a single media expression (e.g., single floppy disk) or on multiple, separate storage devices. Throughout this disclosure, various processes will be described, any of which can generally be implemented as instructional logic (e.g., as instructions stored on non-transitory machine-readable media), as hardware logic, or as a combination of these things, depending on embodiment or specific design. "Module" as used herein refers to a structure dedicated to a specific function; for example, a "first module" to perform a first specific function and a "second module" to perform a second specific function, when used in the context of instructions (e.g., computer code), refers to mutually exclusive code sets. When used in the context of mechanical or electromechanical structures (e.g., an "encryption module," the term "module" refers to a dedicated set of components which might include hardware and/or software). In all cases, the term "module" is used to refer to a specific structure for performing a function or operation that would be understood by one of ordinary skill in the art to which the subject matter pertains as a conventional structure used in the specific art (e.g., a software module or hardware module), and not as a generic placeholder or "means" for "any structure whatsoever" (e.g., "a team of oxen") for performing a recited function (e.g., "encryption of a digital input"). "Erasure coding" as used herein refers to any process where redundancy information is generated and/or stored, such that underlying information used to generate that redundancy information can be recovered if a memory device or unit of memory is off-line or otherwise inaccessible. "Host-supplied" address means an address supplied by the host (but not necessarily assigned by the host), for example, provided in connection with a host-issue request; for example, this term encompasses a logical address (LA) provided with a read request which seeks specific data (e.g., the address may have been originally assigned by the memory controller, depending on embodiment); by contrast, "physical address" (PA) typically refers to an address that is tied to a specific physical location and that is used by a memory controller to directly access a memory array (e.g., a memory die)—in some cases, the PA and LA can be the same. Logical Block Address (LBA) is a type of LA, e.g., in some cases for example, a "page" of information can encompass multiple LBAs (e.g., a 16 k page of data might include four 4 k LBAs, for embodiments where 4 k is the LBA size). "EC information" as used herein refers to information relating to error correction values or the location or existence of error correction values; it for example can encompass single or multi-bit parity values or other forms of error correction codes or data and/or it can encompass an identifier, link or address that points to one or more of these values. A "zone" as used herein typically refers to an address range of some type, which may or may not align with discrete physical structures supported by the memory (e.g., die boundaries); for example, it is possible to have zones defined in association with mutually exclusive die sets, though in a typical implementation, zones will be defined so that each die will have many zones. In some embodiments, a block device having one or more zones can be configured so as to provide performance isolation, e.g., data can be stored in or retrieved from a first zone corresponding to first memory die associated with a first block device without any significant impact on ability of array control circuitry of a second memory die to concurrently store data in or retrieve data from a second zone corresponding to the second memory die where the second zone is associated with a second block device.

Having thus introduced some illustrative capabilities provided by various techniques describe herein, this description will now proceed to discuss a number of illustrative embodiments in additional detail.

FIG. 1A introduces techniques relating to the handing of trim operations and associated metadata tracking by a memory controller; the techniques are generally referenced by numeral 101. As implied by dashed-line block 103, in a typically non-limiting implementation, these techniques are embodied in a storage drive architecture where logical address (LA) overwrite is prohibited; this is to say, when a host system (not shown in this FIG.) wants to modify data, a new LA needs to be selected that will then be associated with the modified data. As implied by dashed-line function block 104, optionally, the architecture can be one that is compliant with a version of the Open Channel standard and/or zoned drive schemes. The architecture, as indicated by numeral 105, can also or instead be one that relies on the use of nonvolatile memory, such as in the form of a NAND flash memory solid state drive (SSD). As denoted by numeral 108, the storage drive is structured so that it tracks status metadata by physical address (PA), by LA, or both, at any structural level of memory; for example, the metadata can be tracked in aggregate at the level of zone (in drives having multiple zones), at the level of any of respective memory channels, dies, erase units, planes, pages, LBAs, stripes, chunks, write stripes (e.g., representing a frame of data striped across dies, planes, EUs or otherwise) or at some other virtual or physical structural level. As nonlimiting examples, metadata could be tracked at a relatively high structural level, e.g., for a zone indicating that "95%" of constituent LBAs contain stale data; metadata in other embodiments could also be tracked at a lower structural level, e.g., at LBA level, such as a bit for each LBA to indicate whether that LBA has been trimmed or released (metadata would also in this case be available and tracked at higher structural levels, e.g., if such data is kept for every one of 1024 LBAs that can be stored in a hypothetical erase unit of corresponding size, then metadata would also be available in aggregate representing the erase unit). As indicated by a dashed-line (optional) function block 109, a storage drive (and/or its memory controller) advantageously tracks such metadata for all subdivisions of addressable memory space at whatever level metadata is tracked. For example, if a hypothetical example storage drive has a total of 64 memory dies used to store write data and metadata is stored at the level of storage die, metadata can be kept for each of the 64 dies. As indicated by function block 110, in addition to storage location release (trim) metadata, the tracked metadata can also optionally include whether a structure or address is currently written, a hot or cold status (e.g., write cold, write hot, read cold, read hot), and/or other types of information. Such metadata typically refers to the status of the storage unit and any data stored there. The storage drive and/or its memory controller includes logic that maintains and updates this metadata in the course of performing various memory operations, including read and/or write operations. For example, LBA usage information can be kept and automatically updated by the storage drive as it receives and executes a new write request relating to an LBA.

As indicated by function block 112, in addition to tracking metadata of the type described, the storage drive and/or its memory controller also receives host system-issued requests which implicitly or explicitly command release (trim) of LAs on an address-delimited basis (e.g., by specified zone, by offset, or by general structural address such as die address, address range, etc.), where the release/trim is to be applied to a subset of memory (e.g., less than the maximum used address space, such that that the host system effectively communicates selection of an addressable subspace that is to be marked as released/trimmed). For example, one embodiment uses a trim request to command a memory controller for a storage drive to mark all memory associated with a specified zone as "released;" such a request can alternatively delimit a trim operation to any other structure, address range or range of structures, or list of addresses and/or structures. As alluded to above, and as represented by dashed-line block 113, in one embodiment, the host system and the storage drive (and its memory controller) are structured to handle "piggyback" requests that combine operations, one of which is a trim operation. As implied by the optional nature of this structure, not all embodiments require this capability.

In addition, some embodiments feature a cooperative drive/memory controller which has structure to identify maintenance opportunities and to communicate related information to the host system based on this identification; this optional structure is reflected by function block 115. As described in the incorporated by reference documents (e.g., U.S. Pat. No. 9,652,376 and/or U.S. Pat. No. 9,229,854), the storage drive and/or its memory controller circuitry can have instructional and/or hardware logic that monitors metadata to identify conditions such as (by way of nonlimiting example) (a) an entire structure (e.g., zone, EU, die, etc.) has been released to an extent such that it no longer has valid data (and can therefore be erased), or (b) such a structure stores valid data that can advantageously be relocated (e.g., the data is write cold such that the data is evading wear leveling processes, or the data has a risk of read disturb given nearby data reads, or the data is in a structure that is mostly released, and it would be efficient to garbage collect the data so as to prepare the structure for physical memory erase). A storage drive managing metadata of the type described can have onboard logic to identify these opportunities and effectively convey those opportunities or related information to the host system, such that the host system can then trigger or schedule maintenance at a time convenient to the host. For example, in one embodiment, requests for the maintenance can be planned (queued) and transmitted to "at once" command maintenance during a period where required input/output "IO" request traffic is light. In another embodiment, a host system can communicate information that causes maintenance to be performed at a prearranged time, e.g., during a preplanned maintenance window. In yet another embodiment, maintenance operations can be fractionally requested by the host system on the basis that is limited to explicitly identified subsets of memory, such that the host system can effectively restrain both the timing and the size of data operations effectuated as part of the maintenance operation in question. The logic to detect maintenance need can be either onboard the storage drive (e.g., its memory controller) or the host system; in one embodiment, the storage drive can identify need and issue requests for maintenance to the host system (or identify maintenance candidates, e.g., the "top ten" zones for garbage collection) and, in another embodiment, the host system can query (pull) metadata or derived information from the storage drive and assess need itself relative to other parameters managed by the host system. In embodiments where the storage drive (and/or its memory controller) assesses maintenance opportunities, the storage drive can optionally be designed such that its communication to the host system explicitly identifies one or more addresses that are to be the operand for requested or opportunistic maintenance. Note that storage drive cooperation in analyzing or sharing metadata or derived information is not required for all embodiments.

Whether suggested by the storage drive or otherwise, as indicated by function block 117, the host system is advantageously structured to issue requests for maintenance operations, including specifically, one or more of requests to relocate data, requests to trim storage locations and/or requests to erase (reset) physical memory (i.e., so as to effectively purge any invalid data previously stored at affected locations). Numerals 118-120 denote several additional, optional functions. For example, as just introduced, the host system can issue requests that are address-delimited, with request formats, for example, having an express field that specifies a logical or physical structure (e.g., "address" specifying a zone or a physical structure such as a channel, die, EU, page, LBA, data frame, data chunk, etc.); in contemplated embodiments, this field can also permit multiple addresses or an address range to be identified. As alluded to earlier and as referenced by numeral 119, in some embodiments, the host system can arrange timing for maintenance performance, for example, queuing a request and then issuing it to "at once" (i.e., on receipt) trigger maintenance, or by configuring a future time or interval during which maintenance is to be performed. Per numeral 120, it is also possible to have the storage drive itself directly (e.g., sua sponte) perform maintenance operations, for example, "automatically" erasing (resetting) physical memory space that is at least partially stale and currently has no valid data. Note that in some embodiments, as referenced by numeral 123, it is possible to have the storage drive itself assign addresses for writes of data; this can potentially provide an effective alternative to architectures that require sequentially-addressed writes. For example, in one contemplated architecture, the host system issues a write request to a specified zone but does not further specify LA; the memory controller writes data in whatever order received for the specified zone in a manner matching the current write pointer for that zone and reports the pertinent LA back to the host system (i.e., by a get log page response, by a completion notification or by some type of unsolicited notification), with the host system updating its address tables and thereafter using the storage-drive-assigned LA to address future read requests to the storage drive for the data in question. This schema can also be used for tasks such as garbage collection, e.g., where the host system specifies a garbage collection operation for a zone and the storage drive consolidates data (e.g., in a new zone) and reports back newly assigned addresses (e.g., in bulk, in the form of a get log page response).

With storage location release metadata being tracked by the storage drive, and ensuing maintenance performed, e.g., in dependence on that tracked metadata, physical memory space can be erased in an efficient manner; as indicated by function block 125, for zoned architectures, this can lead to more efficient performance of a zone refresh (i.e., physical memory reset) function.

FIG. 1B is used to elaborate on some of the second set of techniques introduced earlier; these techniques are optionally used with the techniques of FIG. 1A, but this is not required for any embodiment, and the techniques of FIG. 1A can also be used without using the techniques referenced by FIG. 1B.

More particularly, FIG. 1B shows a number of techniques 151 for managing out of order writes and/or configuring write buffer resources. As indicated earlier, these techniques can be especially useful in managing write operations in architectures that forbid LA overwrite, and they optionally can be used in zoned drive and Open Channel (OC)-compliant architectures.

As indicated by function block 153, a write buffer on board a storage drive stores multiple write data sets. These data sets can be stored for each zone of one or more zones. In one embodiment, the storage drive includes a RAM (e.g., a synchronous dynamic RAM, or SDRAM) which is optionally internal to a memory controller, e.g., part of a monolithic memory controller integrated circuit (IC). This capability can be used to store out of order writes on receipt, and to perform an unentangling function before write data is written in sequential order into nonvolatile memory of the storage drive, per numeral 159. For example, for zoned drive architectures, it is typically required that a LA for a given zone must match the write pointer for that zone before a write command can be issued by the associated memory controller. As a zone is opened (i.e., as it is first written), a write pointer is created that points to the next available physical memory location for that zone; conventionally, if a LBA for the next write to memory for that zone does not match the write pointer, an error is generated. However, in accordance with described embodiments, write buffer space can be allocated to currently-open zones and dynamically managed so as to provide a buffer depth for unentangling out of order writes. In some embodiments, a provisioning function is executed that allocates only a minimum, specific write buffer depth to each zone to perform this unentangling; this is to say, it is expected that SDRAM space will be in high demand (short supply) for some implementations, and may be advantageous to efficiently and conservatively allocate write buffer resources so as to maximize a number of zones that can be concurrently open (or to preserve SDRAM capacity for other memory control purposes). By providing buffer space for unentangling out of order writes, the disclosed techniques provide for relaxed write pointer management and fewer error events than might conventionally occur. It is noted in this regard that many conventional storage drive architectures rely on the use of serial transmission formats (such as by way of nonlimiting example PCI and USB-compliant formats) and that out of order write receipt is quite possible and perhaps even likely with some of these signaling schemes. By providing for reduced error events, the disclosed techniques provide for enhanced memory request pipelining with conventional signaling standards, in a manner compatible with systems that prohibit out of order writes and logical address overwrite (in many disclosed embodiments, write requests are still fulfilled in sequential address order, but out of order receipt of those write requests by a storage drive can nevertheless be tolerated, and a host system can be permitted to have more than one request in flight at any given time to a given storage drive).

Figure 4A:
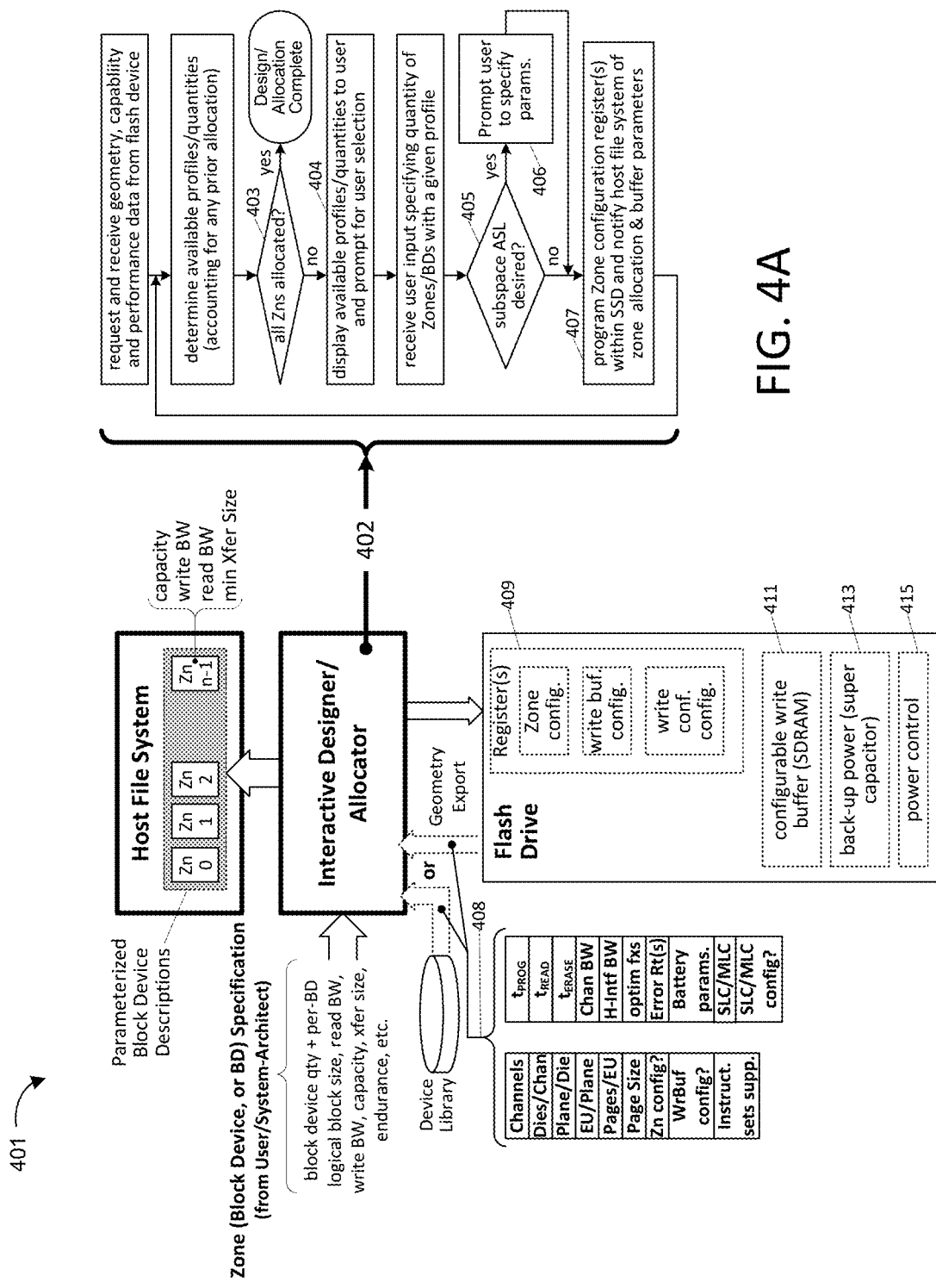
FIG. 4A is a block diagram showing a designer/allocator that permits customization of zones/block devices.

As indicated by dashed-line (optional) block 155, in some embodiments, the host system can issue a query to the drive for parameters representing storage drive geometry and/or storage drive capabilities. This information for example can optionally be stored by the manufacturer in a serial presence detect (SPD) register or equivalent, such that it can be directly read by the host system. Alternatively, circuitry onboard the storage drive (e.g., memory controller circuitry) can be structured to respond to a host system-issued discovery request or a read to an on-drive register in order to provide the parameters to the host system. FIG. 4A, discussed below, lists some types of information that can be provided to the host system as part of this discovery process, as do the incorporated by reference documents. Generally speaking, for zoned drive implementations, some storage drives might have a precast zone configuration (e.g., fixed number of like-sized zones) while other embodiments might facilitate user customization of zone numbers, sizes and widths; by way of nonlimiting example, information such as whether a drive supports zones, the number of zones supported, whether zones are customizable, and many related parameters can be provided as part of the discovery process. It is also possible, as alluded to by the incorporated by reference documents (e.g., U.S. Pat. No. 9,542,118) to have a storage drive report raw device geometry (e.g., number of channels, number of memory dies, number of memory dies per channel, number of erase units per die, number of pages per erase unit, page size, multilevel memory cell capability, multiplane capability) and similar items of information to the host system, and to have the host system make decisions as to whether to implement zones and how to configure those zones. As also referenced by dashed-line (optional feature) block 157, whether a storage drive has battery backup, whether it has a write buffer capability, whether a write buffer is configurable, backup power configuration, and other parameters, can also be reported to the host as part of this discovery process.

Discovered information can then be used, in some embodiments, to configure write buffer capabilities, as indicated by function block 161. For example, parameters such as indicated in block 163 can be used in allocating write buffer resources; as nonlimiting examples of this, information on the number of zones (or the maximum number of concurrently open zones permitted) can be used to reserve write buffer space (e.g., if by way of example, 10 concurrently open zones are permitted, each with a LBA size of 4 k, a page size of 16 k, the disclosed architecture could hypothetically configure write buffer capabilities to provide a three page depth for each of ten zones, and consequently to allocate write buffer capabilities to store up to 120 writes for unentangling, e.g., 12 LBAs per zone for each of the 10 maximum zones permitted to be open at the same time). Write frontier size can also influence this, e.g., continuing with the "ten open zone" hypothetical just presented, if four of the ten zones could be customized to permit a 2× write frontier (for example, these four zones and memory controller circuitry are configured such that two pages of data will be written at a time into these zones, in the form of consecutive pages in an EU, or striped across planes or EUs or dies, etc., as part of a unitary operation configured using the address space layout features described below), then the write buffer capabilities might be defined to receive and hold up pending writes for up to 168 LBAs at a time for unentangling. Still continuing with this hypothetical, if available battery power only would provide time to finish 120 buffered writes in the event of power loss, a designer might configure write buffering and/or the storage drive to only provide a maximum of 120 buffered writes, to avoid possible data loss, or to receive a greater number of writes with deferred write error assessment while providing early write completion reporting of only those writes that can necessarily be completed (e.g., early write completion reporting is limited to 120 accumulated writes). As indicated by block 163, information such as multilevel cell (MLC) or multiplane (MP) capability, measured error rate (based on storage drive error rate monitoring) or error probability can optionally be used to configure write buffer resources. The use of this information and similar information in configuring write buffer capabilities in the storage drive, and more specifically in a memory controller for a storage drive, permits allocation of just the minimum buffer space necessary to perform effective out of order write unentangling, thereby conserving valuable SDRAM resources (i.e., as indicated by function block 165).

FIG. 1B notes two other optional features that can be used in conjunction with this second set of techniques. First, as referenced by numeral 167, some storage drives can optionally provide for configurable backup power capabilities. For example, continuing with the hypothetical referenced above, if a configured write buffer is to receive up to 168 writes (for respective LBAs), and backup battery capacity both easily accommodates time needed to complete these writes in the event of power loss, and is also programmably adjustable, it is possible to ratchet-down the adjustable power features so as to conserve power and prolong backup system lifetime yet still provide the backup power necessary to protect essential functions and avoid data loss. A charging voltage, or super-capacitor capability can be programmed so as to only do what is needed to ensure power for these writes (e.g., for writes of 168 LBAs in this example). It is noted again in passing that these hypothetical examples are illustrative only, i.e., not all embodiments will feature zoned drives and, conversely, a typical zoned drive implementation might feature hundreds of zones or more. As a second optional feature (referenced by numeral 169), it is possible to create a zone that is reserved for SDRAM backup, e.g., such that SDRAM contents in the event of imminent power loss can be directly dumped into nonvolatile memory for reload into SDRAM and provide for lockstep resumption of operations when power is restored. Other capabilities, variations and related advantages will be apparent to those having ordinary skill in the art.

With these two general sets of techniques further introduced, this disclosure will proceed to provide additional detail on exemplary host system, storage drive and memory controller architectures, with reference to FIGS. 2A-4E.

FIG. 2A illustrates an exemplary storage system 231 having multiple NVM drives. In particular, a storage server operates as a host system 233 and receives requests for data or to store data, and optionally, requests for processing that data, from one or more clients 235. In the depicted system, there is a single host system, though of course it is possible to have configurations where there are multiple host systems and where interface mechanisms are used to arbitrate access amongst multiple requestors. For purposes of FIG. 2A, the depicted clients 235 each have respective applications 236 which generate the respective data-related needs. The clients can each be desktop or laptop computers, smart phones, pads or other devices, virtual machines, or other types of digital systems. Each client 235 sends requests to the storage server/host 233 and receives responses via a network, e.g., a local area network (LAN) or a wide area network (WAN) 245 such as the Internet. The storage server, in turn, manages plural drives, each of which can optionally be an SSD (e.g., a flash-based drive), such as drive 241. As seen in FIG. 2A, each storage drive has its own dedicated memory controller 239 (e.g., a cooperative memory controller and/or pseudo-expositive memory controller), labeled as "SSD controller" in the FIG., either bundled together as a single assembly or drive, or in a manner detached from memory (i.e., as a separate device); for example, drive 241 is seen to include a SSD controller 239 and nonvolatile memory 238. Note that in some designs, each drive can include more than one controller or memory controller integrated circuit, e.g., with partitioned memory management functions or tasks. To simplify FIG. 2A, a dashed-line box is shown only for drive 241. Each SSD controller 239 can optionally be a NAND flash memory controller and the flash memory 238 can optionally be a flash memory drive having one or more NAND flash memory devices (i.e., chips, dies or packages). FIG. 2A indicates that any number of NVM drives can be present, i.e., three are illustrated in the FIG. with ellipses indicating there can be a greater or fewer number of such drives. In one embodiment, only a single SSD is present (e.g., SSD 241) in a storage aggregate, while in another embodiment, two or more such drives are present. In yet a third embodiment, the various drives can be of heterogeneous types, e.g., either comprising NVM drives of different types (e.g., other than NAND flash), or including other types of drives (e.g., volatile memory drives such as one based on, without limitation, DRAM), such as implied by numerals 238' and 239'. Arrows 245 indicate that, if optionally desired, memory controllers 239 for the respective SSDs can be configured for peer-to-peer access. The memory controller for a given storage drive can optionally apply address translation (e.g., a flash translation layer or FTL) across an entire drive or on a basis restricted to a given logical or physical structure. For example, as described by the incorporated by reference documents, in a virtual scheme, the memory controller can transparently remap a virtual structure corresponding to a portion of a host system-supplied address to one or more dedicated physical structure (e.g., a virtual "block" can be mapped to one or more physical blocks in a manner transparent to the host system, e.g., where each of the one or more physical blocks are associated with only one virtual block). As will be discussed further below, address space layout (ASL) and virtual block device (VBD) techniques from the incorporated by reference documents can also be used to define zones or VBDs for one or more of the depicted storage drives.

The host system depicted in FIG. 2A is rooted in a storage server 233 that includes a host processor 149, which uses various buffers 251 under the auspices of the host software 253 to schedule and manage memory operations, including both memory transactions and, in some embodiments, memory maintenance operations. Each storage drive, such as SSD 241, is seamlessly managed as part of a storage aggregate 237, with the storage server/host 233 managing scheduling for all storage drives so as to avoid collisions between drive maintenance and storage-server-directed reads and writes. In this regard, the storage aggregate and the host system can be bundled as the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media. It will be understood by those skilled in the art that this description may apply to any type of special-purpose computer (e.g., file server or storage serving appliance) or general-purpose computer embodied as, or having, a storage server or portion thereof, or even to a virtual machine. Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements. The host system in this embodiment maintains a local translation table (e.g., virtual address translation table) 255 so as to access files which can be fragmented in multiple memory locations and potentially multiple storage drives. The storage server/host also optionally employs policy-based space allocation, supporting data- and media-characteristic-aware data placement across the entire storage aggregate 237. The storage server communicates with the clients 235/applications 236 via a network adapter 247 and with the storage aggregate 237 via a storage adapter 257 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (e.g., 241) over an IO interconnect arrangement, such as a conventional high-performance Fibre Channel serial link topology, NVMe over fabric, Ethernet, Infiniband, PCIe or, indeed, using any desired connection protocol.

The depicted storage server manages flash memory using a file system consistent with Open Channel and/or zoned drive specifications and designs; in one embodiment, the storage server (and each drive) supports multiple instruction sets, for example, able to operate in an accordance with more than one of Open Channel specifications, zoned-drive architectures, and conventional log-structured copy-on-write file architectures. Advantageously, the storage aggregate and/or each drive can be optionally operated in a manner that obviates need for an extensive FTL layer on the side of the SSD and that better distributes wear relative to conventional systems, as described in incorporated by reference patents. In one contemplated embodiment, each flash-based drive such as storage drive 341 has a memory controller that implements operations where either the host system or a controller specific to the given drive initiates maintenance, with the memory controller for the given drive locally tracking metadata that is used to trigger the maintenance; in one implementation, for example, the storage drive can send information to the host system that permits the host system to issue maintenance requests or to otherwise dictate timing of maintenance. In some embodiments, the host system can schedule and/or explicitly command maintenance in a given drive request on a fractional basis, in a manner where request issuance is scheduled at a time of the host's choosing, e.g., such that maintenance operations do not collide with queued/upcoming data accesses and/or other operations planned for the given drive. The memory controller IC for each storage drive can optionally compute EC information, so as to enable the storage server/host system to provide for cross-storage drive redundancy. Depending on system architecture, host system's software manages interaction with each such storage drive. This architecture provides for host-storage drive cooperation in managing NAND flash memory-based storage devices in direct-attached and/or network-attached storage environments. The storage server (in this case, the host system) can also advantageously manage wear distribution across multiple storage drives to help lessen wear to any one area of memory; for example, in the context of the wear-aware writes, the storage server can collect wear metrics for all flash memory managed as well as for other types of nonvolatile memory, if present, and can redistribute cold data using explicit requests to each of the storage drives where those requests call for a given drive to transparently move data at a specified address (i.e., without sending that data to the host) or to transfer that data between drives (e.g., optionally using peer-to-peer communication). The storage server can combine consideration of multiple drives and can allocate if desired new writes to a single drive only if needed to better distribute wear or conversely, provide for bins (e.g., distinct SSDs) with differently managed wear parameters as different endurance groups. Advantageously, the host system can also electively direct writes of data based on policy, for example, in a manner that avoids data fragmentation or in a manner that groups similar types of data together based on read-write characteristics. In one embodiment, each SSD memory controller 239 is rooted in a configurable architecture that depends on host capabilities, policies, or other considerations. For example, in such an architecture, if the host processor does not support host system-assignment of addresses for new writes, the host system configures each SSD memory controller to perform this function and to report back assigned logical, addresses as described elsewhere herein. As indicated by numeral 241, in one embodiment, the host system can be charged with detecting a planned or imminent power loss, and to assert a signal (e.g., an interrupt or request) that conveys information to one or more of the storage drives that power is about to become unreliable; as will be disclosed below, in some embodiments, a storage drive can use this information to complete writes in progress, back up internal volatile memory and take similar actions, so as to avoid data loss.

Figure 2B:
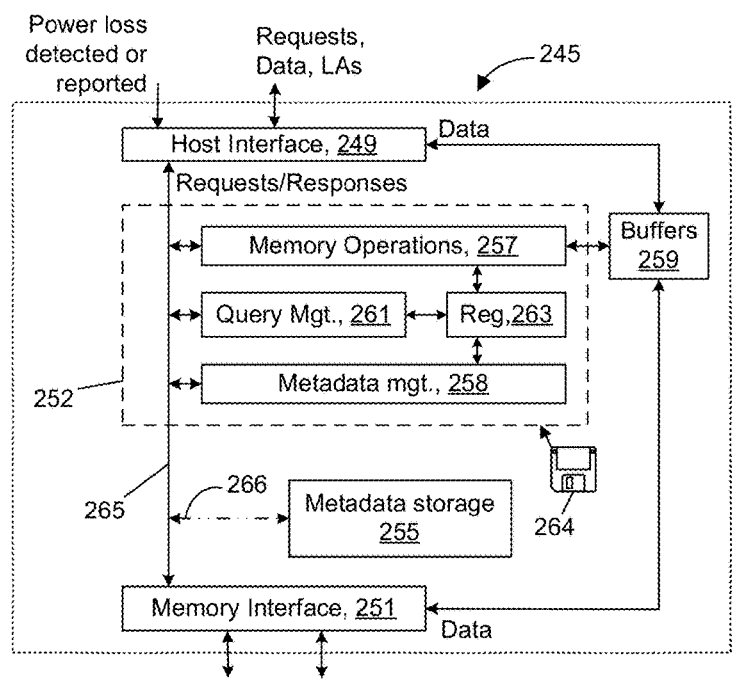
FIG. 2B is a block diagram of a memory controller 245.

It was noted earlier that in some embodiments, each storage drive—and its associated memory controller or other supporting circuitry, as appropriate—can be structured to perform cooperative functions that assist with maintenance for memory while minimizing request traffic between the host system and the storage drive. For example, a drive in some embodiments can track page or LBA release metadata, receive trim requests from the host system and generally assist with the performance of ensuing maintenance; as noted elsewhere herein, for zoned drives, Open Channel-compliant systems, and other architectures where logical address (LA) overwrite is prohibited, this operation is generally contrary to conventional wisdom. FIG. 2B helps illustrate layout of a cooperative memory controller, with an emphasis on query support, command processing and metadata management. In particular, a memory controller 245 can optionally be implemented as a monolithic integrated circuit. As before, a host interface 249 is used to receive requests and data from a host system and to transfer various responses and read data to the host system, and a memory interface 251 is used to issue commands to and to transfer data to or from one or more flash memory devices (not shown in FIG. 2B). Note that in this embodiment, a single path is illustrated as coupling the memory controller with the host system, for packetized exchange of requests and data; that is, the host interface can include logic that extracts requests and data from packets, and can also packetize read data, alerts, metadata and other communications for transmission to the host system. Other implementations are also possible, for example, using separated request and data busses. In the scheme depicted in FIG. 2B, it should be assumed that the host interface has a high speed serdes interface, such that communications with the host occur over one or more differential signaling paths, for example, compliant with a PCIe, SATA or other signaling scheme. Note that one or more flash devices can be copackaged with the memory controller, and thus the memory interface 251 does not necessarily have to use the same signaling scheme as the host interface, e.g., communications can be via wide-bus single-ended communications, using separated command and data busses.

The host interface 249 separates requests from any packets received from the host (as necessary) and routes these requests over a request bus 265 internal to the memory controller. Generally speaking, requests will relate to memory operations (e.g., reading or writing of data) or to queries for data and memory management functions. To this effect, separate logic blocks within the memory controller are dedicated to each of these functions. A memory operations logic block 257 manages operations involving the memory device. For example, as is well-known, NAND flash memory typically utilizes incremental programming—that is, array control circuitry for a flash memory device (die) uses a minimum programming voltage, and results of programming are checked against contents of a write data register within the memory chip in question to determine whether those results are correct. This is performed using a "program-verify" (P/V) cycle having separate "program" and "verify" phases. During validation within a memory device, a programmed page is typically sensed and an exclusive-or function is performed with contents of a write data register of the memory device; for any bits that remain set, programming has not been effective, so the programming voltage is raised and the process repeated in a second P/V cycle. This process typically continues until proper programming has been achieved or some limit has been reached, the latter case resulting in a write error. Thus, where the memory type in question is flash memory, the memory operations logic block 257 issues commands for programming using internal buffers 259 and awaits a free/busy signal assertion, time out, or other indication that a command (and any associated incremental programming) has been completed; where other memory types are involved, the memory operations logic block 257 handles memory cell and array control functions endemic to the specific type of memory involved. Taking a further example, since some types of flash memory dies can include multiple planes per array, the memory operations logic block 257 optionally uses multiple buffers, for example, with one dedicated to each plane or with buffers assigned on a rotating basis for individual requests received from the host system, to stage writes of data. The memory operations logic block can also manage any functions of reporting write error and consequent remapping of data, as well as updating of any L2P mapping information (if address translation is used). When, and as operations are completed (including new writes of data for example, and associated update of a write pointer for a given zone), metadata management logic 258 updates metadata in storage 255 to reflect new status. Note that this metadata or updated information can be part of a much larger class of metadata maintained by the storage drive, e.g., indexed by LA, LBA or PA; see, e.g., FIGS. 3C-3D and the accompanying discussion below for examples on types of information that can be tracked using this storage.

Requests from the host system relating to the return of query information (e.g., synchronous operations as described in the incorporated by reference documents) or the setting of an operating mode (e.g., asynchronous operations) are sent to query/management logic block 261. Generally speaking, for the depicted embodiment, the host system can request (a) return of raw information for the entire memory space managed by the memory controller, or for specific zones, address ranges or EU ranges, or (b) processing or filtering of that data by the memory controller. For example, in some embodiments, the memory controller can be provided with logic operable to receive and interpret host system queries seeking lists of blocks, e.g., the "top three zones" that are candidates for garbage collection, ranked in order of page (under) utilization (e.g., smallest percentage of currently valid data relative to overall capacity). Since the purpose of such an operation is to identify address space for erasure and/or zones that can be reclaimed, a storage drive/memory controller receiving such a command interrogates the metadata storage to (a) identify address ranges that are at least partially in use (i.e., the range is not currently erased and is capable of receiving writes), (b) identify the extent of page utilization for each such space, and (c) order a set of zones, ranges or structures that are candidates for erasure in the order of greatest number of released (or otherwise not used) pages. The query/management logic block 261 uses internal registers 263 to manage functions like this and, when the requested processing is complete, the query management logic block sends a reply message to the host system with the requested information. Note that the host interface 249 includes buffers that receive this data and queue the data for transmission to the host (e.g., as a reply packet that may be distinguished from a read request response which for example conveys read data). The mentioned example is only one type of query that can be processed by the host system, i.e., there are many types of requests and queries that can be processed by a memory controller, depending on embodiment, for example, queries related to wear metrics and/or persistence, age, write cold data, read hot data, or other types of information. For example, as referenced previously, a cooperative memory controller can track hot/cold data and can identify associated logical or physical addresses, and can sort and provide prioritized lists to a host system (e.g., the top ten "hottest" logical address pages in terms of read disturb potential or the top ten least or more worn EUs or physical pages in terms of wear); such a memory controller can even identify (and sort) wear on the basis of logical address for memory locations which store associated data. A skilled designer can implement any type of management processing desired. This request is an example of a synchronous query, because data is on-hand for the storage drive, and because the storage drive returns requested data as soon as its query processing is complete. In a simplified case, the host system can request return of raw metadata (e.g., all data or data of a specific type for a specified address). For asynchronous queries or functions, the host system typically provides a parameter (such as a mode setting and/or a host system-selected threshold of some type) and the memory controller then operates a continuous or intermittent process to check for the specified condition; when the condition occurs, the memory controller immediately alerts the host system, typically providing information that triggered the alert (such as a name of the zone and/or associated metadata pertinent to the function being tracked). That is, if the condition does not occur, there is no responsive alert sent to the host system, and the condition is monitored for occurrence at any time in the indeterminate future. As should also be apparent, sophisticated queries can be run that involve multiple metadata parameters. For example, a host system might request an alert any time a partially written zone simultaneously reaches a specific page utilization threshold (e.g., less than 50% of written space in that zone is "valid") and has a time since last data access greater than a second threshold, or that has a predefined relationship (e.g., a percentage) of released physical pages to active physical pages, and so forth. Many examples of asynchronous processes are possible and will no doubt occur to the skilled memory architect. Once again, any suitable thresholds or modes are stored in registers 263.

A media icon 264 is depicted to indicate the use of software or firmware by the memory controller. The memory operations and query/management logic blocks 257 and 261 and registers 263 are all depicted within a dashed-line box 252 denoting that, in one implementation, these elements can optionally reside on a single die (e.g., a single processor or coprocessor); in such an embodiment, the media icon 264 typically denotes the use of firmware, for example, stored in memory within the single die in question. In this regard, such firmware can be designed to respond to vendor-specific NVMe extensions to implement specific query/management functions. For example, any desired asynchronous query can be implemented as a function call supported by firmware; when the asynchronous command in question is triggered, it is run as an open process in the die (252) or a coprocessor dedicated to the query/management functions. Alternatively, many processors can be provided, each being assigned queries/asynchronous processes as they are invoked. As implied earlier, a specific asynchronous process can be associated with a mode set by the host system; for example, in one mode defined by the host system, the memory controller can automatically alert the host any time it identifies a space reclamation (garbage collection) candidate, based on default or host system-identified parameters—in a second mode, this function is turned "off." Note that in the future, newer versions of standards such as NVMe can be structured so as to inherently support generic command calls consistent with the operations discussed above. Note again that "cooperative" memory controller functions are not required for any particular embodiment; for example, it is possible to have an architecture consistent with the principles disclosed herein where a memory controller tracks metadata (e.g., page release metadata) purely as a response to host system-issued trim or overwrite operations, and to have the memory controller transparently manage issues such as garbage collection (e.g., with reporting back to the host system of any addressing changes).

The metadata storage 255 is indicated as separate from dashed-line box 252, reflecting that the metadata storage optionally can exist independent of the processing logic, e.g., on a separate die. That is, in one embodiment, the metadata storage consists of nonvolatile memory, such that it is persistent in through power cycling. In another embodiment, the metadata storage can exist in SDRAM (e.g., internal to optional die 252), with data switched to nonvolatile memory and loaded back again in response to power cycling. In still another embodiment, as denoted by optional connection path 266, the metadata storage can be read directly by the host system, i.e., via a form of requests for direct memory access. In such an embodiment, the host system simply reads a special memory location which it knows will contain metadata for a specific zone, EU, address, address range, etc., or for the storage drive as a whole. Once again, while illustrated in the context of a generalized drive or memory controller, cooperative functions and supporting logic and infrastructure can also be applied to other memory controller designs, particularly for NV memory types.

As noted above, in some embodiments, to support efficient handling of out of order writes, a drive and/or memory controller can include logic to specifically handle such writes without necessarily generating an error indication for presentation to the host system. The buffers 263 can generally be implemented in the form of SDRAM and can include an enlarged buffer capacity for each zone in active use. In one embodiment, memory operations logic 257 can configure associated features dependent on capabilities of the storage drive in question; in order embodiments, the host system can perform a discovery operation to understand the characteristics and capabilities of the drive and can configure registers 263 (e.g., mode registers) so as to provide these advanced features. For example, if supported by the drive, a large buffer space can be used for each zone (or in aggregate for the drive) with instructional logic storing received write requests in the write buffer with a predefined or dynamically-calibrated (configured) pipeline delay built into processing—a decision as to whether a write request is "out of order" is deferred until the request is processed by the drive following this delay time, e.g., thereby permitting latent receipt of missing write requests and potentially avoiding the need to report errors that are easily remedied to the host system; instructional logic effectively maintains a queue depth for received requests and reorders those requests to the proper order, with requests having a LA which matches the write pointer for the current zone being processed at the end of the pipeline delay and with an error indication otherwise being generated. In an optional embodiment—because SDRAM or other volatile storage onboard the drive might be scarce—a calibration routing is run to identify an optimal (but not excessive) write buffer depth, zone-by-zone, so that write buffer space is efficiently allocated to support storage system needs. Write buffer management techniques for an exemplary drive will be discussed further below.

FIG. 3A illustrates an embodiment of a storage system 301 including a memory controller 303, host system 305 and memory 307. In the illustrated embodiment, the memory controller is structured to cooperate with the host system 305 in the control of the memory 307. The memory controller 303 has at least one first interface 309 to exchange requests and data with the host system. Although two such interfaces and corresponding transmission paths are seen in FIG. 3A, these interfaces may be combined (e.g., with communications occurring via a packet-based transmission scheme). The requests generally relate to operations in memory such as read and write operations, although requests can also be directed to the memory controller 303 to assist in memory maintenance functions and to configure the memory controller (and/or a storage drive). In one embodiment, the requests and signaling protocol are compatible with one or more standards, for example, with Non-Volatile Memory Express (NVMe) or the Small Computer System Interface (SCSI) (in the case of commands) and Peripheral Component Interconnect Express (PCIe) or Serial-Attached SCSI/Serial ATA (SAS/SATA) (in the case of signaling formats); without limiting the foregoing, as noted earlier, in one embodiment the memory controller 303 and memory 307 (in this case, flash memory) can be bundled together (i.e., as storage drive 323) and can be a "zoned" storage drive or a storage drive that is compliant with one or more versions of the Open Channel specification, or both. The memory 307 generally has one or more arrays of memory cells and array control circuitry that may support one or more planes, banks, dies, channels or other physical and/or logical structural elements depending on design. Each array in turn has one or more subdivisions of memory cells for which subdivision-specific state and/or other metadata will be tracked by the depicted memory controller 303 and, more specifically for the case of an architecture that prohibits LA overwrites as introduced earlier, for logical subdivisions of memory (for example, by zone, LA, LBA, and so forth). The memory controller in such an embodiment tracks the metadata for each of multiple logical subdivisions of memory in a hierarchy managed by the memory controller, optionally at each level of the hierarchy, and as before, such metadata can represent hot/cold status, age, read frequency, back references and many other types of information, as discussed more fully in the incorporated by reference documents. Note that this information stored by or organized according to zones or virtual block devices ("VBDs," for example, as discussed by incorporated by reference US Patent No. 9542118). For example, hot/cold status can be used by the host and/or memory controller for an affected storage drive to steer write data to one zone or another, or one block device or another, within the drive; "data stripes" can also be managed on the basis of metadata (e.g., hot/cold status). In embodiments where the memory is flash memory and the memory controller is a flash memory controller, each block device can be optionally defined on a customized basis to include (and have boundaries demarked by) one or more physical and/or virtual channels, dies, banks, arrays, planes, erase blocks or units (EUs) or write units (i.e., physical pages of memory cells), and each block device can have one or more zones. In one specifically contemplated embodiment (discussed below), block devices can be defined to provide performance isolation, with block devices being associated with mutually-exclusive die sets; zones can optionally be defined in association with mutually-exclusive sets of EUs (e.g., with zones being striped across dies, and with zones optionally being associated with respective zones, on a mutually-exclusive basis). Note that these specific relationships are not required for all embodiments.

The memory controller in this embodiment tracks subdivision-specific metadata using internal storage 311. In one embodiment, this storage can be implemented in volatile memory such as synchronous random access memory (SDRAM) or other internal RAM; in another embodiment, this storage can be implemented as non-volatile memory, for example, electronically-programable read only memory (EPROM) or an internal flash array, or can be implemented using both volatile and nonvolatile arrays. This same memory (e.g., internal SDRAM) can be used for the memory controller's various data processing operations including temporary storage of either write or move data and for other maintenance functions. As denoted by reference numeral 313, the internal storage retains information for each logical subdivision of the memory governed by the memory controller, at any desired level; for example, in some embodiments where the memory 307 is a NAND flash memory, the storage can retain information for example for each zone, each VBD, each channel, each die, each EU, each LBA, and/or each physical page of the flash memory (e.g., VBDs 1-i, channels 1-j per VBD, dies 1-k per channel, EUs 1-m per die, pages 1-n per EU, and LBAs 1-o per page, as variously indicated by reference numerals 312, 313 and 315 in FIG. 3A) for all flash memory managed by that memory controller; these numbers i,j,k,m,n and o do not have to be homogeneous throughout the flash memory, e.g., one zone or VBD can span 4 dies or channels while another can span 1 and, similarly, the number of dies per channel, EUs per die, pages per EU and LBAs per page can vary for each storage drive and for each zone within a storage drive. For example, depending on manufacturer and design, there can be 128-256 pages per EU, with each EU corresponding to a substrate well, and each page corresponding to an independently controlled wordline for memory cells tied to that substrate well, and metadata can be tracked at any of these levels or on an aggregated basis at some higher tier level (e.g., by zone). The metadata tracked for each subdivision can encompass information representing physical state of memory and/or representing storage of data in an associated location. For example, physical state metadata can include without limitation information regarding the physical state of associated (virtual or physical) hierarchical elements of the memory, for example, wear of a memory location corresponding to a logical address, whether constituent elements are erased (rendered writeable) or have been written to, and so forth; the metadata can instead or also represent characteristics of the data stored at a given location, for example, back references, data age, hot/cold read or write status, release information for the location (i.e., signifying that data is trimmed or stale), EC information/parity information, and so forth. When data is moved between locations, the metadata associated with the data can optionally be moved to or otherwise associated with a new table location to correspond to the new destination (e.g., a new destination logical and/or physical address). Similarly, in other embodiments metadata (e.g., describing state of the memory location itself) can optionally stay with the old memory location; for example, the metadata can be indexed to physical address, but it can also be moved or linked to a logical identifier from which such a location (physical address) can be derived. The memory controller also has logic 317 that performs various functions; for example, the logic 317 can be configured to send to a host system either some or all of the "raw" information retained in the storage 311, or derived or processed information based on that storage 311. This logic for example can include circuitry within the memory controller adapted to respond to host system requests seeking specific metadata; alternatively, this logic can also include circuitry that applies pertinent filters or comparisons and that notifies the host system when a tracked metric meets an assigned threshold. This information or an alert representing a particular condition can be transmitted to the host system via the at least one first interface 309, via a dedicated connection or via a backplane connection. As will be shown below, the logic 317 can also comprise circuitry and/or instructional logic to assist with offloaded functions from the host system and to perform various other functions cooperatively. For some embodiments, the logic 317 can also perform functions such as address translation (e.g., at any one or more structural tiers within the memory) and write and read (i.e., data access) control and/or address assignment and various maintenance operations, and it can send associated commands to memory dies via a second interface 319 in order to accomplish these various functions.

Several configurations are also represented by the embodiment of FIG. 3A. First, per numeral 323, as referenced earlier, the memory and memory controller can be configured as an integrated drive, e.g., as an SSD. Also, such an implementation can also feature a power source 308 including components/circuits to provide for emergency power (or prolonged power) in the event of a detected power failure; for example, embodiments will be described below where backup characteristics of a drive can be discovered, and where write buffer size can be configured based on those characteristics; for example, these embodiments can potentially perform regulation of write buffer depth to a level that permits any queued writes to be completed when an imminent power loss event is detected. As noted, the memory controller 303 can once again be designed as a standalone integrated circuit, with the host system 305 and the memory 307 also each implemented as one or more discrete integrated circuits (e.g., the host system in the form of a host processor). It is also possible (as represented by dotted-line box 325) to combine the memory controller 303, the host system 305 and the memory 307 as a single system, for example, a network-attached storage system or a storage system adapted for connection with another digital system (e.g., via a USB, PCIe, SATA, NVMe, Ethernet or other standard signaling protocol). Finally, as represented by reference numeral 326, cooperative management functions can be embodied as instructions stored on non-transitory machine readable media, for example, for use in controlling a host processor, memory controller or other circuit. That is, software or firmware can be used to control actions of a host system, memory controller or other circuits.

As noted above, metadata can be tracked on the basis of each one of multiple zones 312, for example, representing a write pointer (whether the zone is "full" or has been opened and is partially written to, and so forth), regarding the aggregate number of written to pages that have been released (i.e., trimmed), and other data, such as wear, average age of data, and other forms of information. This information can optionally be tracked at a lower level for the given zone, for example, at the level of each erase unit as represented by numeral 313 (according to principles taught herein, each zone can be demarked according to units that align to discrete EU boundaries in physical memory, on a mutually-exclusive basis, with each zone being as small as one EU or potentially being many EUs). It is also possible to store information on the basis of each page or LBA, as referenced by numeral 315, e.g., once again including write cold status (e.g., age since last write), data access frequency, release status, and so forth.

FIG. 3B shows an example where each zone can be defined in a manner such that it corresponds to a number of one or more channels 328, and for each channel, to one or more dies 327 on that given channel, and then to one or more EUs (i.e., 313) on the identified channel(s)/die(s). In some embodiments, zones can be defined in a manner where they map to all pages (i.e., 315) associated with each of these EUs and each LBA 316 associated with each of these pages. Again, these structural associations are not required for all embodiments; in some embodiments, EUs are associated with only one zone on a mutually exclusive basis, while in other embodiments, a single EU can be defined so as to have two or more zones. As denoted by numerals 329a and 329b, tracked metadata can include either or both of physical state metadata ("phyMD") and data characteristic metadata ("dataMD").

FIG. 3C provides an example of some types of state metadata that can be stored in a manner indexed to or linked to physical address or physical structures (e.g., to erase unit, die, plane, physical page, and so forth). For example, a metadata entry can include: state 331 (i.e., physical condition of the cells, such as whether one or more cells associated with the location are bad, or cannot be corrected given any resident error-correction scheme), status 332 (whether the location is virgin, i.e., erased, holds active data, or represents "released" data), and wear 333 (e.g., including information metrics such as erase count, programming count, bit error rate, or other measures associated with memory location lifecycle). Note that this information can be retrieved for a specific LBA so as to, for example, select target destinations for new writes (e.g., to perform wear leveling). Metadata can also including information indexed by physical address location, but tied to the data stored at that location, for example, data age 334, read count 335, LBA 336 (i.e., logical address of the data used by the host to address that data), storage location release (e.g., page release information) 337, a bitmap that identifies state for one or more lower hierarchical storage levels, 338, a remap flag 339 (e.g., indicating that data for a given LBA has been remapped or moved), a timestamp 340, read frequency 341, write frequency 342, a hot-cold data status identifier 343, one or more back references 344 and/or other information 345.

As mentioned earlier, metadata can also characterize the data stored at a memory location and be tied to (e.g., move with) a set of data. In this regard, FIG. 3D shows an example of some types of metadata that can be stored in such a table, e.g., for each logical block address (348) or other unit of hierarchy in a logical addressing scheme. For example, such metadata can include, without limitation: data age 349, read count 350, LBA 351 (i.e., logical address of the data used by the host to address that data), page release information 352, a bitmap that identifies state for one or more lower hierarchical storage levels, 353, a remap flag 354 (e.g., indicating that location for a given LBA has been remapped or moved), a timestamp 355, read frequency (or age since last read) 356, write frequency (or age since last write) 357, some other hot-cold data status identifier 358, one or more back references 359 and/or other information 360.

As with the other FIGS. discussed above, each of FIGS. 3C-3D should be understood as providing non-limiting examples only, that is, not all of the listed data must be maintained by a memory controller, and each identified field should be viewed as optional. Similarly, there are also many other types of tasks beyond those tasks illustrated in the various FIGS. and beyond the metadata specifically exemplified in FIGS. 3C-3D, which can be used.

Figure 3E:
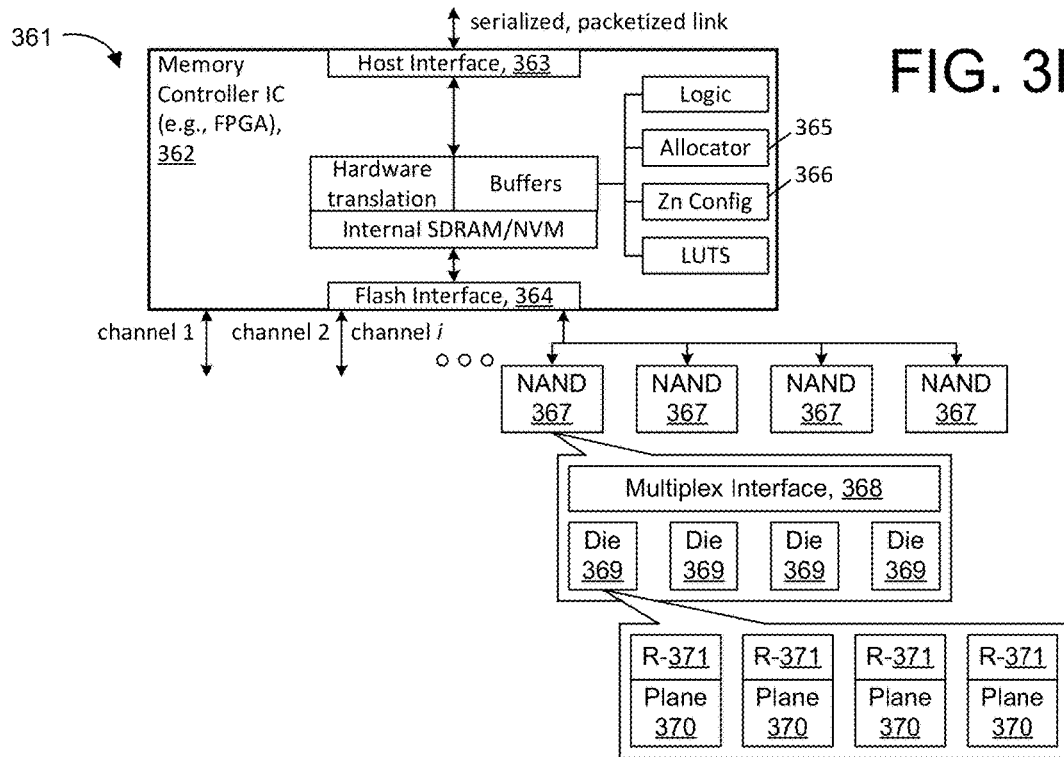
FIG. 3E is a block diagram of a SSD.

FIG. 3E shows an exemplary layout of a system 361 having a memory controller, for example, embodied as a discrete integrated circuit (IC) 362. As noted by the FIG., in one version, such an IC can be implemented as a field-programmable gate array (FPGA) having logic gates and lookup tables (e.g., circuitry) configured to provide fast address translation as discussed above; this is not required for all embodiments, and in other contemplated embodiments, a memory controller can be implemented as a special purpose processor or other preconfigured integrated circuit, with or without the use of support software (e.g., firmware). As depicted by the figure, the IC includes a host interface 363, which for example, uses a standard communication interface framework (e.g., non-volatile memory express, or NVME or Serial ATA) for packetized communications, where packets comprise commands, address and data, as appropriate; note that this interface can be shared for commands directed to different channels or devices, i.e., the commands and data to respective channels and/or dies are typically MUX'ed over this channel for exchange between the memory controller IC and the host system. The depicted memory controller features a flash interface 364, whereby one or more channels are used to communication with one or more memory devices. Each channel (e.g., 1, 2, . . . i) can consist of a set of links for address and/or data (e.g., for packetized communication of address and data over a set of eight links), or can feature separated address and data busses (as depicted by the optional, dashed-line links designated for "data"). The memory controller IC also optionally features hardware translation circuitry or address assignment circuitry as mentioned (e.g., with ASL parameters being used to configure address wrapping and distinction between hierarchical levels and with LUTs used for address mapping at selected or predetermined levels of the hierarchy) and buffers for buffering commands, write data and/or data transfer as appropriate. In addition, the memory controller IC in this embodiment can include supervisory logic for performing various functions. For example, in one embodiment, the memory controller (and consequently a storage drive having such a memory controller) can include circuitry or some other form of allocator logic 365 to assist with allocation of zones and/or block devices, for example, for optionally configuring memory to support a designer-selected number of zones and or zone sizes (width, depth and/or other parameters), and for opening, managing and closing zones that are supported; zone configuration information, once defined, is stored in one or more status registers referenced by numeral 366. In some embodiments, this configuration is performed by the host system (which directly programs these registers). For implementations in which zone sizes and numbers are not configurable, for example, where hardwired as part of a precast architecture for a given design, the depicted allocator logic only supports zone active management including opening and closing of zones. For example, as will be referenced below, there can potentially be hundreds to thousands of zones in a given implementation, with some zones not yet open (i.e., they are "closed" and are not actively managed when in an erased state until they are first written to), some zones full (i.e., the zone is completely written to such that no more free space remains, and consequently these zones are also "closed"), and some zones in the process of being written to (these zones are actively managed and are allocated "live" write buffer space); where the number of zones supported by the storage drive is large, the allocator logic, 365 opens and closes zones and assists with related management functions. The various depicted logic items also generally assist the storage drive in responding to host queries, performing LUT updates, and configuring parameters as appropriate, as well as for controlling sequencing and maintenance operations in memory). In one embodiment, some or all of these functions can be implemented in the form of instructions stored on non-transitory machine-readable media (e.g., firmware or software, for controlling one or more cores or processors). To perform input/output (IO) operations, controller firmware interacts with the depicted flash memory interface 364 to translate various host system-issued requests into flash memory operation commands, with these commands being transmitted by the memory controller via one or more channels to one or more memory dies on each channel. In this embodiment, the flash memory consists of one or more NAND storage devices (e.g., integrated circuits) 367, each coupled to the flash memory interface 364 via a multidrop channel, in this case seen as "channel i." Each NAND device 367 includes a multiplex interface 368 that connects to one or more co-packaged dies 369. Each die can have one or more planes 370, each with independent control and data registers 371, so that each die is capable of performing multiple IO commands simultaneously. Note that LBAs and even zones can be striped across multiple planes (or dies) if desired for the particular implementation. For example, using the techniques of this disclosure, it is possible to write a set of LBAs across planes by ensuring physical addressing of pages written to respective planes in a manner consistent with device multi-plane addressing limitations; such a scheme, if used, permits reading of related data at the same time, for example, by simultaneously reading all planes associated with a given set of memory cells.

Figure 3F:
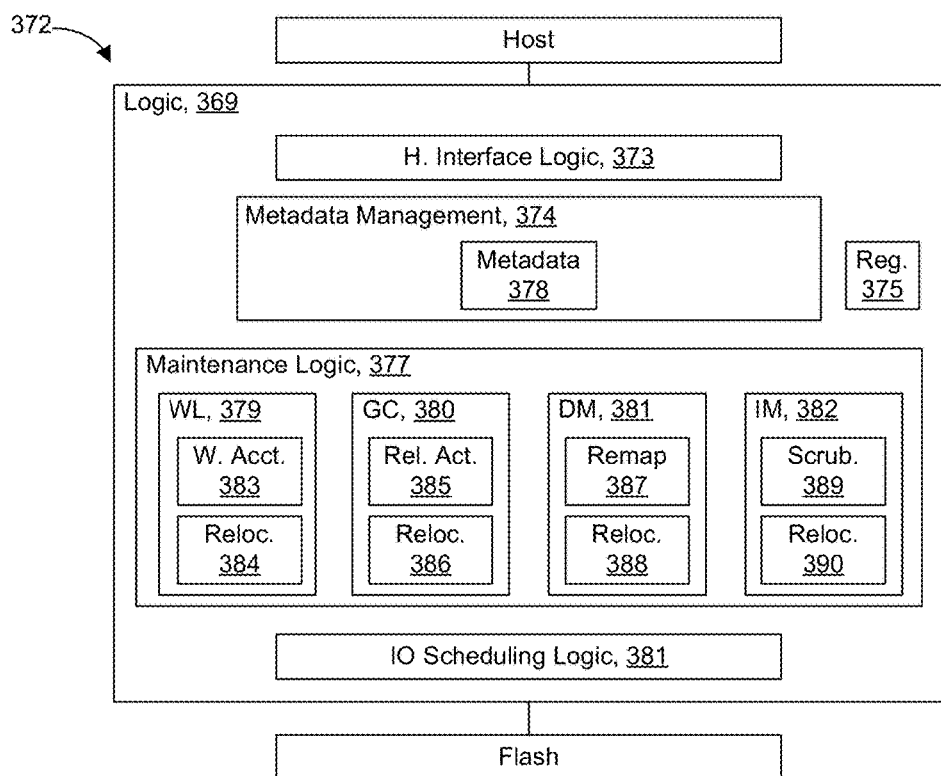
FIG. 3F is a block diagram showing logic functions of one embodiment of a cooperative memory controller.

FIG. 3F shows a block diagram of a flash memory controller 372, for example, used as controller 245 from FIG. 2A; more particularly, FIG. 3F is used to show how logic functions can be implemented using hardware and firmware logic 369. This logic 369 supports a number of optional processing features. In one embodiment, this memory controller uses this logic to perform many traditional flash controller functions (e.g., management of an FTL and associated search trees). This is to say, while one advantage of a cooperative memory controller is the substantial reduction of FTL layer functions, this is not required for all embodiments. In another embodiment, the memory controller 372 implements comprehensive cooperative functions that help reduce the need for complex FTL processes, as referenced above. As noted earlier, the memory controller 372 can use the various identified structural elements to maintain hierarchy-specific information for all units of memory governed by that memory controller.

For the embodiment of FIG. 3F, logic 369 is seen to have a number of basic function blocks, including interface logic 373 to interact with the host system using packetized or unpacketized commands and responses, logic 374 used for local metadata management, registers 375 for storing ASL tables and FTL information and other operational parameters (as will be described below), maintenance logic 377 used for query processing and other management functions, and IO scheduling logic 381 used to manage memory transactions (e.g., program and erase operations). As noted earlier, even in an embodiment where it is desired to substantially reduce the FTL layer, a memory controller can still optionally implement some address assignment and/or translation, on the basis of a given structural level and structures being accessed at other structural levels. The metadata management logic 374 maintains locally-stored information in the form of metadata 378, as mentioned, for each unit of storage or subdivision of capacity provided by the storage drive. As noted, in one embodiment, this metadata can also include information on data storage or memory structure state. The maintenance logic 377 receives requests from the host system directed to general configuration of memory operations and related to queries. Generally speaking, this logic runs queries on the metadata, returning information to the host system as appropriate via the host interface logic 373. The returns to the host systems can be immediate returns to synchronous commands and immediate or later responses (or alerts) to asynchronous commands. Exemplifying some command options, the command logic can (a) serve information up to the host system drawn from metadata 378 for use in the management of zones and targeted writes to specific zones, (b) assist with wear leveling (WL), garbage collection (GC), data management (DM), and/or integrity management (IM), (c)assist with servicing of other functions in memory.

An exemplary memory controller can assume varying levels of host system support in a manner that can be customized to any specific memory system design. That is, memory controller 372 possesses dedicated logic infrastructure to perform WL, GC, DM and IM functions (379, 380, 381 and 382, respectively), each of which can be tailored to a specific level of interaction with the host system pertinent to the specific implementation. Depending on the desired level of interaction, the memory controller 372 helps avoid the need for remote storage and retrieval of large address translation tables and the use of complex search trees; for example, address translation can be performed using a greatly simplified address translation table or omitted in the memory controller entirely. In addition, the configured level of cooperation can advantageously permit a host system to directly assume scheduling of many flash management functions that might interfere with (i.e., compete with) host system-directed writes, such as garbage collection, data relocation, wear leveling and so forth. That is to say, an architecture will be described below that permits a memory controller to serve sophisticated information to the host system to assist with this scheduling. This, combined with less FTL overhead, provides for faster, more consistent flash response, and facilitates systems based on solid state (flash) drives (SSDs) as well as mixed or heterogeneous systems that combine SSDs with other memory types. Note that this is a nonlimiting example; for examples, the architecture described herein can optionally also support a traditional FTL design, or memory controller management of complex functions.

To assist with host system scheduling of flash management tasks, the memory controller can have firmware or hardware logic (or both) dedicated to specific types of host system requests and queries. In the embodiment of FIG. 3F, this structure is illustrated as optionally including logic to assist with wear leveling (WL), garbage collection (GC), data management (DM), integrity management (IM) (e.g., read-disturbed data relocation), and other functions, but other logic can also or instead be used. To support these functions, the memory controller uses maintenance logic 377 to manage space allocation and space reclamation, and otherwise to service host system calls for the return of management data. For example, this logic, depending upon embodiment, can identify for the host system available (i.e., available, erased) address space, candidates for erase (released space), candidates for data relocation and garbage collection (e.g., based on low page utilization), assistance with cold data location (e.g., wear leveling), or more general functions.

The memory controller can include wear leveling logic 379. That is, to account for a limited number of flash memory program/erasure cycles (typically on the order of tens to hundreds of thousands of cycles for NAND flash), the logic on board the memory controller can be designed to track wear as part of metadata 378 and to provide this information to the host system. If over time, certain units of memory are determined from erase counts to represent disproportionately high or low wear relative to overall memory, wear leveling can then be performed. Note that for embodiments where wear-aware writes are used, wear leveling can be highly localized, i.e., performed as a data relocation option simply to redistribute write-cold data. The memory controller 372 can generate alerts when predetermined wear thresholds are reached and can otherwise perform low level queries relating to wear leveling. In support of the techniques presented by this disclosure, the wear accounting logic 383 can keep a changing list of erase units, ranked in order of coldest data, least wear, greatest wear or in another manner. In one embodiment, this logic can be prompted via an explicit host system request to synchronously compile such a list or to asynchronously notify the host system of erase unit or zone (or other structural) identity any time a wear metric (e.g., an erase count) meets a programmably-defined value. Then, when and as wear leveling is scheduled by the host system, the host system issues a request to the memory controller to relocate write-cold data and erase the old space (e.g., using relocation logic 384), thereby redistributing that space into a pool of available space used for active writes (and potentially more frequently-cycled data). Note that in an embodiment where the host system directly addresses physical or idealized space and performs wear-aware address assignment, distribution of wear can be inherently minimized as part of the write process. However, disproportionate wear can still occur for data that is held for a long time and which is therefore deemed "write cold;" that is, cold data can keep erase units out of circulation while other erase units are more frequently recycled. The architecture presented in this embodiment supports memory controller cooperation with wear management through the use of "limited" data relocation and wear leveling processes (e.g., "fractional operations" directed only to specific address ranges within flash) as well as (if pertinent to the implementation), the scheduling and management of more extensive wear leveling, e.g., for entire flash devices or across multiple flash devices or drives.

Management of memory, particularly in systems that prohibit overwrite of logical address, can result in retaining old pages or LBAs that are stale. This is because data to be moved is typically written to a new logical address selected (at least in part) by the host system. This is also true for log-structured write systems, e.g., in the case of NAND flash memory, a given erase unit can have other pages that are still in use, and the old page location typically cannot be reused until the entire associated erase unit is recycled. Over time, substantial portions of memory can be locked up simply because a small fraction of space still stores data even though that space will not be relied upon to service read requests. To address this, the memory controller of FIG. 3F therefore uses garbage collection logic 380 to assist with functions of periodically consolidating data. That is, the garbage collection logic can track information pertinent to whether a zone or any associated structure (e.g., an erase unit) is mostly stale or is still efficiently being used and can process host system queries relating to this information, and it can use this information to assist with delegated garbage collection tasks and/or notification tasks for the host system. One form of associated tracked information is storage location release information and structural (or address range) utilization information, e.g., where the memory controller stores information indicating whether each page or LBA is available (erased but not yet written), has valid data (cannot be written to without an erase), or is released (a page with stale data that cannot be rewritten until it is first erased). Garbage collection involves accounting for released pages, for example, using release accounting logic 385 to track the mentioned page utilization information for each page (or other logical unit) for each erase unit (EU); EUs with relatively few used pages can have those pages consolidated with pages from other erase units having similarly low page utilization, with the then-concentrated valid data being rewritten to a new destination. In an embodiment where the memory controller tracks this information, the memory controller can compute an extent of page utilization (e.g., 10% valid data) and can provide this information to a host system with zone or other structural identity to permit the host system to decide which zones, address(es), structure(s), or address ranges should have data consolidated and moved. The host system can then schedule, or establish a maintenance window for, any resultant operation in a manner that does not or is unlikely to compete for needed read data elsewhere in the subject memory. Note that "utilization" as used herein generally refers to the extent to which pages (or other subordinate tier) of a given structure or address range are valid (in use) or are released (trimmed) or are otherwise not in use. For example, if most pages in a given zone were released or unused and only a few pages had valid data, the extent of memory utilization in the given zone would be low. Conversely, if most pages in a zone were in active use, the extent of memory utilization for the given zone would be high.

Once again, providing this structure in a memory controller architecture is optional. In other embodiments, the host system can directly assume responsibility for data relocation, wear leveling and so forth and can perform associated accounting functions. In other embodiments, this is done by the memory controller or on a joint basis by the memory controller for a given drive and the host system, working together.

In an embodiment where the host cooperates with the garbage collection task, the host can query the memory controller using a request, with processing of the request performed in cooperation with the release accounting logic 386. In more detailed embodiments, the release accounting logic can be designed to perform low level inquiries, for example, to return a list of zones where page and/or LBA utilization falls below a specific threshold (e.g., 50%). This type of function can also be managed as an asynchronous task, e.g., the host system can request that the memory controller alert the host system if at any time a zone that has had an LBA released or moved experiences less than a threshold level of memory utilization; in this regard, the release accounting logic 385 tracks explicit storage location release with each request information update, and can perform any processing necessary to alert the host system in response to any asynchronous queries, or to take actions managed by the drive/memory controller. The release accounting logic 386 also has circuitry and/or firmware that performs other forms of processing, for example, optionally providing a list of "the 10 best" candidate zones for garbage collection in order of memory (under) utilization. In another embodiment, some or all of the data relocation functions can be managed by the memory controller, for example, with relocation logic 386 being delegated specific tasks by the host system (such as the identification of erase units to the host system for relocation of data, or relocation of data in response to a host-specified target memory address). Once relocation has been performed, with respective metadata updated and associated LBAs and/or pages are released, the entire associated structure (e.g., the entire erase unit or zone is reclaimable). In one embodiment, this is performed by the host system, which issues an explicit Erase or Zone Reset request in a manner directed to a specified subset or range of memory unit—logic 369 processes this request and, once the request is completed, returns the freed erase unit to a pool of available erase units for future data allocation.

Data management logic 381 can support optional functions such as idealized addressing, address assignment, zone and/or VBD definition and management, and so forth. Integrity management logic 381 performs functions associated with data integrity and managing structures (virtual, logical or physical) in the memory; this logic handles in this embodiment handles EC information computation, bad block management and rebuild/recovery of EC information or underlying data, and/or notification or relay of EC information, as appropriate. More particularly, hot/cold data management can be performed by tracking data-specific metadata for the various structural elements of memory, in effect, to provide a form of wear leveling. In one embodiment, the memory controller optionally uses processes that periodically look for "old" data (that is, logical addresses that have not been written to for a long time, or that alternatively have a low read frequency), and remaps the stored data to a different memory location to effectively help distribute lifetime degrading memory rewrites throughout memory managed by the memory controller (or throughout a particular VBD), using processes similar to those described earlier; for example, the memory controller can send a notification to the host system, which the host system then uses to schedule a data move request, and then—at the scheduled time—issues that request to the memory controller to move the data from LBA x to LBA y, optionally all without the data ever having been sent to the host system. As alluded to earlier, such a request can also include an implicit trim operation (e.g., configured as a separate request or a piggybacked request, effectively releasing LBA x). Remap logic 387 can identify hot data, cold data, or other information (e.g., EUs having disparate hot/cold data characteristics), with relocation logic 388 being used to respond to host system requests and to update stored metadata (in the manner previously described). Note that these operations can also include relocations associated with possible read disturb issues. For example, if a read count or frequency for a given EU is high, this logic may decide to (as a consequence of comparing read count or frequency metadata with one or more thresholds) relocate affected data; note that the relocated data might not be specific data that was frequently read, but rather, might be other data sharing a zone, EU or other structure with frequently-read data. For integrity management, e.g., where errors such as bad blocks or ECC errors are detected, scrubbing and relocation logic 389 and 390 handle storage of data in alternate physical locations, swaps of reserved erase units (e.g., not forming part of the addressable space) to take the place of error-incumbered erase units, and similar functions.

As operations are performed in memory, whether as part of a management operation (such as data relocation) or in servicing write or read requests, relayed as one or more associated requests from the memory controller to a selected memory device, 10 scheduling logic 381 detects completion of the command. Pertinent information is added by metadata management logic 374 to the stored metadata 378, and the host system is then signaled with any completion codes and/or information returns as necessary. For example, if a data relocation operation has been performed, the metadata 378 can be updated with new information for both source and target blocks of memory.

Reflecting on the structures shown in FIG. 3F, or otherwise described above, a host system and memory controller for a storage drive can cooperate in the handling of a wide variety of tasks. These tasks can include, without limitation, a garbage collection operation, a data aware (e.g., cold data) relocation or placement, a host system commanded move or copy operation, and an erase operation, just to name a few examples, can trigger EC information computation functions as introduced earlier. Advantageously, use of a cooperative memory controller and host, as just described, and as described by U.S. Pat. No. 9,652,376, facilitates memory controller management of maintenance functions and off-load of processes that might be required by the host system, all in a manner that minimizes impact to needed host read/write bandwidth but still preserves compatibility with newer standards and architectures (e.g., such as zoned drives and Open Channel-compliant architectures).

Note that less than all of the various features described above need be used for any given implementation. This is to say, what has been described thus far is a drive architecture and/or memory controller architecture that can manage certain tasks for a host system—such as release accounting—and that can optionally perform other tasks, for example, running logic to identify opportunities for a host system to, at the host system's convenience (e.g., during a lull in activity), arrange for the storage drive to perform maintenance functions at a time selected or manipulated by the host system. These features are again not required for all embodiments.

With some cooperative drive architectures thus described, the present disclosure will now provide some added detail relating to optional zone configuration. Note that many designers may choose to select and/or design a storage system (e.g., drive) that features a predetermined number of zones and a predetermined zone size, in a manner not variable by a designer. Other embodiments permit a designer to interactively customize zones, for example, configuring the number, width and/or depth of specific zones in a manner tailored to different applications. One client (e.g., application) may require high data read bandwidth, and consequently, an associated zone might be linked to many parallel memory channels or dies, while another client/application might rely on data that is infrequently used or overwritten, and consequently, an associated zone might be linked to a single die on a single channel. FIGS. 4A-4E are used to introduce optional block device and/or zone configuration, and some related techniques relating to write buffer management and related customization. Generally speaking, in the specific embodiments discussed below in connection with these FIGS., it is assumed that there are one or more block devices, each defined so as to be associated with mutually exclusive die sets (e.g., so as to provide for optional performance isolation). The address space layout techniques described below can then be applied on the same basis for zones, e.g., each block device can have any number of zones defined, with zones defined so as to have mapped storage space in one or more EUs. Address space layout can be made to vary, even within a given block device, zone by zone, and individual zones do not have to use the same stripe width or write frontier as a block device, but can be any subset thereof. Again, these structural relationships are not required for all embodiments. In one contemplated implementation, each EU is mapped to at most one zone and, in other contemplated embodiments, there can be more than one zone mapped to an EU. In yet another contemplated embodiment, zone definition and usage can be performed in a manner compliant with zoned drive specifications, a version of the Open Channel specification, or otherwise in a matter compliant with architectures that forbid LA overwrite.

FIG. 4A illustrates an exemplary application and configuration of a storage drive, e.g., an SSD. In the particular embodiment shown, an interactive designer/allocator is executed within the storage drive, host system and/or separate computing circuitry to obtain storage drive geometry and performance characteristics and interact with a system designer (i.e., user, system architect or other human operator or programmed intelligence) so as to define and allocate one or more customized zones, optionally as subsets of performance-isolated storage regions within the storage drive. The depicted logic supplies parameterized descriptions of each allocated flash storage region to a host system which can interact with a flash drive (SSD) so as to define block device and/or zone attributes. Note that in one embodiment, zones can be hardwired into the drive architecture and, thus, the discovery process simply provides non-configurable zone descriptions to the host system. Other types of information can also be provided by this discovery process. For example, as depicted in the FIG., provided information can optionally include general storage drive or die-level performance information such as capacity, size, write bandwidth, read bandwidth, minimum transfer size, endurance information and other parameters; they may also optionally include number of channels, dies per channel, planes per die, EUs per plane, pages per EU, minimum erase size, zone information, whether zones are configurable, whether a write buffer is present and is configurable, instruction sets supported (e.g., Open Channel), programming time, read time, erase time, channel bandwidth, error rate, whether back-up power is available, battery parameters, whether multi-level cells (MLC) are present, whether multilevel cells and/or multiple planes can be configured to operate in single level/single plane mode, and many other items of information. In one implementation, for example, these various items ("geometry information") can be stored in a serial presence detect (SPD) register or equivalent or can otherwise be retrieved by the host system from the storage drive on request. In yet another embodiment, this information can be provided from a source other than the storage drive, for example, loaded from a separate library and/or retrieved from a network source, such as via an Internet link.

Still referring to FIG. 4A, and more specifically to the exemplary operational flow at 402, the depicted logic initially requests and receives geometry and performance data from the storage drive and/or a device library at 408. In the embodiment shown and a number of embodiments described below, the geometry information includes hierarchical topology information about memory and about zones supported by the storage drive and/or pertinent to the ability to define zones within the storage drive; if preconfigured zones and/or block devices are provided by the drive, the discovered information can include information about zone capacity, reserved structures (e.g., erase units used as wear replacements), zone size, frontier width and other features. As just referenced, this information can optionally also include (1) the number of independent access channels supported by the storage drive (or a die), with these channels also referred to herein as "signaling channels" or simply "channels," (2) the number of discrete flash dies coupled to each access channel, (3) the number of erase-unit planes (or "planes" for short) within each flash die, (4) the number of erase units within each plane, (5) the number of pages per erase unit and (6) the storage capacity of each page. This information can also be optionally provided or organized on the basis of block device or zone; alluding to a hypothetical example that will be provided below, information might be provided that indicates that four dies on one channel are uniquely assigned to a particular block device, and within that block device, a first zone has a striping width of four pages across four separate EUs and a striping depth of one EU, while a second zone has a striping width of a single page but with a striping depth (address depth) of four EUs. In general, each of the device geometry parameters may be a physical (i.e., actual) or pseudo-physical representation of the corresponding underlying hierarchical structure (e.g., channels, dies, planes, erase units, pages and/or LBAs). Performance data, which may be viewed as an optional part of the geometry export, may include for example and without limitation, (a) the nominal programming time of a physical page within the erase unit of a flash die (i.e., "tPROG" also referred to herein as the page write time), (b) the nominal read time of the physical page (tREAD), (c) the nominal time required to erase contents within an erase unit (tERASE), (d) the data transfer bandwidth over an individual access channel (Chan BW), (e) the data transfer bandwidth of the host interface (H-Intf BW), (f) various performance enhancement/optimization functions that may be available (e.g., multi-page functionality, read caching, write caching, etc.), and so forth.

As indicated at the upper right-hand side of FIG. 4A, the depicted logic determines the available block device and/or zone profiles (i.e., physical and performance characteristics of different configurations of physical resources within the storage drive) accounting for any pre-existing allocations. Assuming that no zones/block devices have been allocated at this point and thus that resources sufficient for further definitions remain within the storage drive (i.e., negative determination at decision 403), then the depicted logic displays (e.g., in a visible display or other user interface of the computing device in which the block device allocator is instantiated) available zone/block device profiles and the allocable quantities of each as shown at 404, prompting the user/designer to select one or more profiles and their desired allocation quantities. In one embodiment, block devices can be allocated first with a designer then looping back to define one or more subspace definitions for each block device as one or more zones Upon receiving user input specifying a quantity of zones/block devices having a given profile (and possibly multiple different profiles and respective quantities), the allocator prompts the user/designer to specify, for each block device to be allocated, whether the LBA range of the block device is to be uniformly sequenced among the hierarchical structures of the flash storage region to be allocated (e.g., channels, dies, erase units, pages) thus establishing a uniform address space layout (ASL) for the block device, or whether the address space layout is to be varied within one or more "subspaces" or zones (i.e., "sub-ranges" of the overall LBA range for the block device). If subspace ASL is desired (affirmative determination at 405), the user is prompted to specify one or more specialized LBA ranges (i.e., LBA ranges having ASLs optionally different from the otherwise uniform ASL corresponding to block device profile and/or other zones). After receiving subspace ASL specifications, if any, for each user-requested zone/block device, the allocator programs configuration registers 407 within the storage drive (thereby allocating individually configured block devices/zones, which for example, may provide respective write frontiers, depths, transfer rates, and different ways in which data for consecutive write operations are farmed out to physical memory associated with the given zone/block device) and notifies the host system of the allocation, supplying, for example a parameterized description of each zone/block device that informs the host system of zone/block device capacities (thus establishing the LBA range of each zone and for each block device for a given LBA granularity), write bandwidth, read bandwidth and minimum data transfer size.

Note that the LBA granularity (i.e., size of a logical block of data—not to be confused with a block device or zone which will typically hold millions of logical blocks of data each having a respective LBA) may be programmed within configuration registers 409 or other configuration storage of the particular storage drive to enable a variable user-specified number of LBAs to span each physical page of storage within the storage drive. Similarly, as discussed in greater detail below, the size of a logical quantum of data, such as a write stripe (e.g., may include multiple LBAs written and retrieved as a unit, optionally across multiple EUs, dies, planes and/or channels). Write stripe size may be programmed within the zone/block device configuration register to enable the memory controller to associate discrete sets of physical storage structures (e.g., an integer number of erase units within a given block device) with respective zones or with a single zone and thereby facilitate coordinated file-system and storage drive management operations.

After programming the configuration registers 409 to define/customize zones and exporting corresponding parameters to the host system at 407, the block device allocator returns to the space availability evaluation, and determines the block device profiles and quantities thereof, and similarly, zone profiles and quantities thereof, that remain available for allocation after accounting for any prior allocations. If all available zones/block devices are determined to have been allocated (i.e., all resources reported to be available by the drive and/or library description of the flash memory device have been allocated in a block device definition or respective zone/block device definitions), then the design/allocation operation is deemed complete and the depicted logic device allocator terminates. Though not specifically shown, the designer/user may also terminate the depicted sequence without allocating all flash resources and can also restart the sequence to address resources that have been deallocated.

Note that it was earlier referenced that various embodiments provide for out of order write handling and for efficient management techniques for handling multiple zones. Reflecting on the operations shown in FIG. 4A, it should be noted that numerous additional provisions and or options may be implemented in various embodiments. For example, it was noted earlier that some embodiments support a configurable write buffer, defined in internal SDRAM of a drive/memory controller, as depicted at 411, and the number of zones and their allocation can bear on buffer resources allocated to support efficient operation; once zone allocation is performed, dependent on exported geometry, host system software—and/or the storage drive—can perform this configuration and store associated parameters in configuration registers 409 of the storage drive, so as to implement modes and allocate resources, as will be described below. Similarly, some embodiments provide for backup power (referenced at 413) that permits write completion in the event of power loss, or that factors into RAM backup processes in the event of power loss, and efficient allocation based on these geometry particulars—and based any desired zone configuration—can likewise be used to configure write buffer operation via registers at 409 and, in some embodiments, backup power control particulars, such as referenced at 415. Many variations will also be apparent to those skilled in the art; for example, instead of executing the flash memory/file system configuration operation in each loop iteration, the depicted logic flow may accumulate an internal set of storage drive configuration parameters in each loop iteration, prompting the user/designer to review a comprehensive allocation plan before proceeding with flash device programming and/or file system notification. Also, instead of issuing configuration commands/parameters to the storage drive and/or host system, the depicted logic may write configuration information to one or more configuration files (or other data objects) for later delivery to the storage drive or the host system. Further, instead of iteratively prompting a user to select from among available zone/block device profiles (which selection constitutes an implied or explicit user/designer specification of zone characteristics, including logical block size, read bandwidth, write bandwidth, capacity, transfer size, endurance metric, etc.), the depicted logic may initially receive desired performance parameters from a user/designer and thus proceed from the user's initial performance specification to resolve zone/block device allocations. In yet other embodiments, the quantity of zones and/or their individual characteristics may be determined in whole or part by user/designer specification of aggregate read or write bandwidth within the storage drive as a whole (together with other "overall device" requirements, such as a minimum or maximum segment size, logical block size and/or transfer size), with the depicted logic flow allocating and configuring, for example, a minimum or maximum number of zones/block devices as necessary to meet those aggregate requirements. Accordingly, the sequence shown in FIG. 4A should be understood as but one of many possible allocation schemes which may be deployed in different embodiments or configurations.

FIG. 4B illustrates an exemplary (and not necessarily complete) block device allocation and configuration within a storage drive effectuated, for example, using the logic functions referenced in FIG. 4A. As shown, five block devices, BD0-BD4, are allocated, with each block device in this particular example being constituted by one or more flash dies that are collectively associated with one or more memory channels (i.e., in this example, the smallest allocable zone is a single flash device), and with each block device including subspace definitions corresponding to one or more zones, each potentially having its own address space layout; again, this array/die-delimited configuration of zones is not required for all embodiments. The configuration storage (Zn/BD Config) includes a lookup table (LUT) that is indexed by an identifier (Id which may be, for example, a namespace or other handle or identifier) and holds, for example and without limitation, a specification of the one or more channels spanned by the block device (i.e., "constituent channels") and the one or more dies on the constituent channels. Zones are defined in exactly the same manner, as respective rows/data objects. For instance, a first block device (BD0) is seen as spanning channels 0 and 1, and includes dies 0 and 1 on the constituent channels and thus includes four flash dies in all. A next block device (BD1) in this example is similarly defined as encompassing a 2×2 set of flash dies, but spans channels 2 and 3 instead of 0 and 1 and thus forms an entirely discrete storage area (i.e., no physical overlap) with respect to block device 0. A third block device, BD2, spans a single channel (channel 0) and flash dies 2-5 on that channel, and thus also constitutes a four-die storage space, but without the channel parallelism provided by BD0 and BD1 (i.e., a 1×4 die zone instead of a 2×2 die zone). BD3 is also a 1×4 four-die device, but is constituted by allocation of dies 2-5 on channel 1 instead of channel 0. Lastly, BD 4 is a 16-die block device that includes a single die (die 6) on each of the depicted 16 channels—that is, a 16×1 die block device. Thus, of the overall set of five allocated block devices, four block devices (BD0-BD3) include discrete sets of four constituent dies and thus have a 32 GB pseudo-physical storage capacity (i.e., each die includes a pseudo physical count of 2048 erase units, each containing 256 16 KB pages and thus 211*28*214 bytes or 8 GB) and the fifth allocated block device (BD4) includes a discrete set of sixteen dies and thus a 128 GB pseudo physical storage capacity. Also, in this particular example, the channel and die identifiers recorded within the lookup table LUT correspond one-for-one with underlying physical channels and dies within the storage drive as neither of those elements of the structural hierarchy are virtualized. In alternative embodiments or configurations of the drive, either or both of those elements may be virtualized (e.g., with some address translation being optionally performed at a specific, limited hierarchical level by the memory controller or other circuitry onboard the storage drive).

Continuing with FIG. 4B, each entry within the lookup table LUT additionally includes an index to a respective set of one or more entries within an ASL lookup table (ASL LUT), with each ASL lookup table entry including ASL (address space layout) parameterizations and feature control settings for the complete or partial LBA range of the corresponding block device or zone; once again, the use of ASL customization, permitting each block device or zone to be striped differently or have data arranged differently by a memory controller for the storage drive, is optional, and some embodiments will make use of a common set of ASL parameters for multiple block devices and/or zones or for all block devices and/or zones. In the particular example shown, exemplary ASL/feature-control parameter settings respective to three different block are illustrated, including a uniform ASL/feature-control parameterization within BD0 (i.e., parameterization applies uniformly to the entire LBA range of the block device—there are no subspace definitions), another uniform ASL/feature-control parameterization with zone 2, and another multi-subspace ASL/feature-control parameterization within BD4, with separate ASLs defined for each of multiple zones within the block device, each having a separate allocation of LBA ranges. Only two zones are shown, associated with BD4, but again, in a typical implementation, each BD ma include many zones (e.g., tens to hundreds, or more), each of which can have the same or different ASL parameters as another zone. Entries for BD1 and 3, and zones defined in these block devices, are also present in the ASL lookup table, but are not specifically shown in FIG. 4B.

As implied by the discussion above, in some optional embodiments, the ASL parameters can be used to define/customize the manner in which sequential LBAs are distributed within the structural hierarchy of each zone and thus indicate the number of pages within the same erase unit (i.e., "seqPg") to which sequential LBAs apply before progressing to page(s) in the next erase unit, and then the number of erase units to be sequentially accessed within a given die ("seqEU") before progressing to the next die, and then the number of dies to be accessed on a given channel ("seqDie") before progressing to the next channel, and so forth. The feature control parameters include, for example and without limitation, whether read caching and write caching are to be enabled (independently settable via the rdC and wrC fields of the ASL lookup table entry) for the zone, the number of pages that may be simultaneously or concurrently written to or read from within the same erase unit (nPa), and the number of erase-unit planes to be concurrently accessed in a given write or read command sequence (nPl). In general, read caching is a double-buffering construct that enables data retrieved from an address-selected storage page and stored within the flash die's page register (i.e., a buffer element that temporarily holds outbound page-read data and inbound page-write data) to be output from the flash die concurrently with transfer of subsequently selected storage-page data to the page register, and write caching is a similar double-buffering arrangement that enables concurrency during page-write operations. Thus, the read and write page caching features, when enabled, reduce net latency of a sequence of read or write operations, respectively. In general, page caching scales (e.g., multiples according to cache depth) the effective size of the write staging register. For simplicity of understanding, page caching in both the read and write directions is disabled (i.e., "off") within the exemplary ASL lookup table entries shown. Multi-page operation (i.e., nPA set to a value greater than one) and multi-plane operation (nPl set to a value greater than 1) likewise raise the minimum size of the write staging register. In the specific examples shown in the ASL lookup table of FIG. 4B, multi-page operation is disabled at least within space ID definitions 0, 2 and 4, and multi-plane operation is disabled at least within space ID definitions 2 and 4; these values can established on an independent basis for each zone, as seen at the lower right of the FIG. By contrast, dual-plane operation (nPl=2) is specified for zone 0, thus doubling the number of concurrently written pages, and effectively enlarging the transfer bandwidth (write stripe) used in connection with the associated zone/address space subdivision.

Still referring to FIG. 4B, the singular values ('1') recorded for the LBA-sequencing ASL parameters within the ASL lookup table entry for LBA range 0-nLB (bd) for BD0 dictate that LBAs are to be distributed widely through the structural hierarchy of the structures associated with the block device with, for example, each page of a sequentially addressed set of four pages (and thus a sequential range of 16 LBAs given the sLB=4 KB logical block size setting) being read or written within a different one of the four constituent dies, thus effecting 4× ("multiplied-by-four") parallelism in the page read or write operation and thus approximately a 4× bandwidth increase over a configuration that directs four sequential page read or write accesses to the same erase unit within a given die. In actuality, the depicted dual plane setting doubles the number of concurrently accessed pages within each of the four constituent flash memory dies, thus establishing an 8-page stripe size and thus read and write bandwidths that are approximately eight times the baseline single page read and write bandwidths of a given flash die. By contrast, the address space range depicted for BD1 which otherwise constitutes the same 2×2 die-layout as BD0, is configured with a deep (rather than wide) address space layout and with only single-plane access throughout its LBA range. Thus, pages falling within a sequential LBA range of BD1 are mapped to physical pages within an erase unit until the end of that erase unit is reached (i.e., "Pg/EU"), with the LBA range thereafter continuing through the physical pages of a next erase unit and then the next until the final erase unit (EU/Die) within the die has been traversed, with the LBA range thereafter continuing through the pages and erase units of the next die on the same channel before carrying over to EUs and dies on an adjacent channel. In general because the stripe size is very narrow (i.e., a single page and thus as narrow as possible in the exemplary flash memory die shown), only a single erase unit is impacted by each page write operation and thus, despite the relatively low write bandwidth (i.e., 16 KB/tPROG in contrast to the 8*16 KB/tPROG bandwidth achieved by the 8× wider stripe size in BD0), write-induced wear resulting from, for example, storage of a 16 MB host segment, will occur in only a relatively small number of erase units and dies—four 4 MB erase units within the same die in this example—in contrast to the storage of each of the 1024 16 KB pages within a respective one of the 1024 erase units of BD0 (i.e., each of the 256 erase units within each of the four dies is written to and thus worn to some degree). Conceptually, while the total page wear is equivalent in both configurations (the same number of pages is written), the wear within narrower-stripe-size (i.e., deeper, but lower bandwidth) BD1 is concentrated within a much smaller number dies (and potentially erase units as well), simplifying wear-leveling operations and thus raising endurance of the zone as compared to wider, higher-bandwidth BD0. These same considerations can be used to general one or many zones as address space subdivisions for each block device, as seen at the bottom right of the FIG., which further illustrates that respective zones can have non-uniform space mapping. In general, all these considerations are made available to the user/system designer in configuring the various block devices and/or zones, as the designer is able to directly, or with the aid of allocation/design logic, specify ASL and feature-control parameters that strike a design balance between endurance and bandwidth requirements of a given application, potentially configuring block devices and/or zones having widely varying performance characteristics within the same storage drive, as illustrated by FIG. 4B. Note that a zone generally represents a logical unit that, in some implementations, will be garbage collected as an integral unit, and a narrower layout (in terms of write frontier) implies zones that are more efficiently garbage collected, thereby helping endurance.

Concluding with FIG. 4B, the ASL lookup table includes multiple entries (and thus multiple subspace definitions, e.g., zones) for BD4, with an initial entry specifying a 4 K LBA range (0-4095) mapped for high I/O bandwidth (i.e., 16-page stripe size as the write frontier spans all sixteen of the flash dies within the block device) and another entry specifying a subsequent 4 K LBA range mapped for endurance (single-page stripe size). One or more other subspace/zone definitions (not shown) complete the LBA range mapping of BD4.

FIG. 4C illustrates a host perspective of exemplary zone allocations and configurations; it is again noted that it is not required for all embodiments that zone boundaries align with die/array boundaries. In FIG. 4C, block device differentiations are displayed only to illustrate transfer bandwidth, endurance and maintenance considerations, but it is to be understood that these same principles apply equally to zone based distinctions. FIG. 4C is used to illustrate relative bandwidths according to write frontier width (left-to-right across the drawing figure). It is noted that each zone will typically be allocated to a respective requestor (e.g., a respective client application) and using the principles just discussed, in some embodiments, zones and/or block devices can be configured by the host and/or the drive so as to be customized to the needs of the individual requestor/client, whether in terms of bandwidth, capacity or other requirements. Block devices 0-3 from the previous example all have the same four-die, 32 GB capacity and thus have the same footprint (i.e., spanning an equivalent area within the figure), while BD4, encompassing four times the write frontier of the other zones has a correspondingly larger 128 GB capacity. Also, BDs 0, 1, 2, 3 and 4—or equivalently sized zones—are depicted with respective widths according to their nominal maximum I/O bandwidths of 8×, 1×, 1×, 2× and 16×, respectively, where each non-unity multiplier scales the baseline read and write bandwidths (i.e., 1/tREAD and 1/tPROG). As shown in detail view 451, the signaling bandwidth of BD4 varies according to subspace, having a high (16×) bandwidth in the initial LBA range, and a 1× bandwidth in the LBA range that follows (i.e., in accordance with the respective subspace stripe sizes of 256 KB and 16 KB). Note also that actual zone bandwidths may be constrained by limitations on channel signaling rates. For example, multiple independent commands from a memory controller sent over a common channel may compete for signaling resources and this may constrain throughput. These limitations can be exacerbated where multiple zones are defined so as to share the same die, e.g., for a flash memory implementation, conventional flash array support might permit only a given write operation at a time between these competing zones.

FIG. 4C also presents a non-exhaustive list of storage drive performance characteristics and features enabled by hierarchical address virtualization within the memory controller and configurable zone allocation, including (i) a configurable and predictable I/O latency, (ii) brief or otherwise negligible logical-to-physical ("L2P") address translation time (or at least dramatically reduced L2P time relative to embodiments and/or operating modes that invoke a flash translation layer), (iii) allocation of discrete defect-free block devices and/or zones in user-specified quantities and capacities, (iv) host-system scheduled maintenance of flash-device-identified segments (or other logical units of storage), and (v) forward compatibility/ease of migration as flash device capacities and feature sets expand in successive device generations.

Figure 4D:
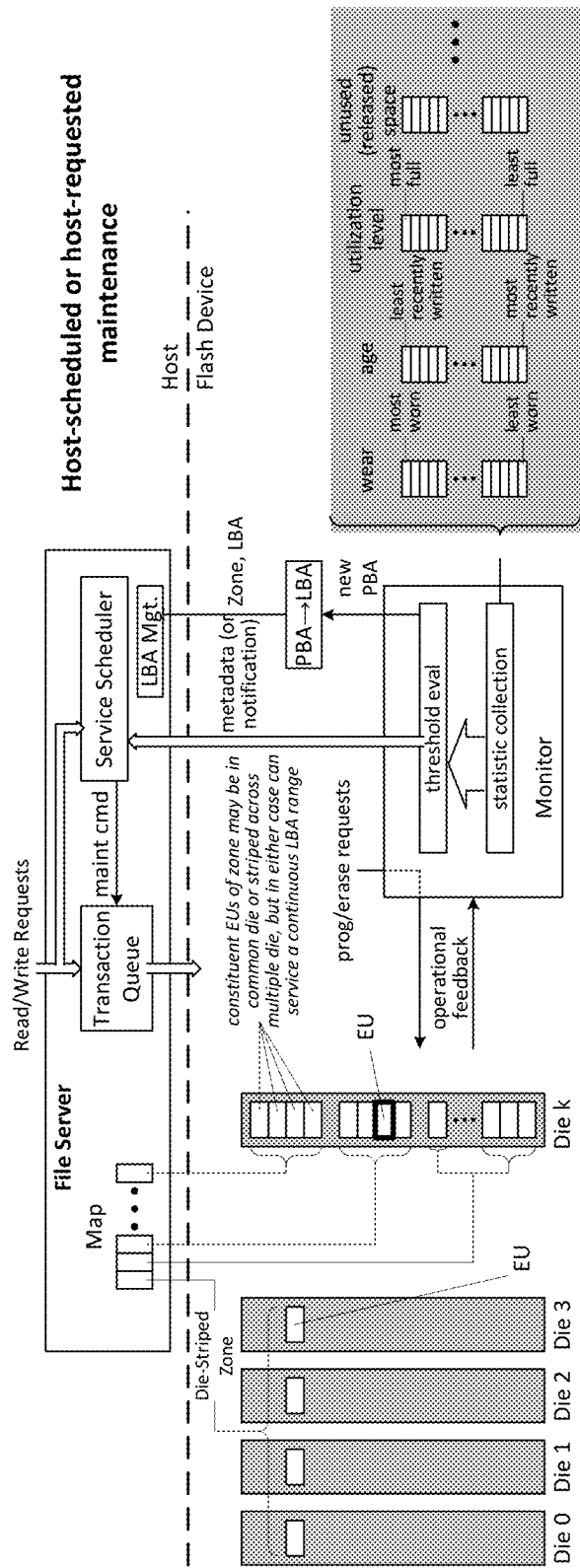
FIG. 4D is a block diagram relating to host-scheduled or host-requested maintenance.

FIG. 4D demonstrates an exemplary sequence of operations coordinated between a storage drive and a host system to enable host-system scheduled maintenance. In the depicted example, logic and metadata onboard the drive tracks statistics and environmental status of the memory, with logic optionally looking for indications that a portion of the data presents an opportunity for maintenance of a physical resource. Examples of maintenance opportunities are depicted at the right hand side of the FIG., including opportunities motivated by uneven wear, disparate age (e.g., write-cold status, or conversely, cold-read status or frequent read status, low utilization (e.g., high release count status), and empty zones and/or EUs waiting for erasure (reset) to prepare them to receive new writes of data. A first example of a maintenance operation might be that data has resided on a given EU or in a given zone for a time long enough to approach a maximum estimated safe retention time; an event could be set to trigger at a threshold of safety previously selected by to host system and communicated to logic onboard the storage drive. Once that event has been triggered based on analysis of stored metadata, the storage drive in this example translates the physical location though the previous zone/block device and ASL map structures in order to identify the segment as a host LBA in which the physical resource resides. When the host system has received the notification of the event, along with the associated LBA, length, and event type, the host system may elect to handle that event in a number of ways. Host system-issued instructions may garbage collect, copy, move, or discard data in manner the best benefits the overall efficiency of the system. Those instructions may be mixed into the overall system scheduling. Note that in contradistinction to conventional approaches (e.g., where an entire address space is garbage collected, in a storage drive-wide operation delegated to a memory controller) that this approach permits the host to command specific, fractional maintenance operations to specific hierarchies, for example, by command to perform maintenance on a zone or a subset of a zone. To this effect, the host system can transmit a maintenance request with a specific zone identifier and address and/or offset address, which the memory controller uses to perform maintenance on a host system-selected or host system-specified address range, conveyed by or in connection with the maintenance request. These requests can include data relocation, garbage collection, trim operations, erasure of host specified space (e.g., reset of flash memory cells) and/or other operations. An erase operation may be implied in some circumstances, for some embodiments, once data has been relocated or discarded, a zone of interest may be erased automatically by the drive, depending on implementation, and a zone consequently released and readied for reallocation. Note that some operations may result, depending on embodiment, on address reassignment. For example, for implementations which prohibit overwrite of logical address (e.g., zoned drive or Open Channel-compliant architectures), a memory controller performing garbage collection might consolidate valid data from a first zone and write that data to a second zone; as each LBA consistent with these architectures is written in a manner requiring alignment with a current write pointer for the particular zone, in one embodiment, the memory controller assigns PA (and consequently, LBA) within the zone and notifies the host system of the new address (e.g., represented in the FIG. by the notation "PBA LBA") and sends this information to the host system, which updates its LBA management files so as to reference the specific LBA in connection with future read requests for the data in question.

Figure 4E:
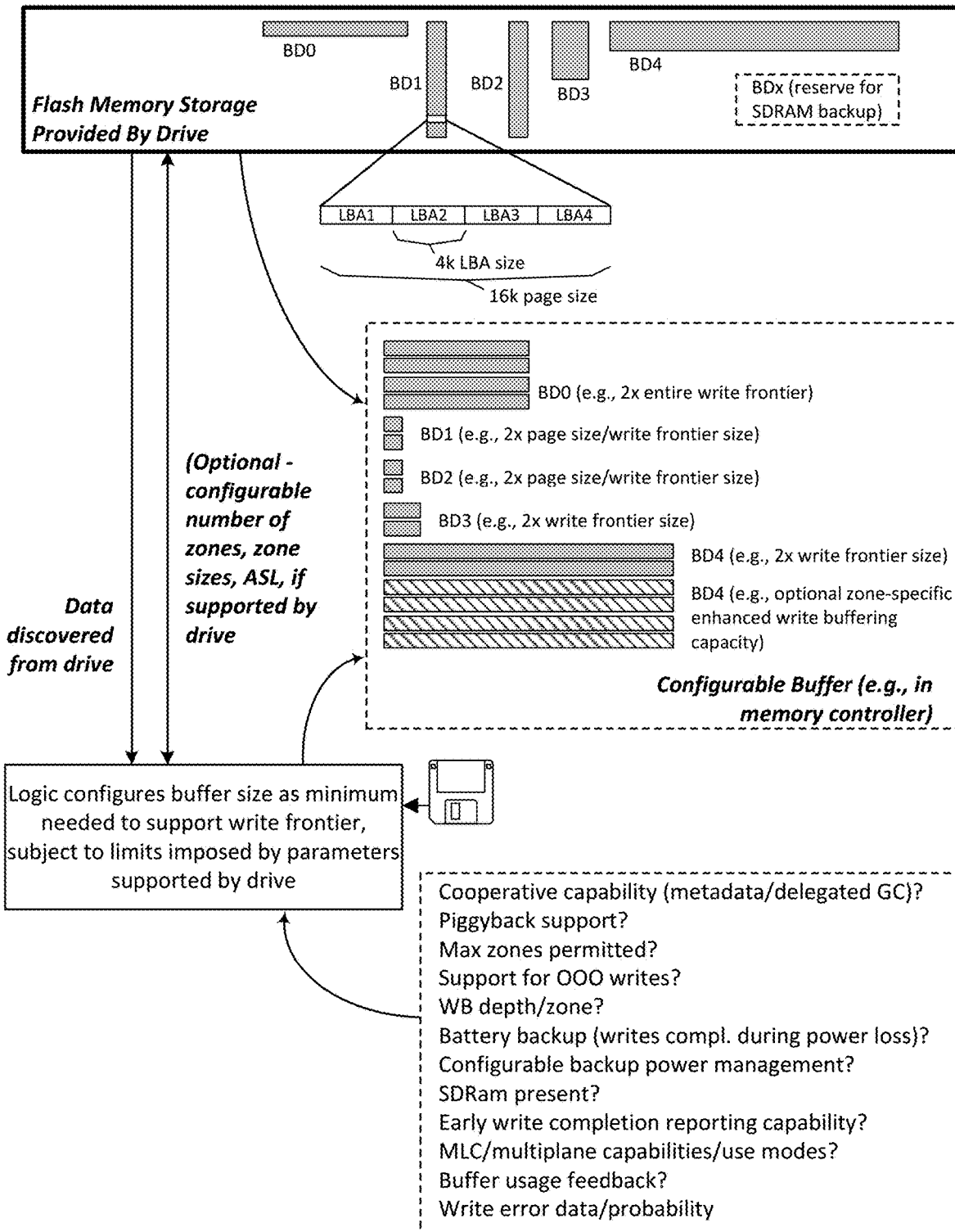
FIG. 4E is a block diagram relating to variable write buffer configuration per block device and/or per zone.

FIG. 4E builds on the discussion above by extending exemplary zone/block device configuration to write buffer management principles. It is again noted that not all embodiments contemplate multiple block devices and/or zones, block devices and/or zones of different sizes, widths or other characteristics, or that block devices and/or zones are adjustable; it is contemplated to use techniques provided by this disclosure, for example, in non-zoned architectures, as well as in (by way of nonlimiting example) architectures where block devices and/or zones are all identical to one another in configuration or where block device and/or zone characteristics are effectively fixed (e.g., hardwired) and are not adjustable. Subject to these admonitions, FIG. 4E provides some examples of write buffer configuration in the context of the illustrative zone/block device allocation discussed above.

More particularly, FIG. 4E illustrates an exemplary flash memory drive storage configuration having five block devices and/or zones, identified as BD0-BD4, as well as now including a reserved block device and/or zone (BDx) that is not advertised to the host system and is reserved by the depicted storage drive for write buffer backup (e.g., in the event of an intended or unintended power down event). As before, for example, BD0 and BD1 are seen to be identical in capacity, but to respectively present eight page and single page write frontiers (e.g., as introduced above, BD0 and BD1 can be configured to have four dies with zone 0 having double page striping across all dies), and with BD1 being written one page at a time. FIG. 4E also illustrates that the page width, in this case assumed to be 16 k wide, encompasses four consecutive LBAs with each LBA corresponding to a data size of 4 k; these numbers are also illustrative and not required (e.g., a unit of data in a given case may be much smaller than page size, a page in a given case might encompass a non-integer number of LBAs, or align to exactly 1 LBA, or an LBA might be larger than page size if desired for a particular implementation). Because LBAs are written in this assumed implementation as a function of dedicated requests, because data is written into an erase unit of flash memory one page at a time, and because writes might arrive out of order, buffering capability is structured in this embodiment so as to accumulate at least double the write frontier for each of these block devices/zones (e.g., in the particular case depicted by the configuration of BD1 in FIG. 4E, is structured so as to accumulated eight writes, i.e., 8 LBAs, exactly two times its single page write frontier, assuming 4 LBAs/page). As indicated at the left-hand side of the FIG., the host system (not shown) and storage drive cooperate to provide discovery by the host of geometry and capability data from the drive. The bottom-right of the FIG. once again illustrates parameters which can be discovered, including without limitation, whether the storage drive and/or particular memory controller provide cooperative capabilities (metadata management and/or delegable garbage collection management, support for piggyback commands, identification of number of zones supported and optionally an indication of a maximum number of concurrently open zones permitted by the architecture, whether support is provided for out of order writes received by the storage drive, information on write buffer maximum depth per zone, whether battery backup to finish writes is provided for power loss events, whether configurable backup power management capabilities are provided, whether an internal SDRAM is present (and permits write buffer configuration and/or requires backup in event of power loss), whether early write reporting is supported (this will be further discussed below), whether MLC/multiplane capabilities are provided (including whether such multiplex structures may be operated in a SLC/single plane mode), whether the storage drive accumulates statistics on per zone buffer usage, write error probability and other possible parameters. Again, consideration of any permutation of these parameters and/or additional parameters is contemplated for any given implementation, as is the use of a completely different set of parameters. The host system and storage drive also optionally permit block device and/or zone configuration/adjustment, and optionally, address space layout (ASL) variation across zones. In conjunction with these features, as seen at the left of the FIG., logic on the host system, the storage drive, or both, configures buffer size as the minimum needed to support each write frontier, subject to limits imposed by parameters discovered from the drive; again, in this example, it is assumed that it has been decided that all six depicted zones can be concurrently open and that a buffering capacity could in this be provided that is double the maximum write frontier assuming concurrent writes across all of BD0-4. Note that in this hypothetical, the hidden space (BDx) is presumably used for emergency SDRAM backup in the event of a power loss, and because existing contents of SDRAM will be backed up (e.g., potentially including write buffer contents), a redundant write buffer allocation for out of order write unentangling need not be reserved for this region.

The middle of FIG. 4E, in the box labeled "configurable buffer" graphically illustrates write buffer provisioning represented by this hypothetical. It will be recalled that BD0 supports a 4 die write frontier (assuming 4 LBAs per page, and double page writes, this corresponds to 32 LBAs, i.e., 128 k); BD1 and BD2 each support a 16 k wide write frontier (as referenced, each corresponding to accumulated data for four LBAs), BD3 supports a double bandwidth (thus assumed to be a double write frontier of 32 k) and BD4 supports a sixteen fold bandwidth (and thus a write frontier of 16*16 k or 256 k). To provision the write buffer to support a minimum buffering capacity that in this embodiment is double the overall write frontier for all regions, which in some embodiments represents the minimum buffering capacity that is advantageously provided for open zones, assuming concurrent write of BD0-BD4, the logic for an exemplary storage drive might reserve a minimum write buffer capacity of 896 k [i.e., 2·(128+16 k+16 k+32 k+256 k)]. This space corresponds to the shaded write frontier depictions represented in the middle of the FIG.

Note that FIG. 4E represents a straightforward case used for purposes of discussion. In a typical implementation, one or more flash memory dies might provide multilevel (MLC) cells (e.g., dual-level cells "DLC," quad level cells "QLC" and so forth), each of which can store more than one bit of data, and/or multiple plane (MP) capability (e.g., dual planes or quad planes) and, further, that write buffering capabilities can optionally account for enhanced write frontiers corresponding to these features. It might further be the case that, although MLC and MP capabilities are supported by the underlying memory type (and specific components present), a particular client, given its bandwidth needs, calls for different (e.g., single level or single plane) write support; consequently, instructional logic on the host system or the storage drive might be configured (using ASL features, discussed earlier) to perform writes and associated buffering using what are effectively SLC or SP modes of operation in MLC and MP devices. These features can also be taken into account in configuring write buffer capacity on a per-zone basis (e.g., assuming for example, that a minimum of a double write frontier size buffering capacity should be provided for all open zones). Also note that, in contemplated embodiments, a host system can take into account bandwidth requirements of clients and prioritization needs of clients, and can allocate enhanced buffer resources based on these relative requirements and needs, and can configure per-zone write buffer capacity based on these requirements and needs. As a consequence of these operations, instructional logic might configure the storage drive by pertinent mode register programming to allocate substantially more write buffer capacity to some open zones. For example, again referring to FIG. 4E and a hatched region associated with BD4, instructional logic might determine that a zone (e.g., BD4) should be provided with substantially greater write buffer resources and might therefore provide for a 6× frontier size write buffer capacity for the associated region/zone (in this case, provisioning 1408 k for aggregate write buffering capacity). The depicted storage drive still performs writes in order (e.g., only writes having LBAs matching a current state of a zone's write pointer are executed), and an error condition can be signaled in some embodiments if a zone's buffering capacity is exceeded, but as should be appreciated, providing enhanced buffering resources for certain zones (e.g., based on priority) can memorialize a strategy that those certain zones are more important, and consequently it is desired to minimize write errors for these more important zones than for other zones. Again, this approach is not required for all implementations; some designers might decide to allocate a full write buffer for a zone by increasing write buffer resources in lieu of signaling an error condition or take some other action.

With storage drive, host system and memory controller architecture having been discussed, this disclosure will not provide additional detail regarding trim operations and write buffer management and related support, e.g., for out of order write unentangling. Reference is made to FIGS. 5-23 for these purposes, with FIGS. 5-6 being used to introduce general techniques, applicable to a first embodiment, and FIGS. 7-23 being used to introduce more specific flow that can be used in more detailed embodiments relating to write buffer provisioning and other optional features.

Figure 5:
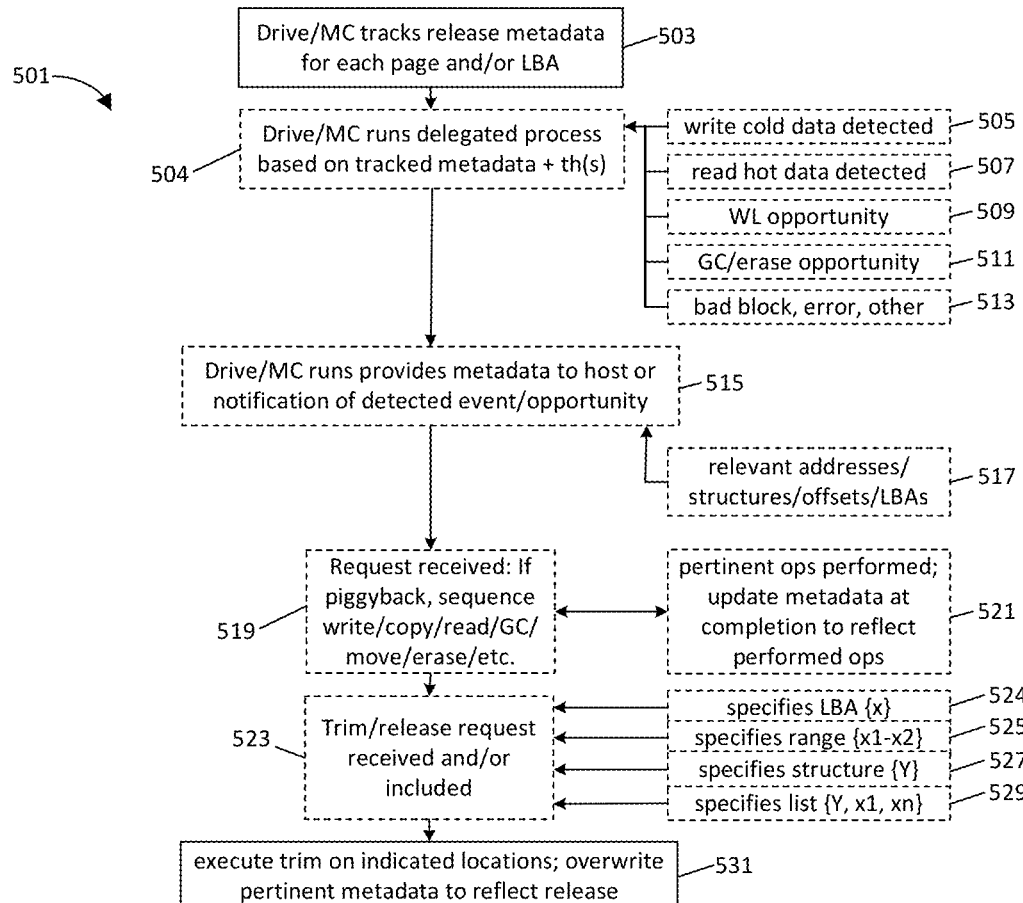
FIG. 5 is a block diagram relating to metadata tracking and trim functions performed by a memory controller.

FIG. 5 shows an exemplary flow 501 that can be used in connection with trim operations. As indicated by numeral 503, it is once again assumed that a storage drive—or its associated memory controller or memory controller integrated circuit—tracks storage location release metadata for each page, each LBA, or each other structural or logical level. Per numeral 504, the storage drive (or memory controller) optionally runs a delegated process based on tracked metadata and any suitable thresholds (these can be in some embodiments dynamically-configured by the storage drive or by the host system, as referenced in the incorporated by reference documents); without limitation, and as indicated by numerals 505, 507, 509, 511 and 513, these processes can detect excessively write cold data (i.e., relative to a threshold, or relative to other data by a threshold delta value), association with read-hot data or otherwise with a read-disturb potential, a wear leveling opportunity, a garbage collection or erasure (reset) opportunity, an integrity management opportunity (e.g., bad block or error condition) or some other opportunity. Per numeral 515, if these processes are supported by the storage drive, in some embodiments, the drive provides metadata or a notification to the host system in a manner that permits the host system to responsively schedule or adjust the performance of maintenance; for example, as implied by numeral 517, in one embodiment, a memory controller can detect a maintenance opportunity and can supply the host system with any relevant addresses, structural identifiers, offsets, LBAs, and/or ranges or lists of these values, filtered, sorted or otherwise. In some implementations (i.e., optionally), the architecture supports receipt of a host system-issued request, and the memory controller sequences execution of any requested operation(s) as appropriate (for example, write, copy, read, garbage collection, move, erase, etc. As indicated by numeral 521, as these operations are executed, the storage drive (e.g., the memory controller) updates affected metadata, as appropriate, such that tracked metadata represents the now-current state of associated storage locations. For example, if a garbage collection operation is performed, the storage drive might be structured to automatically update metadata to mark an old storage location as released (trimmed), and to automatically update metadata to mark a new storage location as written (e.g., and also to change a write pointer for an affected zone). Where a trim request is received from the host system (or where such is included as part of a piggyback request or otherwise implied by context, e.g., as with the garbage collection operation just referenced), the storage drive then updates pertinent metadata as appropriate, per numeral 523. An example here might be helpful; for a piggyback write command of the format WRR{A,B} (write provided data to address A, release address B, where each address optionally includes a zone designation and/or associated LBA), the storage drive would first perform the write request, and update metadata for location A, and then following completion of that write request, would sequentially perform a trim operation and modify metadata for address B to indicate that it is released (e.g., holds stale data). The latter operation is represented by function block 531 in the FIG. Note that this narration does not preclude embodiments that perform both operations in some other order or fashion (e.g., simultaneously). As indicated by numerals 524-528, as options, these requests (for conventional operations, maintenance operations such as for relocation or erase, and/or for trim operations) can specify a specific address (e.g., an LBA x), specify a range of addresses (e.g., x1-x2), specify a structure (e.g., structure Y, such as all addressable memory connected to a die or channel), or provide a list (e.g., structure Y, plus address x1, plus address xn); these examples are not exhaustive.

Figure 6:
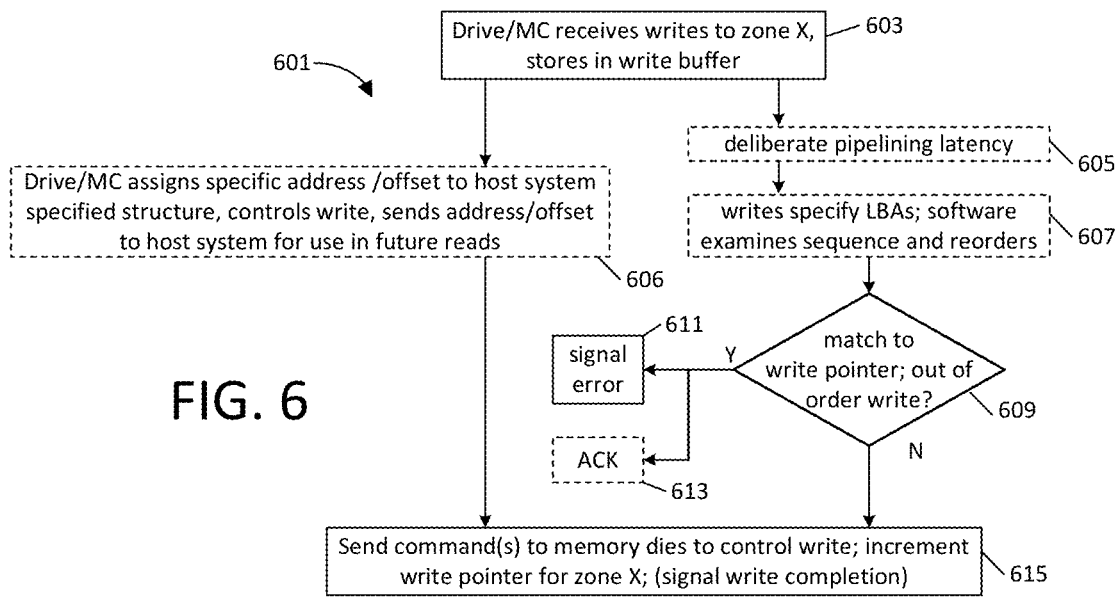
FIG. 6 is a block diagram relating to out of order write management by a memory controller.

FIG. 6 illustrates some general techniques relating to write buffer configuration and management, generally designated by numeral 601. In this example, a storage drive or associated memory controller is assumed to receive a write to a zone, represented as "zone x" in block 603 of FIG. 6. If the storage drive supports a very large number of zones, it may be necessary to restrict a number of concurrently open zones, depending on embodiment. A storage drive may therefore utilize a process where predefined zones are formally opened and dynamically provisioned for write buffering support, with a write pointer being initialized and with the particular zone formally being closed (and write buffer provisioning removed) when its write pointer reaches a maximum value. Note that for some architectures, a distinction is made between a zone size and a zone capacity, e.g., one of these values denoting physical structures provided for zone support (including for example reserve structures that may be from time-to-time swapped in to service data reads with other structures being moved to reserve status, thereafter not forming part of addressable memory space directly accessible by host system read addressing) while another of these values representing the (smaller) range of LAs that will be mapped to physical resources associated with the zone. For zones which are open or can be written, the storage drive stores received host requests and associated data in a write buffer space dedicated to the particular zone, to provide for staging and unentangling of writes.

Note that several different operations can be performed depending on embodiment, as represented by optional features and parallel flow paths in the FIG. First, in one embodiment (represented by numeral 605), the write buffer simply implements some amount of fixed pipelining latency, e.g., a delay time of x microseconds before any request is executed. By stalling requests from the host by a fixed but predictable amount, the storage drive facilitates the ability of the host system to have multiple requests to a given zone in flight with predictable response periods, while at the same time providing ability to unentangle out of order writes; as an example, instructional logic on the storage drive can accelerate, per numeral 607 a late-received request if (a) there are no prior requests remaining to be executed for the specified zone, and (b) the write pointer matches a LA specified by the given request. A fixed pipelining delay need not be used for all embodiments, e.g., it is possible to simply buffer requests to accommodate up to a provisioned number of LBAs and execute whichever request's LA matches the write pointer for the specific zone (e.g., and signal an error, per numeral 611, if the buffer fills up without a LA matching the zone's write pointer). It is also possible to use an acknowledgment protocol, per numeral 613, e.g., upon receiving a time-out caused by an out of order write (or otherwise encountering an error condition), the storage drive transmits the current value of the write pointer to the host and the host then retransmits whichever write request matches the reported (stalled) LBA/write pointer value. Other implementations will also occur to those having ordinary skill in the art. As denoted by numeral 606 (and as introduced earlier), it is also possible to have a system where the host does not specify a LBA with a write, but rather only provides a general value for LA (e.g., a zone designation, or structural designation), and the drive then controls the write and generates a specific LBA (LA), offset, or other value which it transmits to the host, for use in issuing future read requests directed to the data. Per numeral 615, as it executes host system requests, a memory controller for the drive (e.g., IO scheduling logic and associated interfaces, as described above) then sends commands to one or more of the memory dies to control the write of data, increments a write point for the zone, and signals write completion to the host system. For some embodiments, it is also possible to signal early write completion to facilitate pipelining (e.g., this can be done if there is support for backing up SDRAM to nonvolatile memory and a restore function for power loss events). Further examples of these operations will be apparent from the detailed discussion below, e.g., FIGS. 7-23 are used to describe additional, more detailed operations that can support the use of a configurable write buffer.

Figure 7:
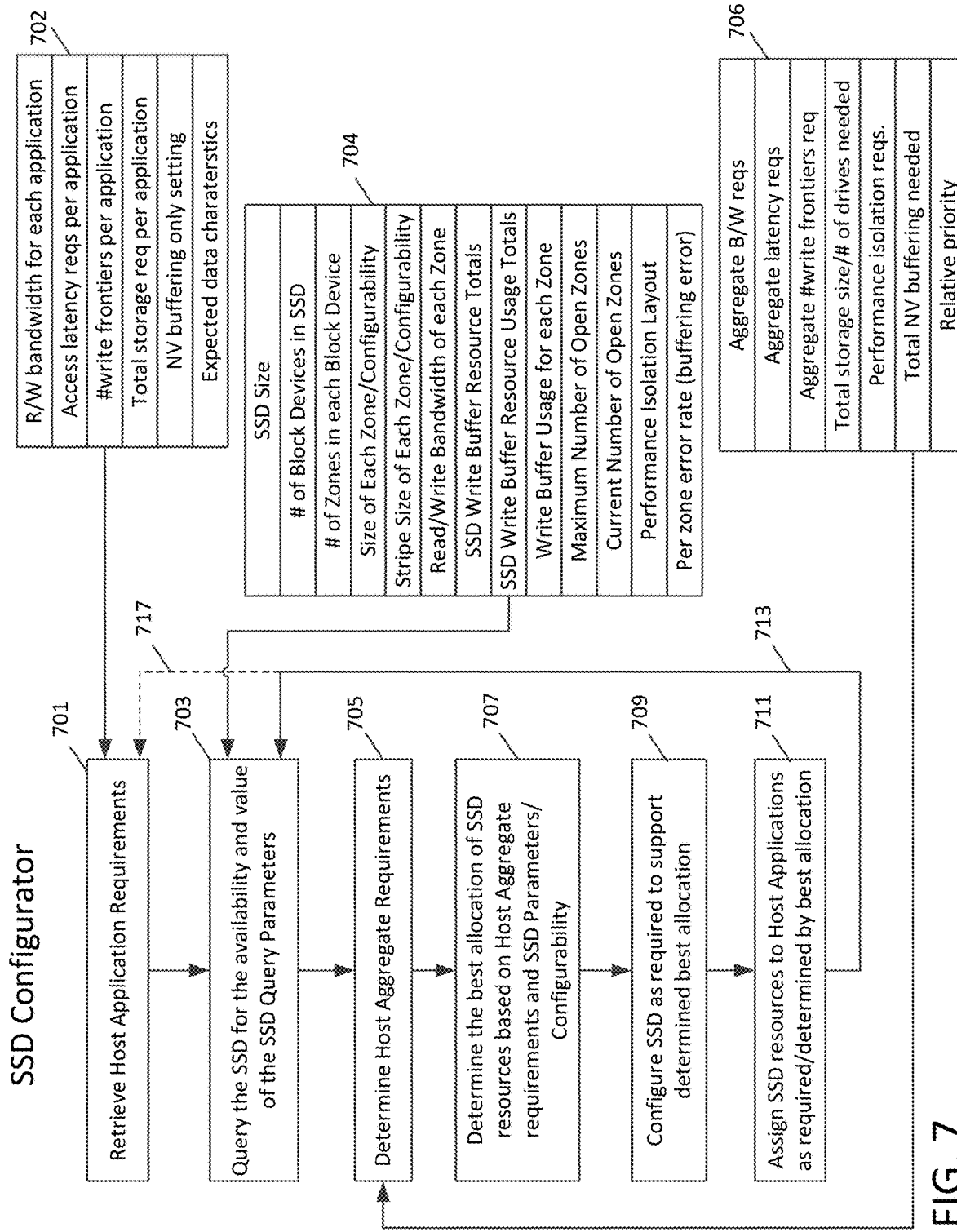
FIG. 7 is block diagram of an embodiment that configures zones/resources in a storage drive (SSD).

FIG. 7 shows a block diagram of a storage drive configuration function. As with other functions described herein, the depicted logic flow in contemplated embodiments is implemented in the form of hardware logic, instructional logic, or a combination of both; as a nonlimiting example, in one design, the depicted flow is implemented by firmware that controls one or more integrated circuit microprocessors or microcontrollers, as a field programmable gate array (FPGA), as instructions stored on non-transitory storage media (e.g., stored on a physical object such as a DVD physical disk), or as a combination of these things. As indicated by numeral 701 in the FIG., the depicted logic retrieves host application requirements, for example, as referenced by numeral 702, per-client read and write bandwidth requirements, access latency and write frontier requirements, storage capacity required, whether buffering should be provided by nonvolatile storage only, and expected data characterizations (e.g., system parameters as constituting higher priority data, information on perceived read frequency, etc.), as referenced earlier. Instructional logic running on a host system (or separate circuitry) also (i.e., per numeral 703) queries a storage drive (SSD) to ascertain geometry and capabilities; returned values in one embodiment includes any of (or all of) those values identified by numeral 704, e.g., SSD size, number of zones, number of block devices, zone sizes, whether configurability is supported, zone depth and stripe size, whether stripe size is configurable, maximum number of permitted open zones, and so forth. Naturally, designers may choose to query and return any number of parameters, including any of those identified in this disclosure, or others. In some embodiments, these values are dynamically retrieved during operation of the storage drive, and a given storage drive might also have logic configured to maintain empirical data on drive usage, e.g., write buffer usage for each zone, currently open zones, error rates per zone, and many other types of factors. The system then proceeds to make a determination as to host application requirements, per numeral 705, and to the relative needs of each application or client, e.g., making computations of values as referenced by numeral 706. The logic makes a decision, given buffering resources available and constraints imposed by the drive, as to the best allocation of resources based on the retrieved parameters, per numeral 707. For example, in a given implementation, given application (client-specific) needs, a host system might decide to restrict the number of zones that can concurrently be open to a smaller number than a maximum supported by a particular storage drive; the logic depicted by the FIG. can be coded or otherwise structured so as to evaluate relative application priorities and needs, and can be configured depending on implementation to weight more heavily certain types of needs—an application processing critical functions for example might counsel a greater allocation of write buffering resources than other applications, and also might counsel limiting a maximum number of concurrently open zones in order to provide this application with greater buffering capacity. Note that it is within the ordinary level of skill in the art to design instructional and/or hardware logic in a manner that will make these allocations depending on the contemplated implementation. The logic then configures the SSD as required, and proceeds to assign SSD resources to host applications, per numerals 709 and 711. As further referenced by numeral 713, this logic flow then loops back, i.e., such that these determinations are performed dynamically (e.g., intermittently) as applications and/or associated needs change, and/or to account for feedback from the drive provided by usage data. Per numeral 717, this loop back can also be performed for applications where clients or applications will change dynamically.

Figure 8:
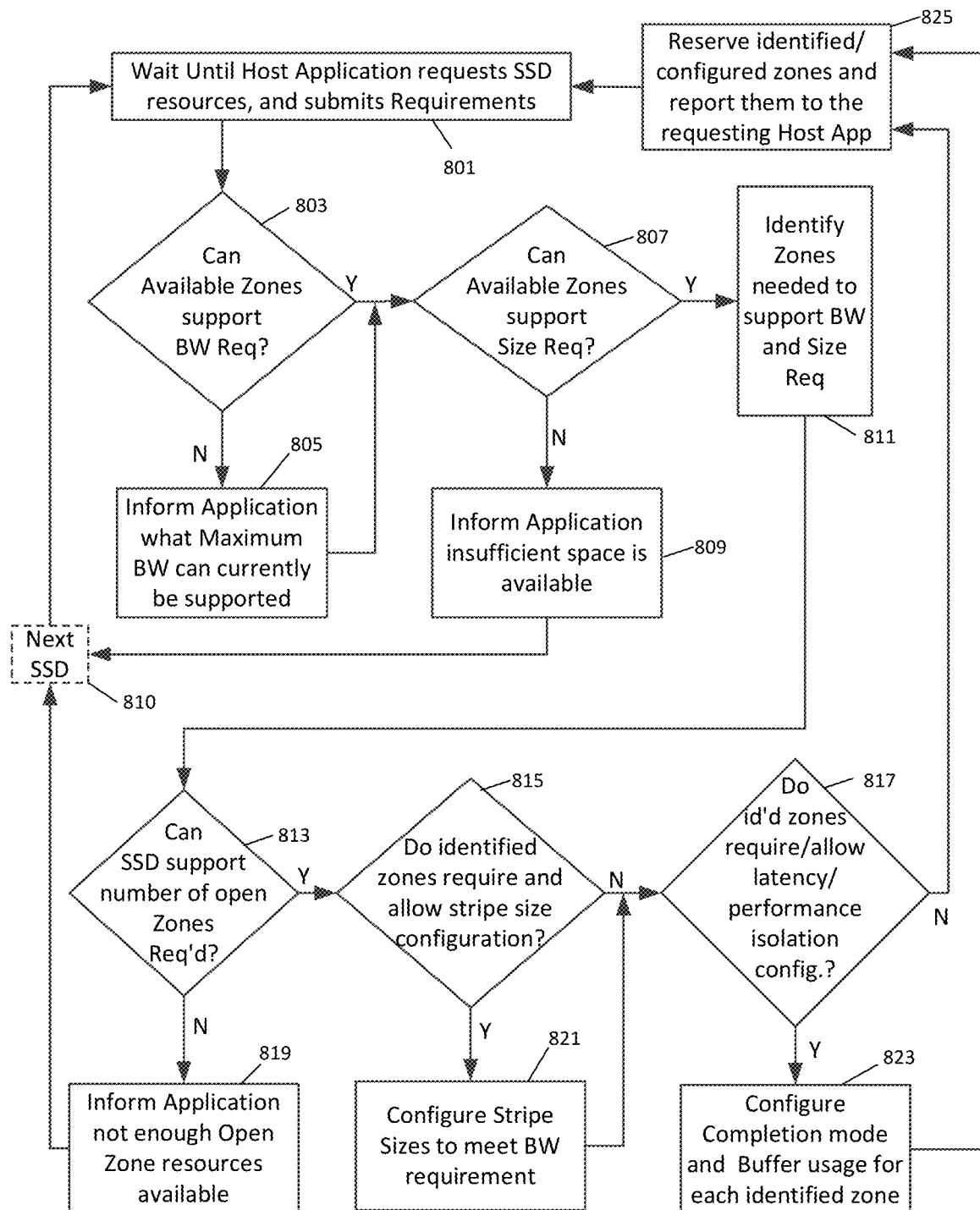
FIG. 8 is a block diagram of a host zone allocator and attribute configurator, e.g., employed by host system software in cooperating with a storage drive to configure and manage zones.

FIG. 8 shows a logic flow for a zone allocator and configurator, e.g., implemented by instructional logic of a host system. Per numeral 801, the flow is triggered by a request for SSD resources from an application; this can occur at power up (e.g., as either the host system or the SSD is powered up), and as an operating system or individual application is opened. Dependent on loaded data, or a dynamic query to the SSD, the logic first compares data on zones from the drive with application/client requirements to determine whether one or more zones provided by the storage drive can service the bandwidth needs of the client and/or application, i.e., per numeral 803; for storage drives that feature non-configurable zones, it may be that multiple zones together or in tandem will satisfy any ascertained bandwidth needs, and a given application might also have multiple storage needs having respective associated bandwidth requirements. Note that in embodiments which permit zone configuration and/or adjustment (e.g., see the materials discussed above with respect to address space layout, and the discussion provided in U.S. Pat. No. 9,542,118), the query represented by 803 includes an assessment as to whether zones/subspace definitions can be defined and/or adjusted to meet the specific needs of the application at-hand. If zones supportable by the storage drive cannot meet the application needs, the logic informs (805) the application exactly what type of bandwidth support can be provided; it might be for example that the application supports different storage configurations, but with a preference for a given configuration (e.g., as providing a preferred bandwidth characteristic). Note also that in an application where a storage aggregate features multiple drives, this step can include a differentiation between multiple storage drives (e.g., SSDs) and can include a selection of one or more drives that can meet requested bandwidth needs. The query process is then repeated for storage capacity requested by the application, per numeral 807; if sufficient capacity cannot be provided, the application is then informed that insufficient space is available (per numeral 809), or conversely, another storage drive (SSD) is interrogated to see whether it can provide requested resources, per numeral 810. Assuming the storage drive in question provides support for meeting the application's bandwidth needs, the logic then identifies a zone requirement per numeral 811 and identifies whether the SSD can support the number of open zones required in view of the requirements of the current application, per numeral 813. In the affirmative, the logic proceeds to perform write stripe configuration per numerals 815 and 821 and determines whether configuration can meet any latency characteristics required by the application when buffer resources are allocated, per numerals 817 and 823; it then reserves zones according to the best ability of the storage drive to meet the applications resource needs, as indicated by numeral 825, ultimately resulting in some type of write buffer allocation for the given application (as represented by logic block 823). If sufficient storage capacity to meet minimum application needs are not available, then per numeral 819, the logic proceeds to the next storage drive (per numeral 810) or otherwise generates an error and, if storage resources are sufficient but desired latency cannot be supported and considering any performance isolation issues associated with how zones are structured, the depicted logic reports available options to the application; once again, some applications may be configured to have multiple settings that reflect different performance/bandwidth settings, and the logic at this stage can cooperate with the particular application to identify and evaluate alternative configurations, with the result of any arbitration presumptively looping back through function block 823 to produce a write buffer allocation for the pertinent application/client. On completion, the depicted process can be again performed for another application; as implied, the depicted logic in one embodiment performs the depicted flow on a client-by-client basis (e.g., for each application individually), in sequence, until all active applications are processed; as new applications are opened or brought online, the depicted flow can be re-invoked to identify whether remaining storage drive resources can service the application's needs, with a host system once again proceeding to a "next" storage drive (if available) if needs are insufficient. Note that a number of options will occur to a skilled designer; for example, it is possible to have logic flow that considers the needs of multiple applications or storage drives in bulk, at the same time (e.g., with the host system then arbitrating between the needs of competing applications), or similarly, among a concurrently-assessed aggregation of storage drives with potentially varying capabilities to service the needs of each application. Host system software can also, in any of these situations, advantageously be structured so as to perform a pareto optimal assignment of multiple applications across multiple drives, multiple block devices and/or multiple zones.

Figure 9A:
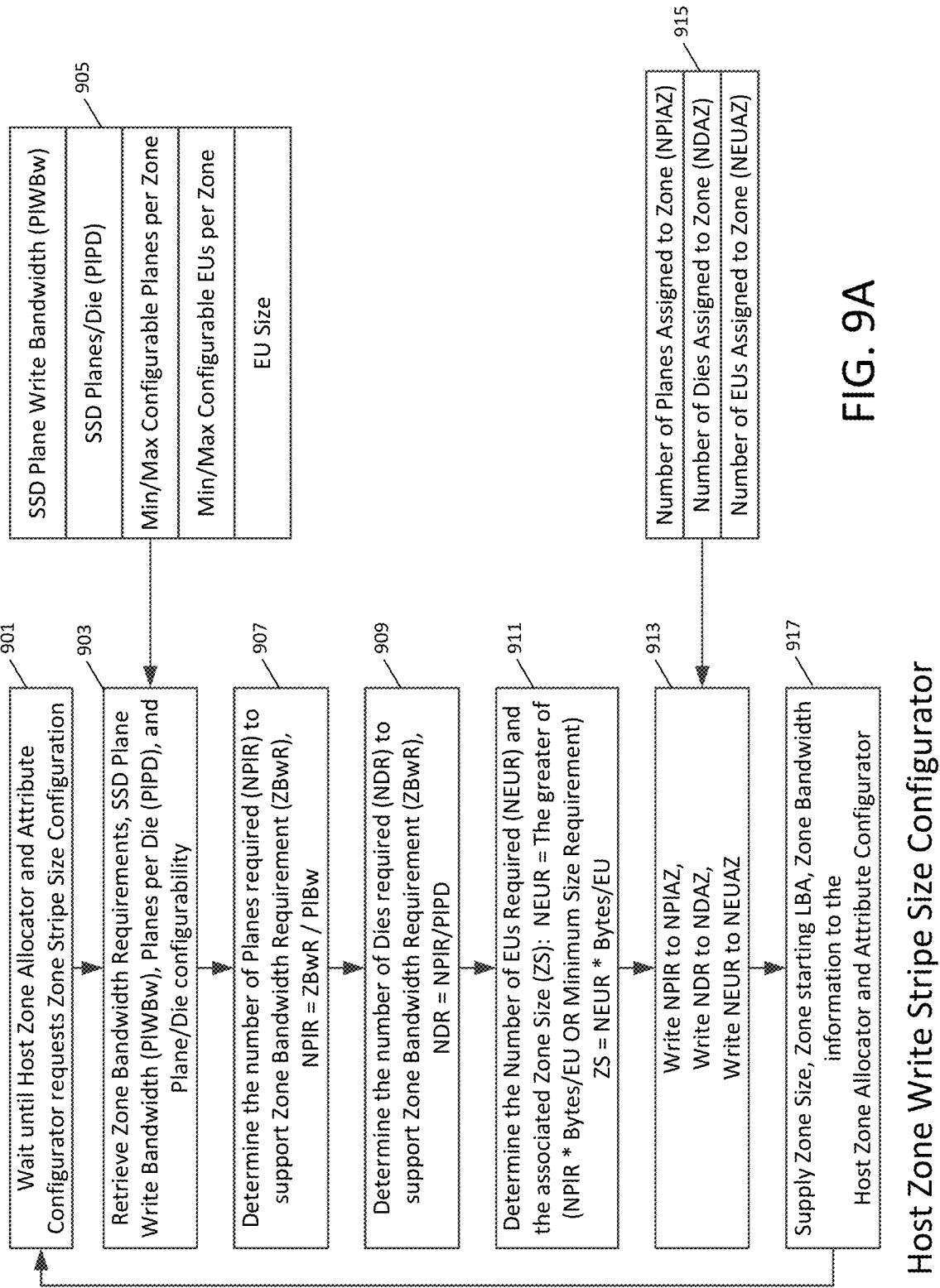
FIG. 9A is a block diagram of a host zone write stripe size configurator, e.g., employed by host system software in cooperating with a storage drive to configure and manage zones.
Figure 9B:
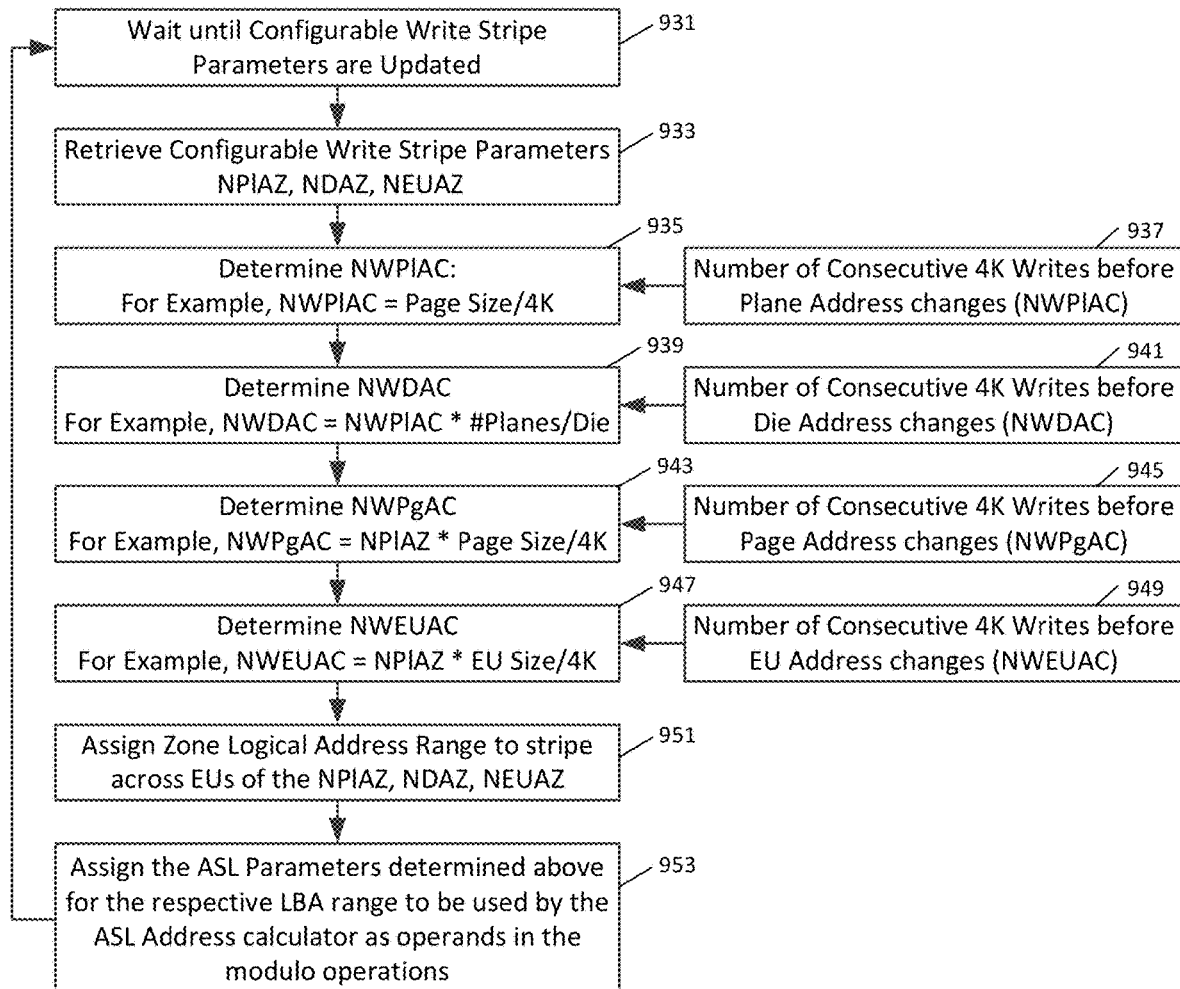
FIG. 9B is a block diagram of a SSD zone write stripe size configurator, e.g., employed by SSD logic in configuring and managing zones.
Figure 9C:
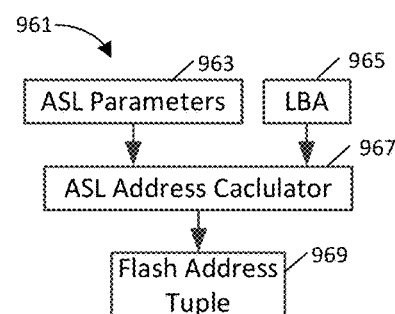
FIG. 9C is a block diagram showing address operations employed by a storage drive, e.g., in a manner dependent on address space layout parameters for a given zone.
Figure 10:
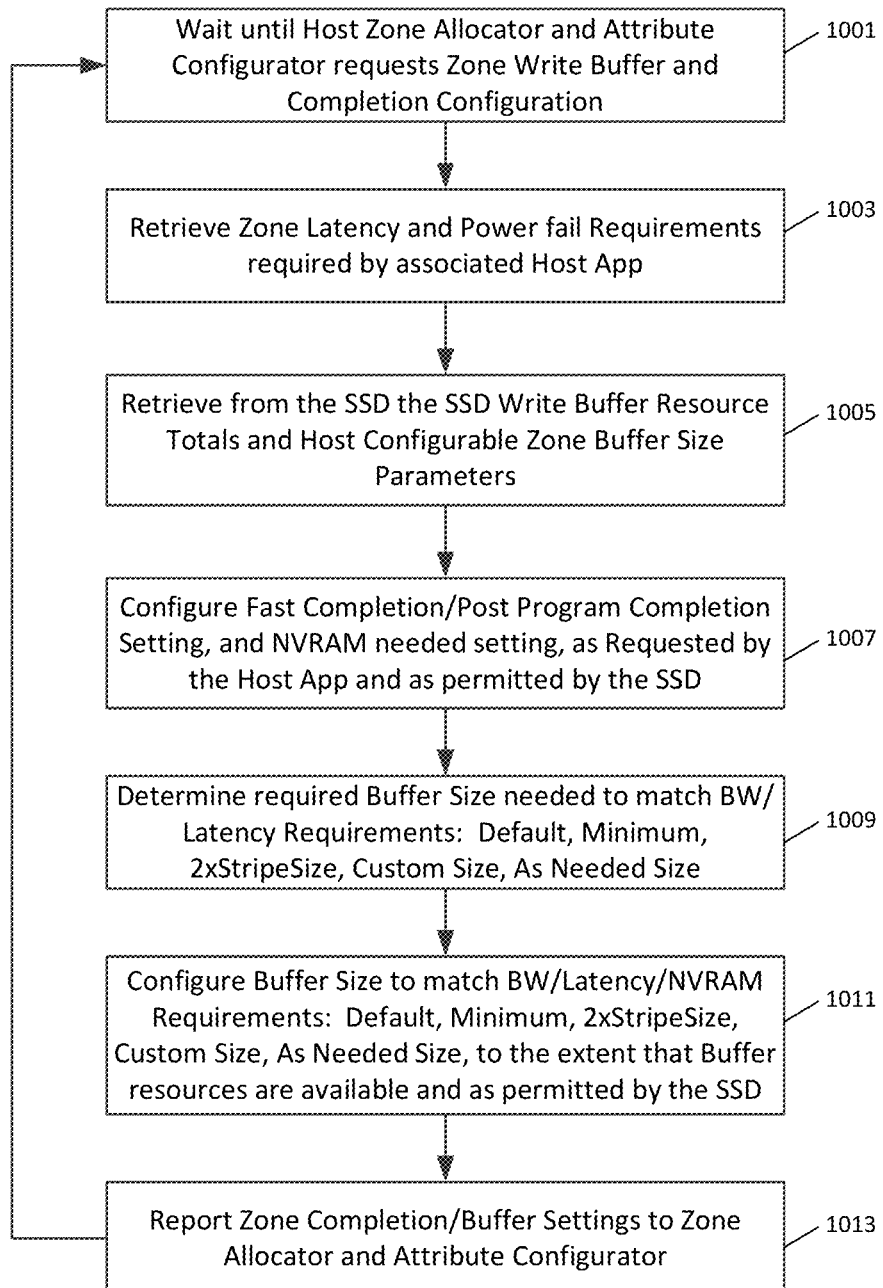
FIG. 10 is a block diagram of a host zone write RAM buffer and completion configurator, e.g., employed by host system software in cooperating with a storage drive to configure write buffer resources.

FIGS. 9A-9C are used to illustrate some exemplary functions associated with write stripe size configuration, with FIG. 9A being used to illustrate logic used to identify pertinent values on the side of the host system, FIG. 9B being used to illustrate logic used to identify values on the side of the storage drive (SSD), and FIG. 9C being used to illustrate address computation functions. The various functions referenced by these FIGS. can be used, in one embodiment, as part of the logic functions represented in FIG. 8; similarly, FIG. 10 provides information relating to write buffer definition that will help determine calculated per-application write buffer allocations, as referenced by numeral 823 in FIG. 8.

More particularly, per numeral 901, the depicted flow can be invoked as part of the write stripe size configuration steps represented by numerals 815 and 821 from FIG. 8. This process for example can be performed in conjunction with one or more of the ASL functions described earlier or discussed in the incorporated by reference documents, e.g., especially U.S. Pat. No. 9,542,118. Per numeral 903, the depicted logic retrieves parameters represented collectively by numeral 905 in the FIG., and it proceeds to determine the number of planes (provided by the drive or available for a predefined zone), the effective write bandwidth provided by each plane (PIWBw), and the number of planes required to support the required bandwidth, all as represented by numeral 907. The depicted logic also proceeds to determine the number of dies and the number of EUs required to support the application's bandwidth requirement, per numerals 909 and 911. Note that, once again, whether zones are definable, adjustable or preconfigured will typically bear on these various determinations. For example, for an implementation where fixed numbers of zones and zone sizes are provided by the storage drive, the host system might ultimately allocate multiple zones to service the needs of the particular application; where block devices and/or zones are configurable, by contrast, the logic may also consider whether MLC and or MP capabilities provided by the drive can be utilized to provide enhanced bandwidth, or ultimately whether ASL adjustability permits zone redefinition such that a given zone is configured to inherently service part or all of write stripe width needed by the particular application. As indicated by numerals 913, 915 and 917, in one embodiment, each of a number of planes, number of dies and number of EUs needed can be used to determine whether a given storage drive can support needs of a particular application; the logic proceeds to record in a register values indicated by numeral 915 in association with the particular application, to facilitate assessment of storage drive resources, configuration of those resources, and ultimately assignment to the application in question.

Following update of write stripe parameters, as depicted by numeral 931 in FIG. 9B, the logic then proceeds to assess ASL parameters for the storage drive in question to effectively configure zone structure. The depicted logic retrieves the write stripe parameters just calculated and proceeds to assess how LBAs would map to the storage drive in question, e.g., given parameters such as page size, planes supported by the drive, die capacity and so forth, all as collectively represented by numerals 933-949, with the ultimate goal of mapping a logical address range needed by the application to one or more zones of the drive, and of configuring ASL parameters as appropriate, as represented by numerals 951 and 953. As implied by numeral 953, the logic can then proceed to program an ASL register on the storage drive in order to effectuate zone definition (e.g., or block device definition), i.e., such that one or more zones are configured and/or matched to the needs of the application in question.

For embodiments which support address space layout (ASL) configuration, note that a hardware-based address translation circuit such as depicted in FIG. 9C can be used to automatically map LAs to PAs (i.e., in a manner generally compatible with emerging memory standards such as Open Channel and zoned drive architectures). This is to say, LAs can still potentially be written by a memory controller in order of a zone specific write pointer, but with these LAs being variably mapped to underlying flash memory structures, for example, using techniques described in U.S. Pat. No 9,542,118. Some embodiments will therefore support some form of address translation by the storage drive, e.g., in a manner that combines ASL parameters with LBA to identify a PA. Note that in other contemplated embodiments, address calculation can instead be performed by the host system, or both the host system and the storage drive, depending on configuration. For example, in an implementation where there is no "drive-wide" address translation, and where a host system selects a logical address that has an a priori relationship with a given physical location, the host system can take ASL parameters into account in assigning and/or determining a LA (e.g., indeed, in a manner also consistent with a given version of the Open Channel specification or typical zoned drive architectures). As illustrated in FIG. 9C by numeral 961, where translation is performed by the storage drive, hardware (or instructional) logic can obtain ASL parameters 963 and a LBA value 965, and combine both of these values in circuit 967 to obtain a physical address (see e.g., the ASL LUT parameters of FIG. 4B and similar discussion in U.S. Pat. No. 9,542,118); the result of this calculation is a flash address tuple 969 identifying a physical address in flash.

With zones being defined for/allocated to applications, the logic can then proceed to calculate per-application write buffer requirements, with an exemplary flow represented in FIG. 10. The flow as indicated by numerals 1001 and 1003 retrieves zone latency and power fail requirements, if any, specified in connection with some application in question or otherwise assigned by the host system (e.g., in dependence upon application priority or host system considerations). The associated logic also retrieves (1005) from the SSD write buffer resource totals and host-configured zone parameters and, using that information, determines zone buffer size values for each application and/or client. Depending on these various values and storage drive resources, and if supported in the particular implementation, the logic then configures fast write completion settings and whether a write buffer will be supported by SDRAM or by NVRAM only, as implied by function block 1007. The depicted logic then determines a write buffer allocation on a per-zone basis, per numeral 1009. Once these steps have been performed for all zones, the logic then proceeds to assess aggregate impact, including whether the storage drive has sufficient buffer resources to support the determined aggregate write buffer allocations and whether adjustments need to be made in the allocation for any given application(s) in order to meet storage drive constraints, per numeral 1011; zones and supporting write buffer desired capacities are then configured as referenced by the FIG. Finally, the logic can then report zone configuration and buffer settings to the allocator and attribute configurator, for example, as referenced by numeral 823 of FIG. 8.

With tentative write buffer requirements thus being determined, per application (e.g., per client), the host system then proceeds through its normal operating processes. It was earlier noted that some storage drives may have hundreds to thousands of defined zones, and that zones allocated to a given application may be filled up (and not written until the zone is released and recycled) and conversely may not be needed until a particular application initiates a process to store and/or update data. As the management requirements and more specifically the write buffer requirements needed to support a large number of zones can potentially require much more RAM capacity than provided by a storage drive (and/or memory controller integrated circuit), in some embodiments, host software and/or storage drive software include logic that allocates write buffer resources only when and as needed. This is to say, the storage system and/or the host application in any given implementation might limit the number of zones that can be open at any given time and/or the size of the write frontier that can be utilized at any given time. FIGS. 11A-19 relate to exemplary techniques that can be used to provide and regulate associated dynamic write buffering capability.

Figure 11A:
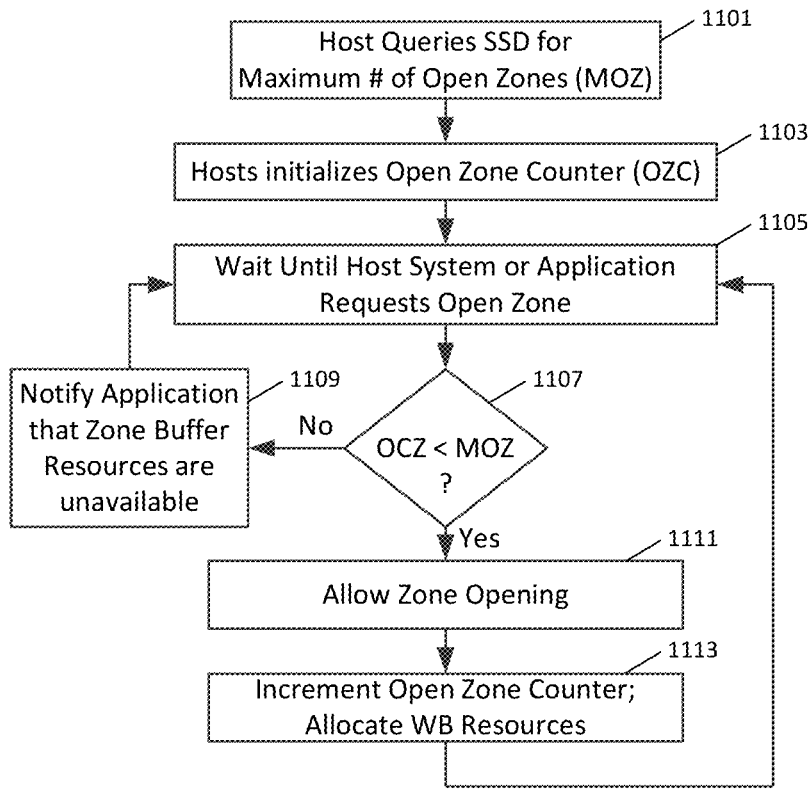
FIG. 11A is a block diagram showing functions used in an embodiment where host system opens a zone.
Figure 11B:
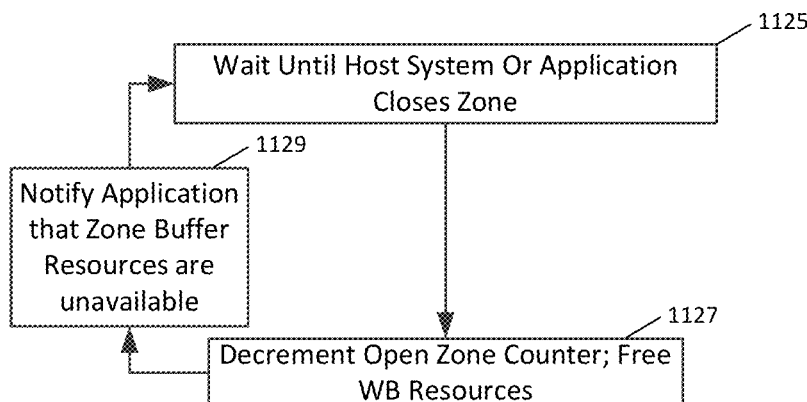
FIG. 11B is a block diagram showing functions using in an embodiment where host system software closes a zone.

FIGS. 11A and 11B illustrate techniques for managing the process of opening and regulating the number of zones on the side of a host system. As represented in FIG. 11A, when an initial request is made for storage in a given storage drive, the host system first queries (1101) the SSD for an indication of the maximum number of open zones (MOZ) permitted for the SSD. Note that in some implementations this value will have been specified by the SSD/storage drive manufacturer (and stored in an SPD register entry for example) while, in other in implementations, the host system software will have generated this value and imposed it on the storage drive (e.g., in consideration of the application needs and available storage drive resources, for example, as discussed in conjunction with the flow depicted in FIG. 10, with ensuing programming of storage drive configuration registers). The host system then initializes an open zone counter (OZC) and waits for a new request from an application/client, per numeral 1105. When such a request is received, the logic flow ascertains (1107) whether the request permits the number of open zones for the storage drive to remain within the identified maximum; if so, the zone is opened (1111) and write buffer resources are allocated as needed, and the open zone counter (OZC) is incremented (1113). If zone resources are not available relative to the maximum (MOZ), the application is so informed per numeral 1109 (and the application/client typically may wait until an existing open zone is completed and/or otherwise closed). Note that in some implementations which feature multiple storage drives, if desired, a routine can then be employed by the host system to determine whether another storage drive can immediately provide the requested resources. Conversely, when a zone is filled (i.e., the write pointer for the zone matches zone capacity) or it is otherwise determined by the application or the host system that a given zone should be closed, as represented by numeral 1125, the host system then proceeds as represented in FIG. 11B. That is, the host system decrements the open zone counter (1127) and notifies the associated application that the particular zone has been closed (1129); it will thereafter be left up to the particular application/client to request the opening of a new zone, or that a particular zone be reopened, or alternatively, that existing data should be modified. In the case of data modification, the host system can be structured, depending on implementation, to assign a new LA to the particular data, or to modify existing data (and rewrite the entire zone or a specific data segment to a new zone), so as to support the application's storage needs. In addition, for any application required to wait (e.g., a zone opening request was denied because of insufficient available resources), it will be the responsibility of that application to try again, or alternatively, a designer might choose to configure the host system to implement a reservation system that causes the host system to return to a previously denied requestor, to indicate that the previously denied request can now be honored.

Reflecting on the operation depicted in FIGS. 11A-11B, as each new zone is opened or a zone is closed, the host system and/or the storage drive responsively allocates or frees write buffer resources in a manner accounting for any calculated buffering capacity precomputed for the opened/closed zone. For example, in connection with the write buffer allocation processes described above, individual applications can be linked to one or more zones supported by the drive (and these zones can be changed, e.g., zones filled, migrated to new storage, and reset as conditions dictate); returning briefly to the discussion of FIG. 4E, if a zone corresponding to BD4 is indeed assigned a triple storage capacity (i.e., 768 k instead of 256 k), as this zone is opened, 768 k could be provisioned in SDRAM resources, with associated zone-specific pointers into these SDRAM resources, and conversely would be deallocated when this zone is closed. On an intermittent basis, this default allocation can be adjusted as described further below, for example, depending on error rates reported by the storage drive for the particular zone, available resources, priorities and other factors. The freeing up of write buffer resources as zones are closed permits recirculation of associated capacity to meet the needs of other zones as they are opened and written to (or to service other needs of the storage drive for RAM capacity, such as for example, relating to metadata tracking).

Figure 12:
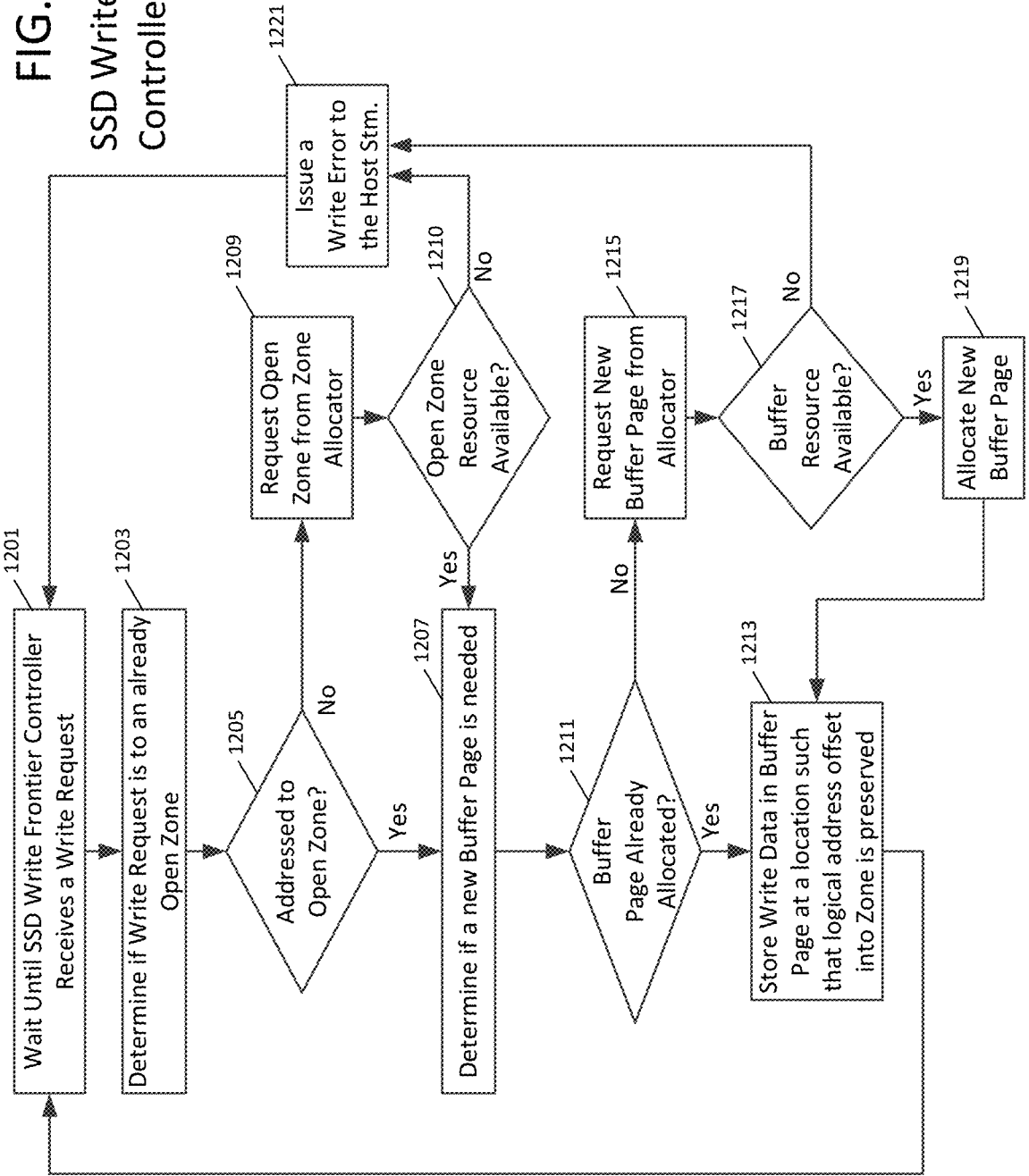
FIG. 12 is a block diagram showing a SSD write frontier controller, e.g., employed by logic of one embodiment of an SSD.

FIG. 12 illustrates SSD write frontier control functions, which are used to map new writes to particular zones (and associated write buffer allocations) in the storage drive. The storage drive is assumed to receive a new write request, per numeral 1201. In a typical embodiment, as referenced previously, the write request will include a LA (e.g., a zone identifier or structural identifier or other address, although in a typical embodiment, an LBA will be provided that implicitly indicates a particular zone). Logic on the SSD determines whether the newly received write request is directed to an already-opened zone, per numerals 1203 and 1205, and if so, determines whether the request is directed to a partially-filled buffer page or requires a new buffer page, per numerals 1207 and 1211. If the newly received write request is not directed to an open zone, the storage drive proceeds to request a new zone, per numeral 1209 (e.g., in some embodiments, open zone management can be performed on the host system and in other embodiments, open zone definitions can be stored on the storage/drive SSD, e.g., in internal SDRAM); this process either results in a new zone opening, per numeral 1210 (e.g., the host process represented by FIG. 11A can be triggered) or conversely a write error can be generated if no zone resources are available, per numeral 1221. Assuming that a zone is open and that write buffer resources are available, the logic then operates to store the newly received write request data in the appropriate buffer location, utilizing any necessary LBA offset, as indicated by function block 1213. For example, if the newly received write specifies a 4 k data block that will be the second LBA in a 16 k page, the software would write associated data to the second of four slots in a 16 k page being staged in SDRAM. As indicated by function blocks 1215, 1217 and 1219, if a new page is requested in the write buffer, the depicted logic flow proceeds to identify/open up one or more next pages and similarly position the new data at the appropriate location. It will be recalled in connection with this discussion that in some embodiments, each zone will be allocated a minimum write buffer capacity corresponding to the associated write frontier and potentially a greater capacity dependent on other considerations; in the depicted embodiment, out of order writes are unentangled by staging LBAs as they arrived, with the extent of out of order entangling being limited to a distance represented by write buffering capacity allocated to the zone. In the depicted embodiment, out of order writes within this distance are unentangled without generating an error (thereby permitting the storage drive to still accommodate any requirement for sequential order writes in each zone, i.e., following unentanglement); however, note that in some embodiments, if write address order deviates from a current write pointer value by an amount greater than the addressing distance accommodated by the zone-specific write buffering capacity, an error indication is generated for the host system (or other remedial action is taken), as represented by numeral 1221.

It was referenced just above that some embodiments can support handling of open zone requests by the storage drive/SSD. In some implementations, this processing can be performed in lieu of open zone management by the host system, while in other implementations, this processing can be performed on a cooperative basis, with the storage drive/SSD and the host system exchanging communication to open and close zones in tandem.

Figure 13A:
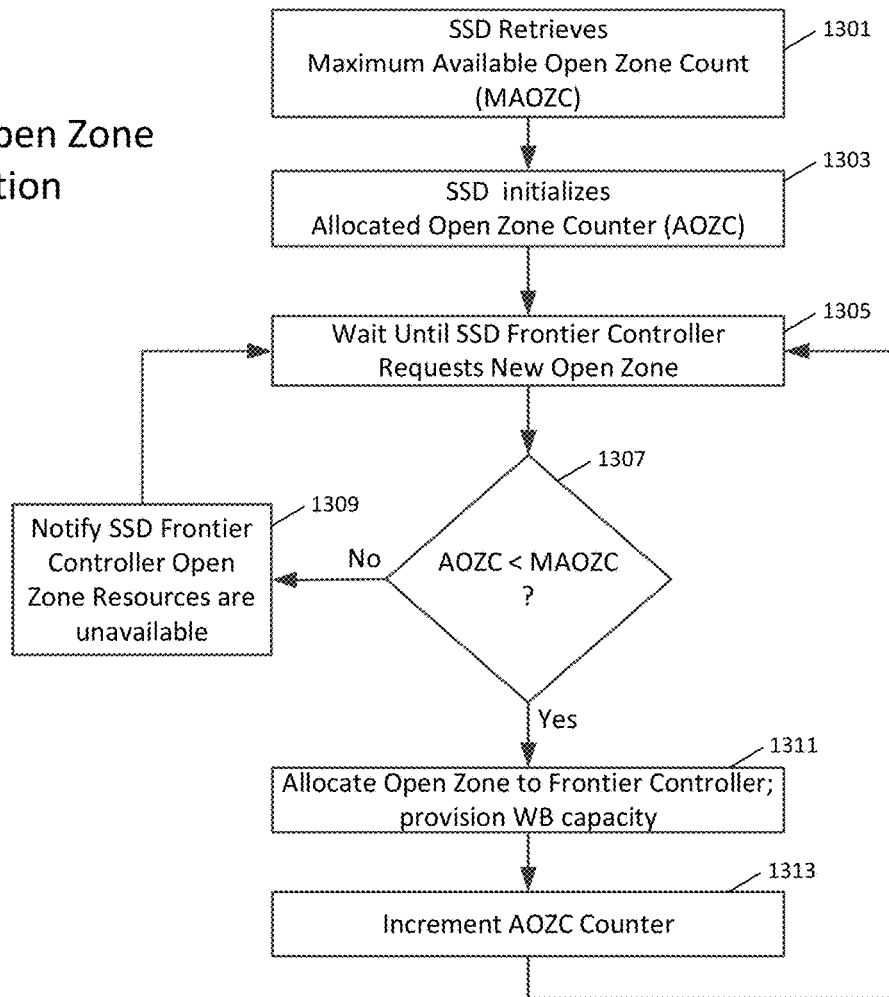
FIG. 13A is a block diagram of a SSD open zone allocator function, used in one embodiment.

As represented in FIG. 13A, the zone opening process performed by a storage drive can parallel those operations depicted in FIG. 11A. The storage drive/SSD first retrieves (1301) from a storage register (e.g., an onboard SPD register) a specification of the maximum number of permitted concurrently open zones; as before, this value can be set by the manufacturer, but in other embodiments, this can be configured and programmed by the host system, for example, after reconciling the needs of multiple applications/clients, as discussed earlier. Per numerals 1303 and 1305, the storage drive/SSD initializes an open zone counter and waits until the write frontier controller requests a new open zone (e.g., a new write has been received and does not correspond to an already-open zone). The depicted logic flow ascertains, relative to the maximum permitted open zones, whether the new zone opening request can be honored, per decision block 1307. If resources are not available, the requesting application is so informed (1309) and must either try again later or an appointment process is implemented, as referenced earlier, to alert the pertinent application/client that its request can be honored. Assuming sufficient resources are available, the depicted logic allocates an open zone to the frontier controller and provisions a write buffer (for example, by erasing preexisting contents, overwriting access pointers used for directing other agents to SDRAM, setting appropriate pointers, and so forth), per numeral 1311, and it increments the open zone counter.

Figure 13B:
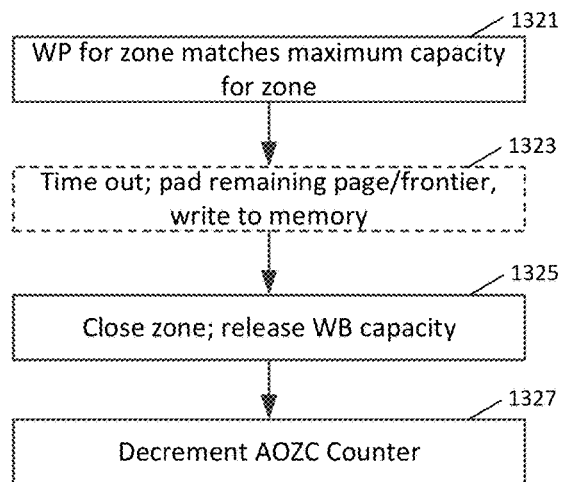
FIG. 13B is a block diagram of a SSD zone closure function, used in one embodiment.

Depending on implementation, the storage drive/SSD can also be configured to close open zones; for example, as indicated in FIG. 13B by numeral 1321, when a write pointer matches the capacity of an open zone, such that the zone can no longer fit any more data, that zone can automatically be closed. As indicated by numeral 1323 (and as is discussed further below), a time-out function can also be applied, for example, to complete any incomplete write frontiers (e.g., padding associated data with logic "1 s" or "0 s" and writing the associated frontier or page to memory), with the zone then being closed and the open zone counter being decremented, per numerals 1325 and 1327. In some implementations, the zone closure process can also be shared between the storage drive/SSD and the host system; for example, the host may request that a zone be closed, or a designer for a particular implementation might choose to set a relatively long time-out function in a storage drive so as to close zones, with the host managing tracking of open zones and performing the primary zone closure function. As this example should help demonstrate, there are many variations of the depicted processes which will occur to those having ordinary skill in the art and which might counsel usage or adaptation to meet the needs of a given implementation. Once again, the exemplary logic flow of these FIGS. is meant to be illustrative only.

Figure 14:
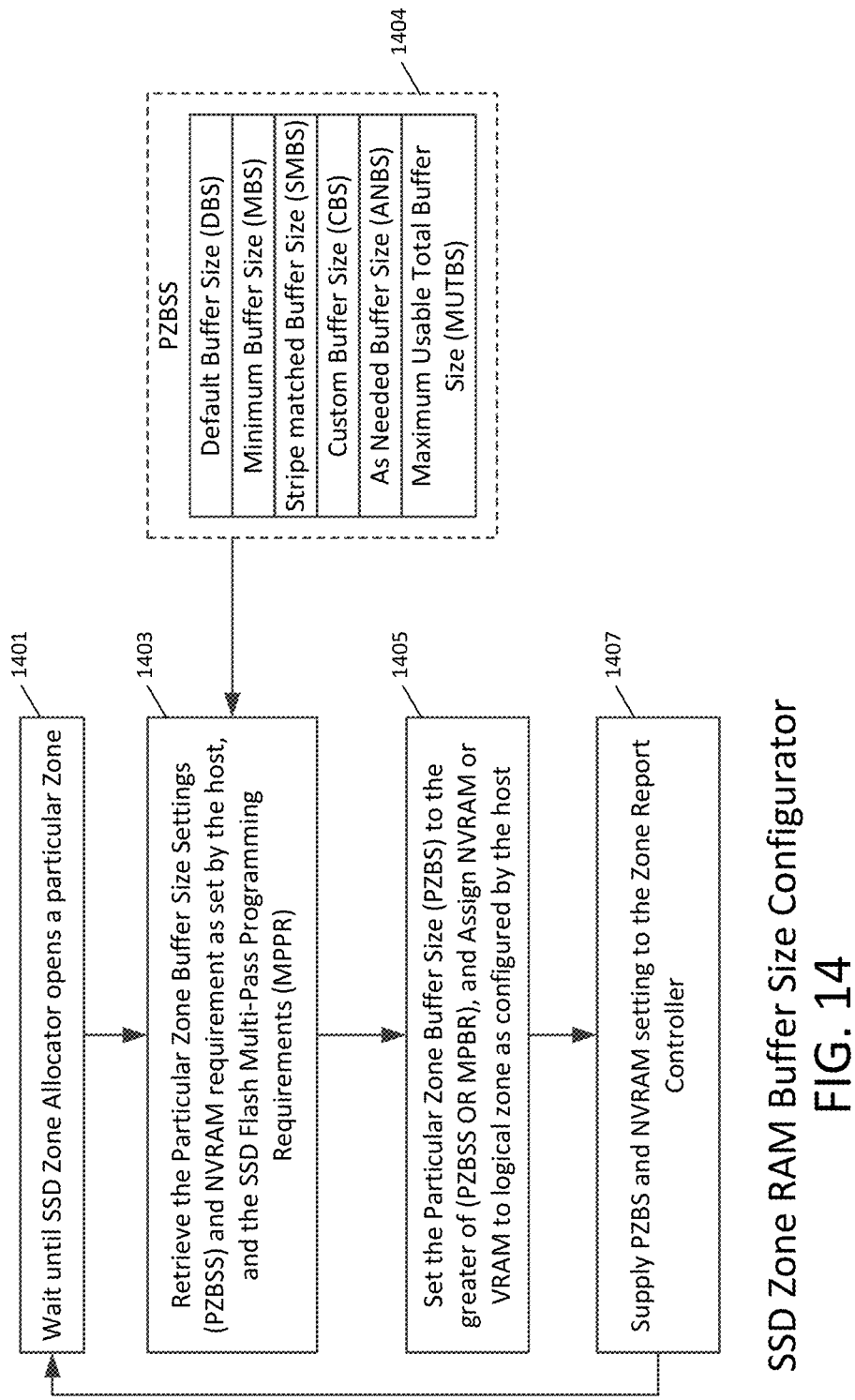
FIG. 14 is a block diagram of a SSD zone RAM buffer size configurator, used in one embodiment.
Figure 15:
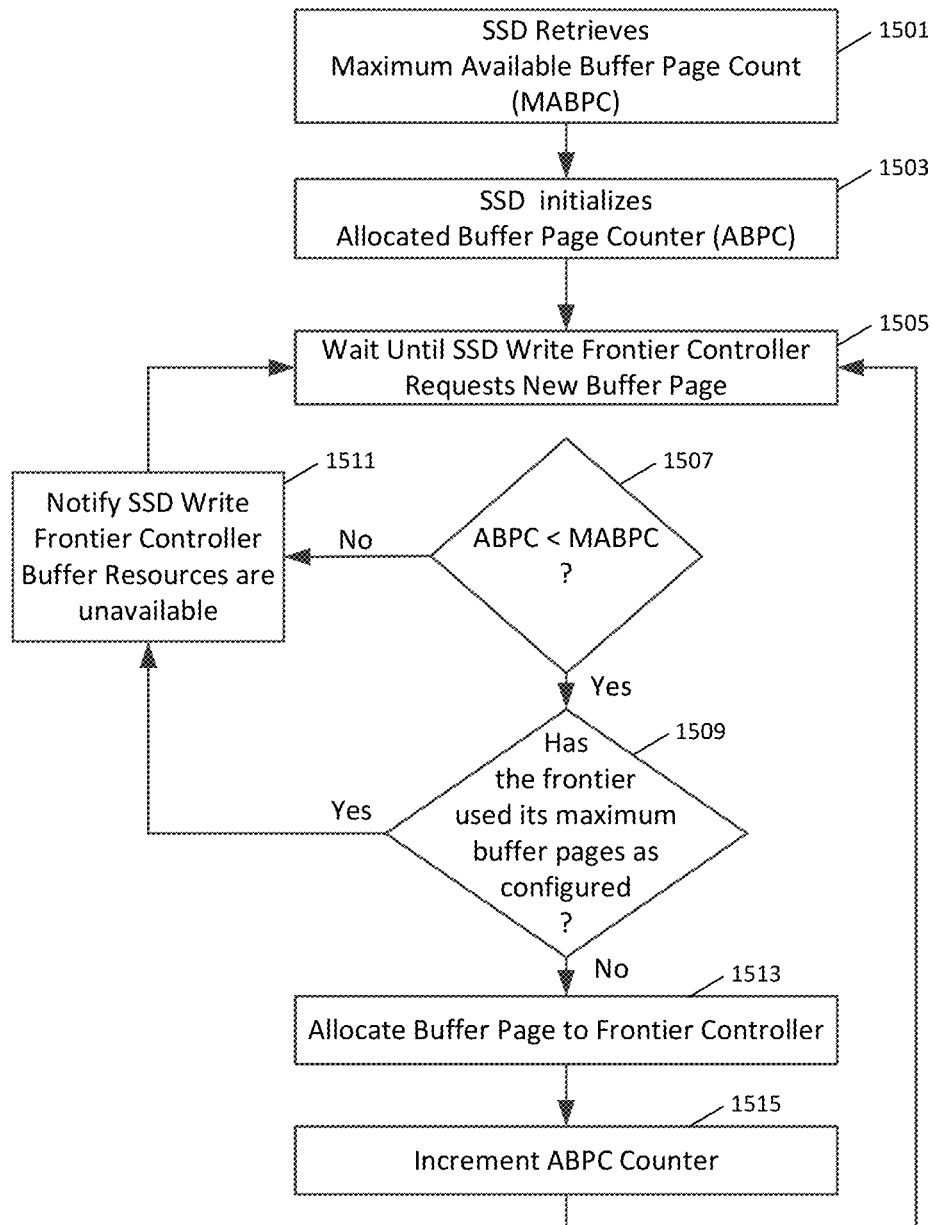
FIG. 15 is a block diagram of a SSD RAM buffer page allocator, used in one embodiment.

Exemplary logic processes used to manage write buffer capacity and allocation are illustrated in FIGS. 14 and 15. When and as a zone is opened, per numeral 1401, the logic flow retrieves (1403) zone write buffer settings (PZBSS, referenced by numeral 1404) which were defined in connection with the earlier allocation processes and stored in registers/memory of the host system or in registers/memory (e.g., SDRAM) of the storage drive. The logic also examines any SSD flash multipass programming requirements (e.g., such as might be pertinent to MLC usage and to how data will be stored in memory in view of any pertinent ASL settings) and also determines whether the particular application is to have write data buffered in SDRAM or in NVM, all as referenced by function block 1403. The logic allocates buffer resources (i.e., sets PZBS) in view of the retrieved parameters, and also allocates either volatile resources (e.g., SDRAM) or nonvolatile resources in view of the particular application's buffering requirements, interacting to this end with a zone report control function (1407). This latter, zone report control function, manages write buffer allocation on behalf of all requestors, e.g., to provide write buffering capability to various open zones, interacting with other storage drive management functions as needed, and to adjust/revoke write buffer provisioning as zones are closed and as allocated write buffer sizes are adjusted. As depicted in FIG. 15, as a write of a first LBA is received for a newly opened zone, logic also loads a maximum available buffer page count for the zone and initializes a buffer page counter for the zone, as represented by numerals 1501 and 1503. As will be discussed below, within the context of this provisioning, writes of LBAs directed to an already-opened page defined within the write buffering allocation will be serviced by already allocated buffer resources; for other LBAs, the depicted logic evaluates whether the newly received write request specifies an LBA within the address unentanglement distances supported by the write buffering capacity allocated to the particular zone. If the new write can be serviced by the buffering capacity (but outside of an existing page being staged), the logic advances a buffer page counter (and allows the data to be stored/staged in a new buffer page for that frontier) and, if it cannot, it generates an error or takes other action, as collectively represented by function blocks 1505-1511. Error event signaling and/or remedial action can once again take different forms depending on embodiment. For example, in lieu of generating a system error signal, logic can simply cause the drive to send to a requesting application an indication that the write request is rejected and that the application must consequently wait; alternatively, as discussed earlier, the storage drive in a different embodiment might be configured to transmit an acknowledgment back to the requestor with a current value of the write pointer for the zone, or some increment thereof, thereby alerting the application that it must retry missing LBAs before the new write can be accommodated. Clearly, many variations of the depicted processes are possible and will occur naturally to a designer having ordinary skill in the art.

FIG. 16 illustrates exemplary functions that can be employed in connection with a write control function of the SSD. Per numerals 1601 and 1603, as each new write request is received, the storage drive/SSD proceeds to determine whether the storage drive should issue a write completion notice to the host system. For a situation where write granularity is less than each page or write stripe of data (i.e., each page accommodates writes of multiple LBAs), the depicted logic assesses whether the newly received write request represents the final LBA block for a current page or write stripe being staged in the write buffer, as per numeral 1605; if the newly received write does not complete the particular page or write stripe being staged, the logic signals to the host system an immediate write completion, per numeral 1607, looping back as indicated. [This notification is potentially held when the newly received write represents the last block for a page, e.g., signifying a potentially busy state for the drive.] If it is determined that the page or write stripe is now complete with the new LBA, the logic determines whether the storage drive is configured for early completion signaling (i.e., as will be discussed below, in some embodiments, this capability turns on whether the storage drive, considering backup power write completion capability, is structured to finish the actual writes into nonvolatile memory assuming an imminent power loss). For some embodiments, per numerals 1613 and 1615, the system can immediately signal write completion to the host system notwithstanding that data has not yet or still is in the process of being written into memory (and might still be unstable from a read access perspective). Per numerals 1617 and 1619, if early completion signaling is not supported, the storage drive waits until validation of the newly-written page into nonvolatile memory and it thereafter signals completion. As the page as written into memory is validated, the storage drive releases the write buffer page used for staging, i.e., thereby freeing reassignment of that page for writes of new LBAs for that particular open zone. Note that many variations will occur to those having ordinary skill in the art. For example, contemplated embodiments can feature a host system-issued commit command and/or a framework where data for multiple (finally staged pages) are aggregated and written in bulk. This is to say, it may be desirable in some circumstances to provide a framework where finally staged (completed) pages, write stripes and/or page sets are held in the write buffer, with the host system optionally being notified that staging is complete and that the data is ready for commit to memory; this can be effectuated by the host as part of an explicit request (e.g., with multiple accumulated pages/writes then being written in bulk). Alternatively, this can potentially be hardwired into the design of the system, e.g., the storage drive accumulates a fixed buffer capacity or even potentially an entire zone, and only writes data at predetermined windows (e.g., configured by the host system) or when the zone is finished. It is also possible to have the host system request immediate commit to memory of pages/page sets that are only partially staged.

Figure 17B:
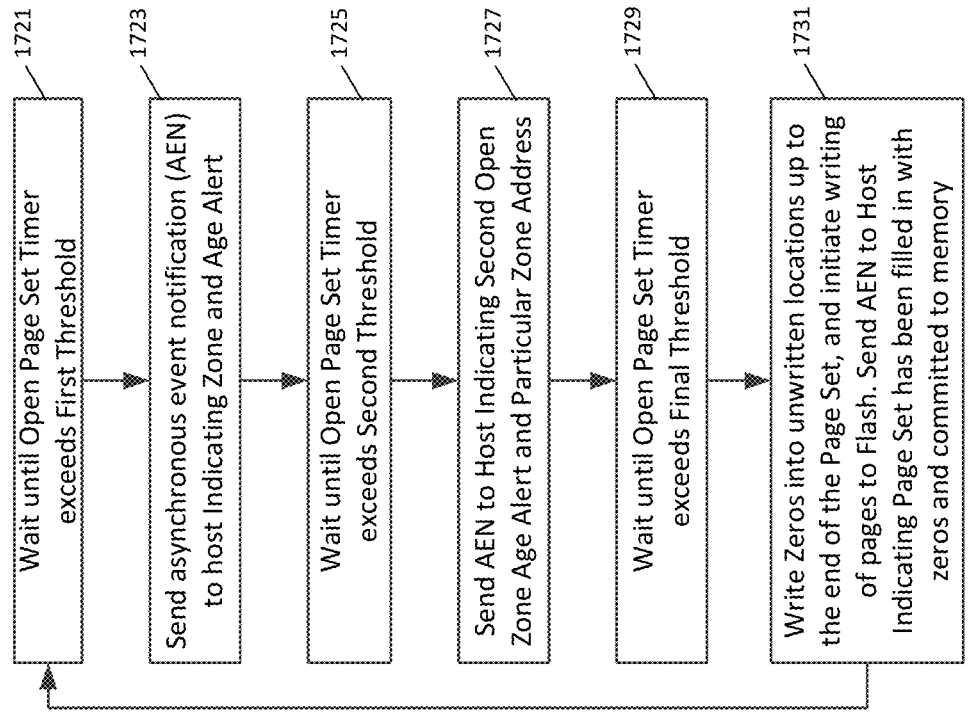
FIG. 17B is a block diagram showing a set of functions that can be used in one embodiment to manage an unfinished write frontier.
Figure 17A:
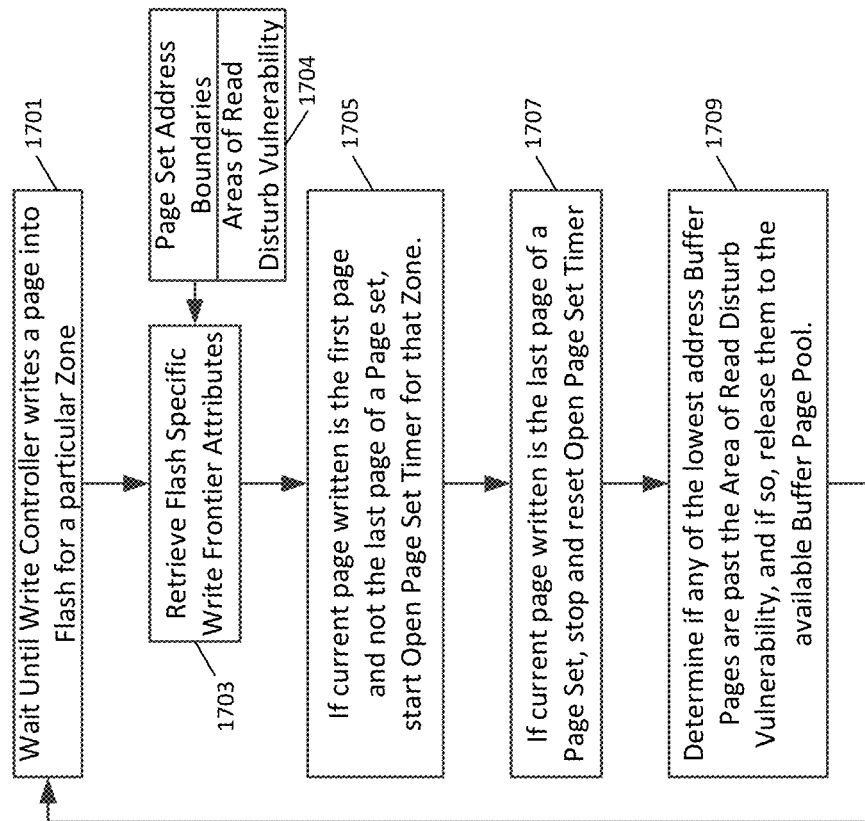
FIG. 17A is a block diagram showing a set of functions that can be used in one embodiment to manage an unfinished write frontier.

It is possible that, for a page or write frontier being staged, a buffer page will be kept open for an excessive amount of time without the staging being completed. FIGS. 17A-17C are used to discuss some exemplary processes for managing the closure of such a page and/or write frontier (note that, as this statement implies, in some embodiments, the depicted processing can be performed on page-wide-basis or a frontier-wide-basis (write stripe size); for purposes of the discussion below, it will be assumed this functionality is to be applied on a page-wide basis, with frontier-wide application being a straightforward extension of the disclosed techniques).

In one embodiment, as represented in FIG. 17A, the depicted processes can be initiated any time the write controller logic receives at least some data for an open zone, per numeral 1701. Flash-specific write frontier attributes, including any page set address boundaries and criteria for read disturb vulnerability, can be retrieved as denoted by numeral 1704. As initial data for each page is received (e.g., a write of a constituent LBA), the logic initiates an open page set timer for the particular zone, per numeral 1705. This timer will be used to evaluate time-out conditions for writing of a set of pages encompassing the newly received page; as staging of the page is completed by receipt of the final missing LBA for a page set, the timer is stopped (and reset), per numeral 1707. Note that some embodiments can be configured to support retention of written data in the write buffer for a period of time, notwithstanding write completion (i.e., notwithstanding successful validation that a page in question has been committed to nonvolatile memory); for example, such a process can be used to address a possibility that writing of adjacent pages in nonvolatile memory causes a read disturb effect, or otherwise to write a set of pages in bulk from a memory controller for the storage drive to memory. To this effect, write buffer provisioning and release is constrained in some embodiments to continue to store data in the write buffer until a constituent EU (or other neighborhood) in memory is completely written, i.e., full, at which time associated pages can be purged from the write buffer and released to a general buffer pool (e.g., per the functions indicated by numeral 1709).

As indicated in FIG. 17B, the timer can be compared to a first threshold, as represented by function block 1721, and an excessive age alert can be sent to the host system as an asynchronous event notification (AEN) which identifies the particular open zone and any pertinent addresses related to the alert, per numeral 1723. This notification can be used to provide the host system with additional time and/or an opportunity to remedy the situation if the timing violation is the result of an error. In one embodiment, additional alerts can be used to trigger further notifications, determination that an error condition exists, or other actions. For example, if a second timer value is exceeded (1725), a second alert can be sent to the host system, per numeral 1727. Advantageously, the depicted logic can employ yet another (third) timer value (per numeral 1729) and can take action with or without further notice to the host system, as referenced by numeral 1731. For example, in one implementation, the page and/or page set being staged is padded with values (e.g., zeros) and written to flash memory as though it were fully completed. This schema facilitates relatively short time-periods for the framing of pages and helps minimize situations for which read disturb effect might otherwise create issues. Note that for some embodiments, read requests for data being staged can be served directly from this cache, at least until a page set is written (and potentially longer, e.g., until a given zone is closed). In other embodiments, as might be desired by a designer, other actions are taken (such as discarding the data, invocation of an error reconciliation process, or assertion of an error code). Other variations will also occur to those having ordinary skill in the art.

FIG. 17C illustrates a process where another time-out function is used, this time to close open zones which have remained open an extended period of time. In contradistinction to the time-out function illustrated in FIGS. 17A and 17B, it is contemplated that an open zone timer will be measured against a much longer amount of time—for example, potentially minutes or hours—than would be used for a page-set time out feature. As illustrated in FIG. 17C by numerals 1741, 1743, 1745 and 1747, an AEN can be sent to the host system when a first threshold is satisfied (e.g., exceeded). This AEN communicates an age alert and signifies that the memory controller for the storage drive will unsolicitedly close the zone in question unless the host takes action. A second threshold is then used to take action if the host system does not close the zone itself. As indicated by numeral 1747, in one embodiment (i.e., assuming any open page sets have been resolved), the storage drive will simply close the open zone and return its buffer resources to an at-large pool; in another embodiment; in other embodiments, the remainder of the zone can be written (e.g., padded with 1's or 0's) and it can be left to the host system to resolve any issues associated with forced zone closure.

Figure 18:
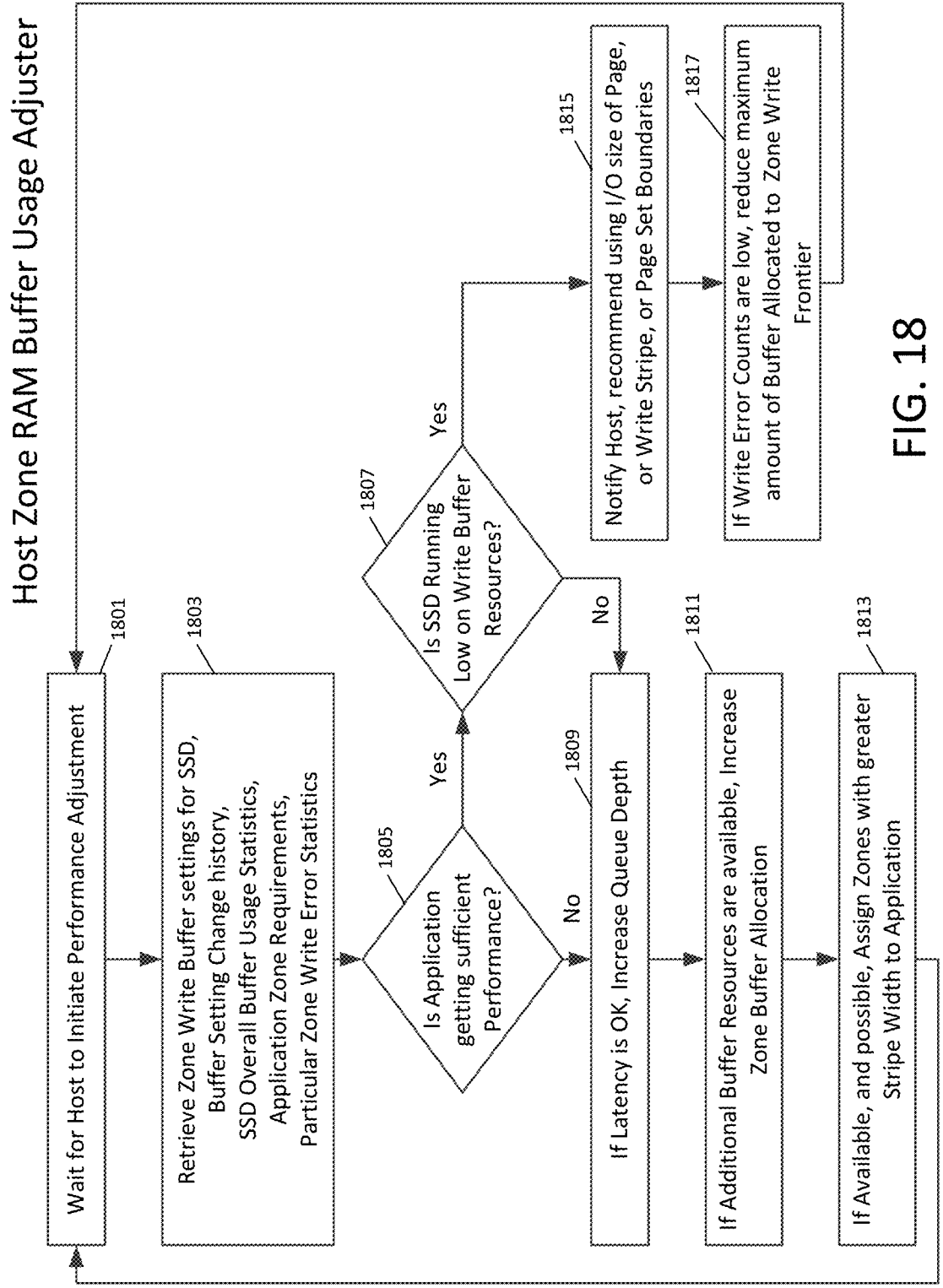
FIG. 18 is a block diagram of a host zone RAM buffer usage adjuster, i.e., that can be used in one embodiment to adjust write buffer resources per zone.
Figure 19:
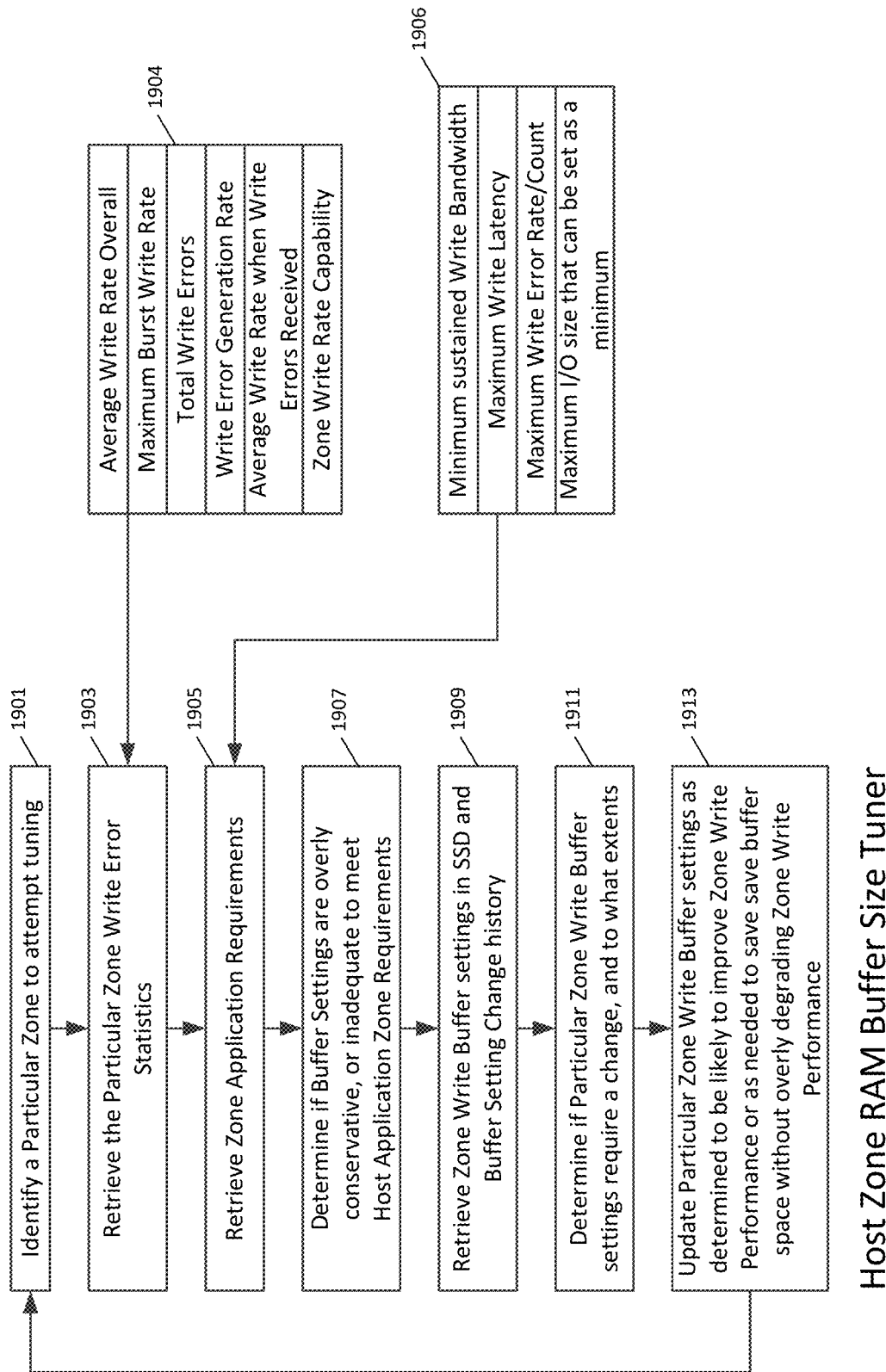
FIG. 19 is a block diagram showing functions of a host zone RAM buffer size tuner, e.g., that can be used in conjunction with functions referenced in FIG. 18.

FIGS. 18 and 19 illustrate functions that can be performed by logic onboard an SSD in adjusting write buffering capacity.

As indicated by numeral 1801 in FIG. 18, in one embodiment, the host system initiates a performance adjustment process. The adjustment process can be invoked on an ad hoc basis by the host system (e.g., in response to an error condition or, indeed, any one of a number of other events, e.g., zone opening or closure, application launch or application termination). In one embodiment, the adjustment process is initiated on an intermittent basis or after a threshold number of errors have been identified. The host queries the storage drive, and the storage drive responsively retrieves zone write buffer settings, error statistics and usage statistics, and the host retrieves zone/performance requirements of the applications, and a change history, as collectively indicated by numeral 1803. The depicted logic then determines whether a given, open application is receiving sufficient performance, per numeral 1805, in reference to the retrieved application requirements. Per decision block 1807, the process can assess whether the storage drive has excess resource capacity and, if there is no performance issue (or conversely if the application is not receiving sufficient performance) then, per numerals 1809, 1811 and 1813, the logic can increase application queue depth, write buffer provisioning for the particular zone, or assignment of zones with better performance (e.g., stripe width or other advantageous ASL parameters). If there are performance issues, e.g., limited resources, the host can evaluate whether 10 size, write stripe size or page boundary size should be changed, or whether allocated buffer resources should be reduced, per numerals function blocks 1815 and 1807. In one embodiment, the SSD detects excessive write errors for a particular zone, as may be defined by a host configurable threshold or other means, and notifies the host using an asynchronous event notification (AEN), together with a recommendation that the host adjust the zone settings or usage behavior, or I/O size, etc.

FIG. 19 provides additional detail regarding an example as to how logic can determine whether a given application is receiving sufficient write buffering resources. Per numerals 1901 and 1903, the logic identifies a particular zone under evaluation and retrieves zone write error statistics (e.g., with an exemplary set of data being referenced by numeral 1904). For example, if write errors are relatively frequent (as tracked by the storage drive or host system and stored in registers or RAM as appropriate), the logic can conclude that insufficient out of order write unentanglement capability has been provided and may choose to increase allocated buffering capacity, conversely reducing allocated capacity if write errors are infrequent. These decisions can be evaluated using zone application requirements available to the host system, such as those identified by numeral 1906. For example, if a maximum write latency specified for a given application are not being met, the logic can similarly determine that buffering resources should be increased if spare capacity is available. In all cases, one or more suitable thresholds can be supplied by the host system or can be hardwired into a design, e.g., it is possible to have a first threshold applied to obtain additional buffer resources, if such are available, and a second threshold applied to mandate minimum resources to be provided in all events. As indicated by numerals 1907-1913, the logic determines whether existing settings can be changed and should be changed, and optionally, the extent of change necessarily, responsively updating write buffer provisioning as appropriate.

Figure 20:
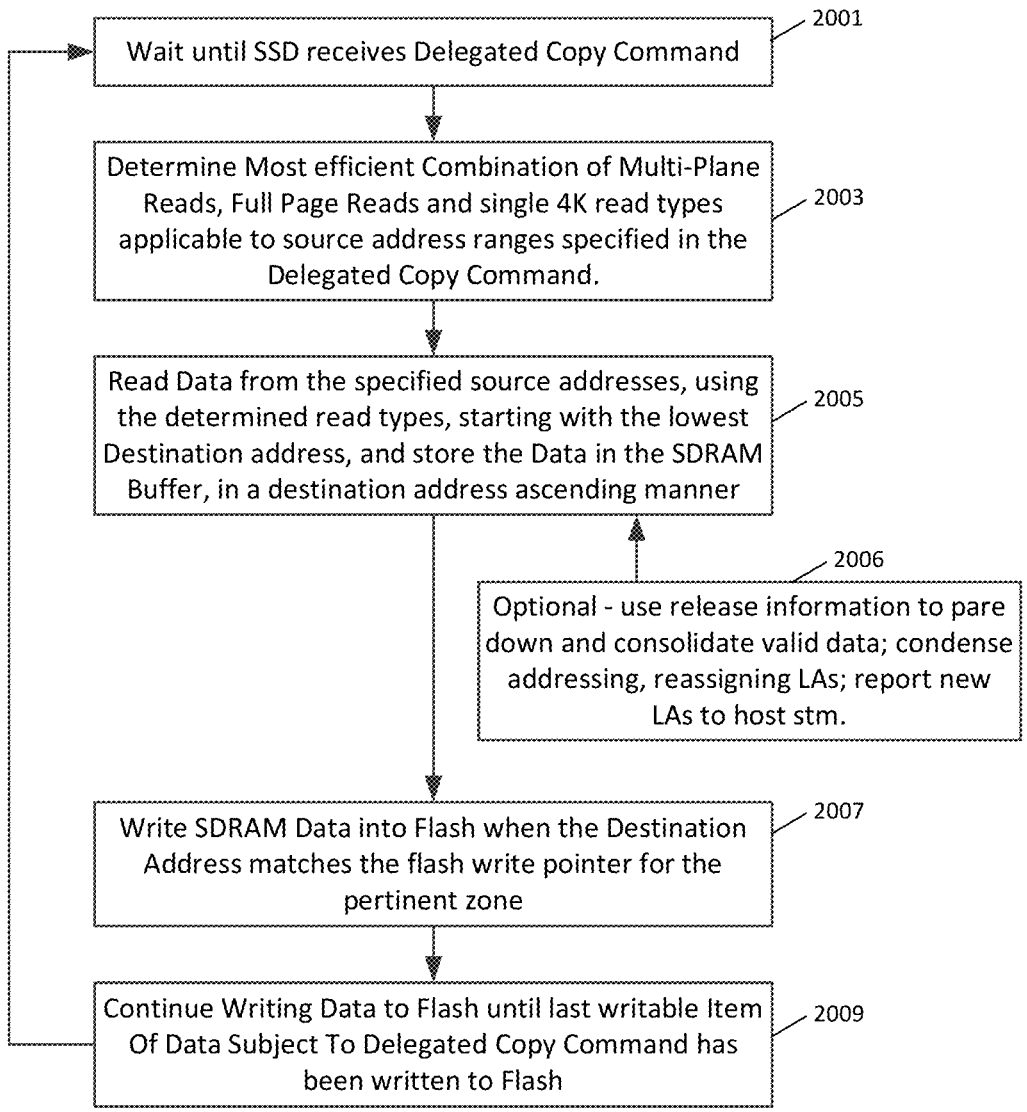
FIG. 20 is a block diagram of a SSD delegated copy smart controller, e.g., that can be used by a storage drive in one embodiment to manage data relocation without sending data to a host system.
Figure 21:
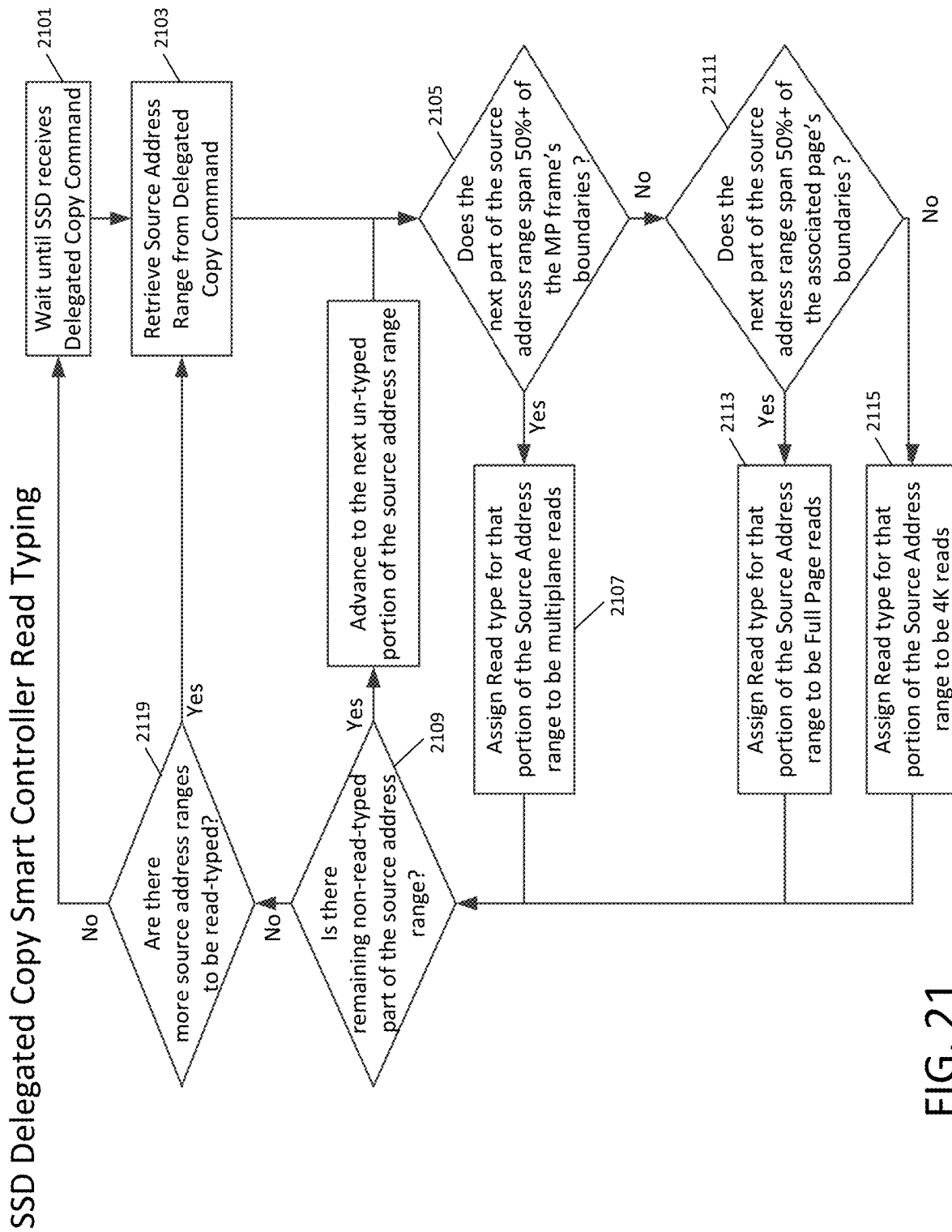
FIG. 21 is a block diagram showing functions associated with read typing, e.g., that can optionally be used to optimize data reads and various operations referenced in FIG. 20.
Figure 22A:
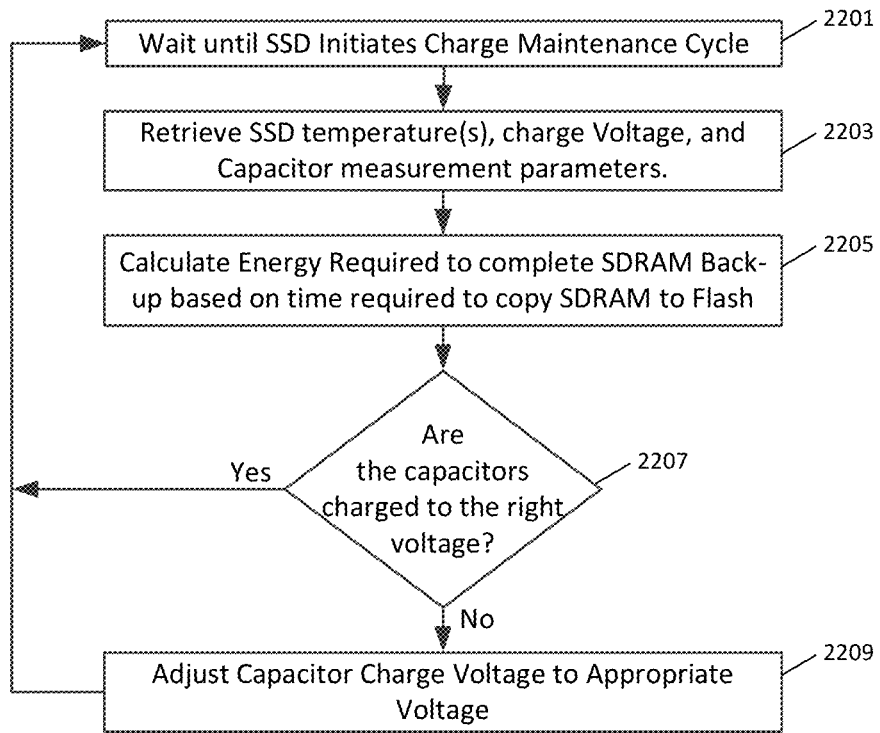
FIG. 22A is a block diagram showing a first embodiment of functions used by a SSD RAM buffer back-up power controller.
Figure 22B:
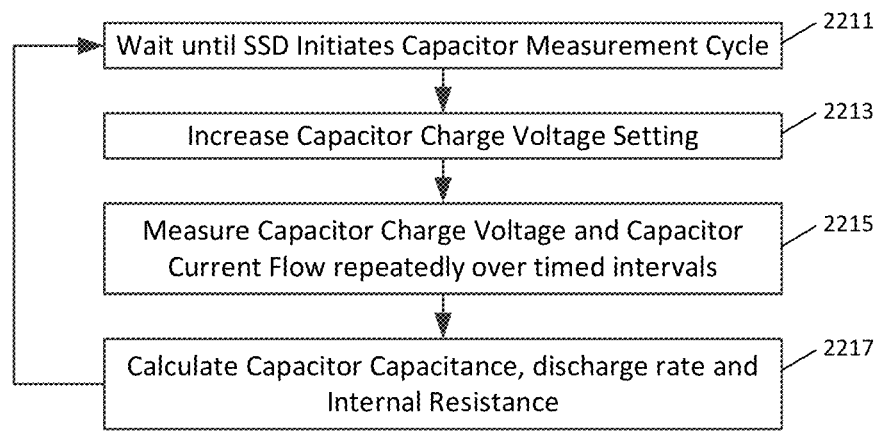
FIG. 22B is a block diagram showing a second embodiment of functions used by a SSD RAM buffer back-up power controller.
Figure 23:
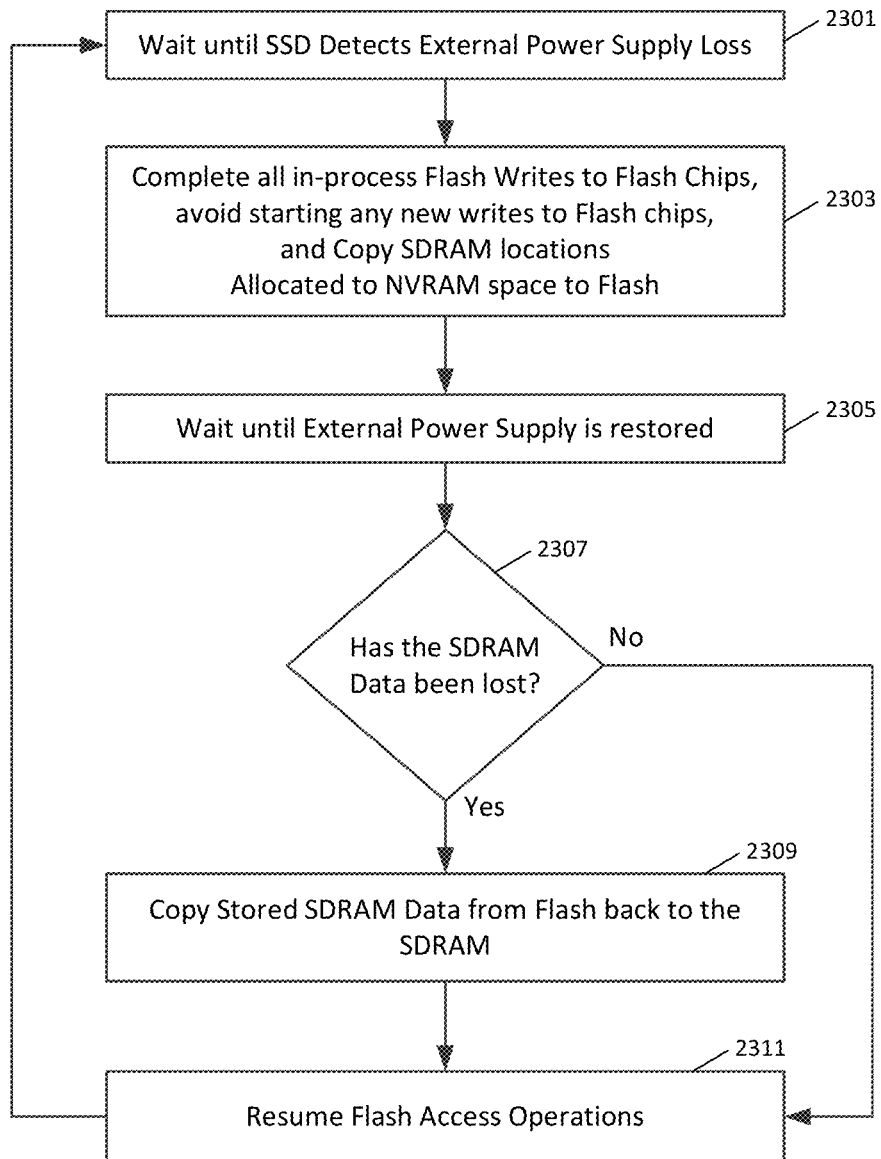
FIG. 23 is a block diagram showing functions associated in one embodiment with a SSD RAM buffer back-up controller.

FIGS. 20-23 are used to discuss several other exemplary features that can be utilized in an exemplary system architecture, in some cases by logic embodied in a host system, and in other cases by logic embodied in a storage drive (or associated memory controller), or cooperating logic of both a host system and storage drive. FIGS. 20-21 are used to discuss delegated copy processes, pursuant to which data can be moved for example from one location in memory to another without sending data to the host system; FIGS. 22A-22B are used to discuss some configurable backup power options that may be supported in some embodiments; and finally, FIG. 23 is used to discuss internal RAM backup (SDRAM backup) configurability that can be supported by some storage drives. As with other embodiments discussed here, each of these features should be regarded as optional and nonlimiting.

FIG. 20 illustrates some exemplary functions that can be implemented by logic that handles the copying of data from one location to another within a storage drive. As indicated by numeral 2001, some embodiments support an architecture where a host system can issue to a storage drive a copy command to copy data from a first memory location to a second memory location without sending the data to the host system. The incorporated by reference documents discuss infrastructure that can be used to perform a copy operation and associated metadata tracking in conventional FTL drives. In the context of the present disclosure, a copy request sent by a host system can specify source logical addressing (e.g., a first LBA associated with a first zone that will serve as a source of the copy operation) and, optionally, destination logical addressing (e.g., a second LBA associated with a second zone that will serve as a destination for data being moved). For example, such a host system-issued request can take the general form of COPY[LBA1:LBA2] where the storage drive responsively loads reads data from a memory die associated with LBA1 and writes the data from the memory controller for the storage drive directly to LBA2 without further interchange with the host system. It is also possible to use structural addressing and optional address assignment by the storage drive, depending on embodiment. For example, another version of this host system-issued request can take the form COPY[ZONE1: ZONE2] where the storage drive (a) identifies remaining unreleased data in zone 1, (b) reads and compacts that remaining valid data to a correspondingly reduced LA range, (c) writes the data into the zone 2, and (d) provides information to the host system conveying newly assigned LBA values for the new zone (zone 2). In yet another embodiment, the host system can be configured to issue a REFRESH(ZONE1) request, which causes similar compaction but with the storage drive identifying and opening a new zone selected by the storage drive, with similar address reassignment and reporting of newly assigned addresses. In each case where the supporting architecture prohibits LA overwrite, the host system either selects—or is provided with—new logical addresses that will be used, in future read requests for the data, to access the data in question, advantageously, in a manner that avoids the need for any processor cycles to perform address translation in the storage drive. In still other embodiments, as introduced earlier, the copy operation can be provided as a "piggyback" command, with trim operations either implied or commanded via a status bit or a request format that explicitly conveys the trim requirement. For example, a hypothetical trim command based on the first request format just discussed, COPY [LBA1:LBA2] could be structured to cause the storage drive to (a) retrieve data identified by LBA1, (b) mark LBA1 as trimmed by modifying its associated metadata tracked by the storage drive, (c) write the data to LBA2, and (d) mark metadata for LBA2 to indicate that the associated location now holds valid data. Clearly, many variations and permutations of the various principles discussed herein will occur to those having skill in the art, which are nevertheless contemplated as within the scope of this disclosure.

Continuing with the logic represented by FIG. 20, in one embodiment, the logic ascertains the most efficient way of reading data, given the extent of data being read, whether supporting memory is MLC or MP, and given LBA size. This operation is represented by numeral 2003 in FIG. 20. For example, if an entire page of valid data is to be moved (assuming four constituent LBAs each corresponding to 4 k of data), the depicted logic advantageously commands the read and ensuing write of the page of data as a unit. Similarly, if related data is striped across planes (or involves MLC storage), pertinent command formats can be selected and issued by the memory controller for the storage drive to invoke MLC and/or MP read and write modes in source and/or destination dies, respectively. As indicated by numeral 2005, any specified data (or data otherwise identified for copying) is read from a source location, for example, optionally using release information retained as part of the tracked metadata to pare down the data being copied, per numeral 2006. As represented by function block 2005, as data is copied, it can be stored in a SDRAM buffer allocation in a destination-address-ascending manner. It is noted that the copy operation can, depending on implementation, be structured so as to affect a single address (or structure), a list of addresses or an address range (or a list or range of structures, or a list of address ranges), or an entire zone. Note that where each page comprises multiple data sets associated with respective LBAs, if copying is to be performed LBA-by-LBA and release information has similarly been tracked LBA-by-LBA, pages can also be compacted with stale LBAs pared out and with the storage drive performing associated LBA compaction. As represented by numeral

2007, the storage drive then writes the data from onboard SDRAM directly into a destination flash die, one page or write frontier (write stripe) at a time, in a manner where the write pointer of the zone receiving the write matches the newly-assigned LA associated with the data (i.e., the destination-ascending address associated with the data as it was read into SDRAM). A indicated earlier, the storage drive can again take MLC and MP capabilities (not to mention other destination space ASL parameters) in staging and addressing writes. Per numeral 2009, the operation continues until the last writable item of data that is the subject of the delegated copy command has been written into memory; as before, if a staged write frontier and/or staged page of data is only partially completed, yet represents the last item of data that is to be the subject of the copy operation, the staging frontier/page can be padded with zeros (or ones) as desired and as appropriate to complete the operation. Alternatively, the storage drive can be configured to wait for more writes to the zone, possibly from the host system, until the write stripe is complete and can be committed to memory.

FIG. 21 illustrates read typing operations that can be used to make copying more efficient. As indicated by logic block 1201, the depicted flow is initiated when a storage drive receives a copy command. A memory controller (or dedicated circuitry for the storage drive, e.g., a copy controller) receives a source address range, i.e., either explicitly specified as an operand of (i.e., provided with) or otherwise implied by the copy command, per numeral 2103. The logic as referenced by numeral 2105 then identifies whether a quantum of source data to be moved spans at least 75% (or another threshold, e.g., 50%) of a frame of data striped across planes, e.g., as desirable for the particular application—if the data to be moved is big enough (e.g., if the data to be moved represents more than one plane, or more than half of a frame of data or related data striping across planes, then a read type is assigned (per numeral 2107) that causes the entire multi-page frame or set of data to be read as a unitary operation. A similar process is then performed (per numeral 2111) to ascertain with the data size represents more than a threshold amount of a page (e.g., at least two LBAs for some embodiments or at least one half of a page for other embodiments), with a read typing then being assigned representing LBA level or page level read processes, as represented by numerals 2113 and 2115; similar processes, by extension, can be performed where it is desired to move data striped across dies (while preserving address offsets in destination dies, written as part of a common write frontier, or write stripe). The depicted logic flow then continues with similar read typing of the portions of one or more zones and/or source address ranges to be copied, as represented by function blocks 2109 and 2119 until the entire source range is processed, with the copy operation then being completed as referenced above.

Reflecting on the processes as just discussed in connection with FIGS. 20-21, when properly structured, a delegated copy operation can cause a storage drive to effectuate relocation of valid data from a first LA to a second LA, without sending the subject data to the host system, in a manner compliant with schemes that prohibit LA overwrite. The described processes can optionally be performed in a manner compliant with zoned drive and Open Channel-compliant architectures, and optionally in a manner that is dependent on storage drive tracking of metadata representing storage location release and trim operations. In addition to the optional use of read typing, other variations and advantages will occur to those having ordinary skill in the art, including using features described in the incorporated by reference documents, particularly, U.S. Pat. Nos. 9,652,376 and 9,229,854.

FIGS. 22A-22B are used to describe configuration of backup power settings, if supported by the storage drive design, in a manner that supports early signaling of write completion. As should be apparent, such early signaling can help enhance predictability of write request latency and thereby improve pipelining for storage drives predicated on the use of nonvolatile memory (e.g., flash memory SSDs). Briefly recalling FIG. 3A, some embodiments support a storage-drive-resident power source usage that facilitates provision of a configurable level of backup power, sufficient to complete writes of fully staged writes of data from write buffer resources into memory in the event of unintended power loss.

Early signaling of write completion potentially permits the write operation to reflect a RAM-like speed latency, in an order of under approximately 15 microseconds, which might not be achievable if write completion is stalled until completion of programming into memory (e.g., flash memory, which can impose latencies on the order of one millisecond). One issue with the immediate return of a write completion, however, before the data is actually written to the flash memory, is that if there is a sudden unexpected power loss, without proper handling, data could be lost with no indication that subject data was confirmed as written into nonvolatile memory. While it is of course possible to have this trigger an error process, or to invoke a reconciliation mechanism for data "close to" a write pointer last-good location, in some contemplated embodiments, the storage drive is designed to have enough back-up power to complete any writes that have already begun, such that all data up to the associated write pointer is necessarily reliable. Several aspects of the present disclosure can be used to support such a process, including by way of example, optional use of a system level power loss warning (represented by signal 241 from FIG. 2A) and optional use of a storage drive level signal or detection mechanism (as represented in FIG. 2B). This is to say, power loss detection can be in the form of a warning signal coming from the host circuitry, or from circuitry designed to trigger an interrupt or equivalent when an external supply voltage shows a drop below a certain threshold. Circuitry as represented by element 308 from FIG. 3A can provide for an associated power source switch from the external power source to a storage-drive-resident backup power source (also represented by element 308). Such a backup power source can be in the form of capacitors, such as tantalum capacitors, or super capacitors, or lithium ion batteries, or any other power storage components. Such back-up power components require charging circuitry to transfer energy from the external power source, when it is available, to the power storage units. Some power storage components degrade when they are charged above certain voltages, in the presence of temperatures above certain levels. For many of these components, particularly super-capacitors, the higher the temperature they are at and the higher the voltage that they are charged to, the faster they typically degrade, such that they lose capacity over time, and eventually can lose enough of their capacity such that, at some point in time, the backup power source can no longer provide enough energy to provide power long enough to write or backup contents from a write cache buffer into nonvolatile memory. The thermal and energy requirements of many storage drive applications can be high enough to significantly degrade power storage components, while the available space for these components can be very limited. In one embodiment, to prevent excessive degradation of the storage elements, such that they will be operable for the entire advertised life of a storage drive, a large enough initial capacity is employed, such that the gradual degradation can be tolerated by having and using spare capacitor or backup power capacity. In another embodiment, a smart charger is employed that constantly monitors local conditions, and charges the energy storage components just enough such that there is enough stored energy to support the required buffer RAM back-up, with a nominal amount of margin, without unnecessarily charging the power storage components above that amount, thereby minimizing degradation rate. In a variation, a smart charger circuit periodically measures the capacity of the power storage components and uses that information to determine the minimum amount of charge that is required given the power storage component's current condition. In a non-limiting example, the smart charging circuit measures the capacitance of super-capacitors in Farads and, given that measurement, charges the capacitors to a voltage that is just high enough to keep the unit up during the RAM back-up to flash after a sudden external power loss. As the power source (e.g., one or more supercapacitors) degrades over time, the smart charger incrementally increases the charge to compensate. In one embodiment, the smart charger also monitors the storage drive ambient temperature, and uses an associated temperature measurement to adjust the charging and/or power stored as appropriate for the particular storage drive; this is to say, many storage drive architectures require additional energy to perform write operations at higher temperatures; the use of smart charger circuitry, in some embodiments, permits provision of a level of backup power to charge supercapacitors to a voltage that is high enough to support all conditions for which the storage drive is advertised to tolerate, while also compensating for the expected degradation. As noted in connection with the configuration processes discussed earlier, configuration of write buffer size can be advantageously driven by characteristics of the backup power system on the drive. In one embodiment, as noted, the resilience to a sudden power loss that is to be supported by the storage drive is configured relative to write buffer size so as to limit the number of supportable active frontiers in dependence on available backup power or configured levels of backup power. FIGS. 22A-22B are used to illustrate configurable backup power features supported by some designs.

More particularly, as indicated by FIG. 22A, logic intermittently or on a calendared basis initiates a charge maintenance cycle, as indicated by numeral 2201. Per function block 2203, the logic retrieves storage drive temperature from an embedded temperature sensor (represented as part of circuitry 308 from FIG. 3A), as well as capacitor charge voltage and other pertinent capacitor/power supply parameters (also represented as part of circuitry 308 from FIG. 3A), and the logic then calculates (2205) the expected power required to complete SDRAM backup and/or completion staged writes in the write buffer. If the supercapacitors (or other power source(s)) are charged in the appropriate manner, per decision block 2207, then no other action is needed, but charge levels (and/or the number of capacitors used or other variable capacitance parameters) are otherwise adjusted to an appropriate level in view of the considerations discussed just above. FIG. 22B represents measurement of power supply/capacitor parameters, e.g., in connection with a charge measurement cycle, per numeral 2211, the logic increases the current capacitor charge setting level and intermittently and repeatedly measures both charge and current flow to detect discharge rate as a function of charge, per numerals 2213 and 2215; effective capacitance, resistance and discharge rates can then calculated and provided as inputs to function block 2203 from FIG. 22A.

FIG. 23 provides further detail on an additional alternative process for internal SDRAM backup in the event of an unanticipated power loss, represented by numeral 2301. Operational logic completes all writes (2303) in progress to memory (e.g., validating data and receiving write completion indications from the memory dies which are in progress), and copies remaining SDRAM contents to nonvolatile memory as a block. For example, as was discussed earlier, a storage drive can optionally reserve one or more zones of memory for direct use by the storage drive for this purpose (e.g., BDx from FIG. 4E). This backup can include contents of the write buffer not confirmed as successful writes, tracked metadata and other drive operational parameters, write pointers for each zone, are other information used to define write buffer state and open zone state (e.g., which are being currently held in SDRAM as currently active operational parameters).

When external power is resumed and rises to a reliable level, per numeral 2305, the logic then executes a process to identify whether any data has been lost, for example, by identifying open zones, running an integrity check and a reconciliation routine to compare zone status information (including currently held write points) with host system information. If a discrepancy is detected, the logic copies stored data (e.g., the contents of zone BDx from FIG. 4E) back to SDRAM and performs an integrity check, resuming flash access operations as appropriate, as indicated by numerals 2309 and 2311.

Once again, various options and permutations of the features described above, or combined with features from the incorporated by reference documents, will naturally occur to those having ordinary skill in the art. Without limiting the foregoing, it is expressly contemplated that these various features can be used to provide reduced request overhead, improved pipelining and reduced errors when combined with architectures supporting zoned drive and Open Channel-compliant implementations. However, it is also contemplated that these techniques can be applied to other systems as well.

It should be noted that, as a step in their fabrication or other reification, the various circuits disclosed herein may be described using computer aided design tools and expressed (or represented) as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process. Any of the various methods and operational sequences herein may likewise be recorded as one or more sequences of instructions on a computer-readable medium and may be executed on a computing device to effectuate the disclosed method and/or operational sequence.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, device geometries and numbers of hierarchical structural elements (e.g., channels, dies, planes, erase units, pages, etc.), component circuits or devices and the like may be different from those described above in alternative embodiments. Additionally, links or other interconnections between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Device "programming" may include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

Any incorporation by reference of documents above is limited such that no subject matter is incorporated that is contrary to the explicit disclosure herein, and no definition from an incorporated-by-reference document modifies, supplants or appends to any definition set forth herein, i.e., definitions set forth in this document control. Any incorporation by reference of documents above is further limited such that no claims included in the documents are incorporated by reference herein.

While the invention has been described with reference to specific embodiments thereof, it will be evident that various modifications and changes may be made thereto without departing from the broader spirit and scope. For example, features or aspects of any of the embodiments may be applied in combination with any other of the embodiments disclosed herein and/or in materials incorporated by reference or in place of counterpart features or aspects thereof. Accordingly, the specification and drawings are to be regarded in an illustrative rather than a restrictive sense.

We claim:

1. A storage apparatus comprising:
   nonvolatile memory; and
   circuitry to receive read requests and write requests from a host, wherein each of the read requests and each of the write requests from the host is accompanied by a logical address, wherein
      said circuitry is to issue commands to the nonvolatile memory to write respective data responsive to the write requests, the commands to designate sequential physical addresses in the nonvolatile memory,
      said circuitry further comprises circuitry to untangle ones of write requests which are received out-of-sequential-logical-address-order;
   wherein the circuitry to untangle the ones comprises
      a buffer to store the ones,
      logic to identify that the logical addresses accompanying the ones correspond to a continuous logical address sequence, and
      logic to cause issuance of the commands in a manner ordered according to the continuous logical address sequence; and
   wherein the storage apparatus further comprises circuitry to configure a size of the buffer, so as to provide a storage capacity for a configurable number of the ones.

2. The storage apparatus of claim 1 wherein the storage apparatus is to identify a parameter of the nonvolatile memory including at least one of a number of nonvolatile memory dies, a write frontier size, a page size, a number of channels that couple the nonvolatile memory with a memory controller, a maximum number of planes supported by a nonvolatile memory die, and a backup power capacity, and wherein the circuitry to configure the size is to configure the size dependent on the identified parameter.

3. The storage apparatus of claim 2 wherein the storage apparatus comprises circuitry to transmit the identified parameter to the host, and wherein the circuitry to configure the size is to receive a host request that specifies a buffer size and is to configure the size of the buffer in a manner specified by the host request.

4. The storage apparatus of claim 1 wherein:
   each of the write requests is accompanied by write data having a logical unit size;
   each of the commands to write the respective data is to cause write of a page of data, each page being a multiple of the logical unit size, such that each of the commands to write the respective data corresponds to multiple write requests received from the host; and
   the circuitry to configure the size of the buffer is to do so dependent on a predetermined number of the commands and a ratio of page size to logical unit size.

5. The storage apparatus of claim 1 wherein the storage apparatus is to identify a backup power capacity, and wherein the circuitry to configure the size is to configure the size dependent on the backup power capacity.

6. The storage apparatus of claim 1 wherein the storage apparatus further comprises circuitry to control performance of an operation to reset zones, each zone representing on a mutually-exclusive basis a non-exhaustive subset of storage capacity in the nonvolatile memory.

7. The storage apparatus of claim 1 wherein the storage apparatus is of a type that does not permit overwrite of data at a given logical address by the host without a reset operation performed with respect to the given logical address.

8. The storage apparatus of claim 1 wherein the nonvolatile memory comprises zones, each zone representing on a mutually-exclusive basis a non-exhaustive subset of storage capacity in the nonvolatile memory, and wherein the requirement to designate sequential addresses is independent for each of the zones.

9. The storage apparatus of claim 8 wherein the zones can comprise zones which are open, and wherein the circuitry to untangle the ones of the write requests which are received out-of-order comprises circuitry to, on an independent basis for each given one of the zones which are open, untangle write requests which are received out-of-order for the given one of the zones, including buffers respective to each of the zones which are open, each of the buffers to accumulate plural write requests directed to the respective zone which have been received out-of-sequential-logical-address-order for the respective zone.

10. The storage apparatus of claim 1 wherein the storage apparatus comprises:
a random access memory;
logic to reserve capacity in the nonvolatile memory for contents of the random access memory;
at least one signal path to signal a power loss event; and
logic to store the contents in physical storage locations of the nonvolatile memory which correspond to the reserved capacity in the event of the power loss event.

11. The storage apparatus of claim 1 wherein the host is external to said storage apparatus.

12. The storage apparatus of claim 1 wherein the storage apparatus further comprises circuitry to control performance of data relocation operations in the nonvolatile memory in which data to be relocated is to be assigned a new logical address and is to be written into a new physical storage location in the nonvolatile memory.

13. The storage apparatus of claim 1 wherein the storage apparatus is to receive a host request to copy data and wherein the circuitry to control the performance of the data relocation operations is to relocate data corresponding to a source logical address specified by the host request to copy to the new physical storage location.

14. The storage apparatus of claim 13 wherein the new logical address is also specified by the host request to copy.

15. A storage apparatus comprising:
nonvolatile memory; and
circuitry to receive read requests and write requests from a host, wherein each of the read requests and each of the write requests from the host is accompanied by a logical address, wherein
said circuitry is to issue commands to the nonvolatile memory to write respective data responsive to the write requests, the commands to designate sequential physical addresses in the nonvolatile memory,
said circuitry further comprises circuitry to untangle ones of write requests which are received out-of-sequential-logical-address-order;
wherein the circuitry to untangle the ones comprises
a buffer to store the ones,
logic to identify that the logical addresses accompanying the ones correspond to a continuous logical address sequence, and
logic to cause issuance of the commands in a manner ordered according to the continuous logical address sequence; and wherein each said logic comprises configurable hardware and instructions, that when executed, are to configure the configurable hardware to perform operations in a scripted manner.

16. The storage apparatus of claim 15 wherein the circuitry to untangle the ones comprises:
a buffer to store the ones;
logic to identify that the logical addresses accompanying the ones correspond to a continuous logical address sequence; and
logic to cause issuance of the commands in a manner ordered according to the continuous logical address sequence.

17. The storage apparatus of claim 15 wherein the storage apparatus further comprises circuitry to control performance of an operation to reset zones, each zone representing on a mutually-exclusive basis a non-exhaustive subset of storage capacity in the nonvolatile memory.

18. The storage apparatus of claim 15 wherein the storage apparatus is of a type that does not permit overwrite of data at a given logical address by the host without a reset operation performed with respect to the given logical address.

19. The storage apparatus of claim 15 wherein the nonvolatile memory comprises zones, each zone representing on a mutually-exclusive basis a non-exhaustive subset of storage capacity in the nonvolatile memory, and wherein the requirement to designate sequential addresses is independent for each of the zones.

20. The storage apparatus of claim 19 wherein the zones can comprise zones which are open, and wherein the circuitry to untangle the ones of the write requests which are received out-of-order comprises circuitry to, on an independent basis for each given one of the zones which are open, untangle write requests which are received out-of-order for the given one of the zones, including buffers respective to each of the zones which are open, each of the buffers to accumulate plural write requests directed to the respective zone which have been received out-of-sequential-logical-address-order for the respective zone.

21. The storage apparatus of claim 15 wherein the storage apparatus comprises:
a random access memory;
logic to reserve capacity in the nonvolatile memory for contents of the random access memory;
at least one signal path to signal a power loss event; and
logic to store the contents in physical storage locations of the nonvolatile memory which correspond to the reserved capacity in the event of the power loss event.

22. A storage apparatus comprising:
nonvolatile memory; and
circuitry to receive read requests and write requests from a host, wherein each of the read requests and each of the write requests from the host is accompanied by a logical address, wherein
said circuitry is to issue commands to the nonvolatile memory to write respective data responsive to the write requests, the commands to designate sequential physical addresses in the nonvolatile memory,
said circuitry further comprises circuitry to untangle ones of write requests which are received out-of-sequential-logical-address-order;
wherein the nonvolatile memory comprises zones, each zone representing on a mutually-exclusive basis a non-exhaustive subset of storage capacity in the nonvolatile memory, and wherein the requirement to designate sequential addresses is independent for each of the zones;

wherein the zones can comprise zones which are open, and wherein the circuitry to untangle the ones of the write requests which are received out-of-order comprises circuitry to, on an independent basis for each given one of the zones which are open, untangle write requests which are received out-of-order for the given one of the zones, including buffers respective to each of the zones which are open, each of the buffers to accumulate plural write requests directed to the respective zone which have been received out-of-sequential-logical-address-order for the respective zone;

wherein the storage apparatus further comprises circuitry to independently configure a size of each of the buffers, such that the buffers respective to the zones which are open can accumulate respective numbers of write requests which are received out-of-sequential-logical-address-order for the respective zone.

23. The storage apparatus of claim 22 wherein the zones which are open can have respective write frontier sizes, and wherein the size of each of the buffers is dependent on the write frontier size for the respective zone.

24. The storage apparatus of claim 22 further comprising logic to identify applications respective to the zones which are open and to identify requirements respective to the applications, and wherein the size of each of the buffers is dependent on the respective application's requirement.

25. The storage apparatus of claim 22 further comprising logic to identify applications respective to the zones which are open and to identify priorities respective to the applications, and wherein the size of each of the buffers is dependent on the respective application's priority.

26. The storage apparatus of claim 22 wherein the storage apparatus comprises:
a random access memory;
logic to reserve capacity in the nonvolatile memory for contents of the random access memory;
at least one signal path to signal a power loss event; and
logic to store the contents in physical storage locations of the nonvolatile memory which correspond to the reserved capacity in the event of the power loss event.

* * * * *